US012435437B2

(12) United States Patent
Pham et al.

(10) Patent No.: US 12,435,437 B2
(45) Date of Patent: *Oct. 7, 2025

(54) IMPURITY REMOVAL IN AN IRON CONVERSION SYSTEM

(71) Applicant: ELECTRASTEEL, INC., Boulder, CO (US)

(72) Inventors: Ai Quoc Pham, Boulder, CO (US); Sandeep Nijhawan, Boulder, CO (US); Adolfredo Alvarez, Boulder, CO (US); Steven Fatur, Boulder, CO (US)

(73) Assignee: ELECTRASTEEL, INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/976,083

(22) Filed: Dec. 10, 2024

(65) Prior Publication Data

US 2025/0109516 A1   Apr. 3, 2025

Related U.S. Application Data

(63) Continuation of application No. 18/550,189, filed as application No. PCT/US2022/021712 on Mar. 24, 2022.

(Continued)

(51) Int. Cl.
*C25C 1/06* (2006.01)
*C21B 13/00* (2006.01)
(Continued)

(52) U.S. Cl.
CPC .......... *C25C 1/06* (2013.01); *C21B 13/0073* (2013.01); *C21C 5/5241* (2013.01); *C22B 3/06* (2013.01);
(Continued)

(58) Field of Classification Search
CPC ........................................................ C25D 3/20
See application file for complete search history.

(56) References Cited

U.S. PATENT DOCUMENTS

| 780,191 A | 1/1905 | Johnson |
|---|---|---|
| 984,703 A | 2/1911 | Ramage |

(Continued)

FOREIGN PATENT DOCUMENTS

| CA | 2097868 | 12/1993 |
|---|---|---|
| CN | 104340996 | 2/2015 |

(Continued)

OTHER PUBLICATIONS

Badenhorst et al. (Oct. 2019) "Electrowinning of Iron from Spent Leaching Solutions Using Novel Anion Exchange Membranes," Membranes, 9, 137; doi: 10.3390/membranes9110137.

(Continued)

*Primary Examiner* — Alexander W Keeling
(74) *Attorney, Agent, or Firm* — Leydig Voit & Mayer, Ltd.

(57) ABSTRACT

Methods and systems for producing iron from an iron-containing ore and removing impurities found in the iron-containing ore are disclosed. For example, a method for producing iron comprises providing a feedstock having an iron-containing ore and one or more impurities to a dissolution subsystem comprising a first electrochemical cell; producing an iron-rich solution, in the dissolution subsystem; treating the iron-rich solution to remove at least a portion of one or more impurities by raising a pH of the iron-rich solution from an initial pH to an adjusted pH thereby precipitating at least a portion of the one or more impurities in the treated iron-rich solution; delivering the treated iron-rich solution to an iron-plating subsystem having a second electrochemical cell; second electrochemically reducing at least a first portion of the transferred formed (Continued)

Fe²⁺ ions to Fe metal; and removing the Fe metal from the second electrochemical cell thereby producing iron.

22 Claims, 20 Drawing Sheets

Related U.S. Application Data

(60) Provisional application No. 63/165,502, filed on Mar. 24, 2021.

(51) Int. Cl.

| | | |
|---|---|---|
| *C21C 5/52* | (2006.01) | |
| *C22B 3/06* | (2006.01) | |
| *C22B 5/00* | (2006.01) | |
| *C25B 1/04* | (2021.01) | |
| *C25B 15/08* | (2006.01) | |
| *C25C 7/02* | (2006.01) | |
| *C25C 7/04* | (2006.01) | |
| *C25C 7/08* | (2006.01) | |
| *C25D 3/20* | (2006.01) | |

(52) U.S. Cl.
CPC .............. *C22B 5/00* (2013.01); *C25B 1/04* (2013.01); *C25B 15/081* (2021.01); *C25B 15/087* (2021.01); *C25C 7/02* (2013.01); *C25C 7/04* (2013.01); *C25C 7/08* (2013.01); *C25D 3/20* (2013.01)

(56) References Cited

U.S. PATENT DOCUMENTS

| | | |
|---|---|---|
| 1,075,093 A | 10/1913 | David |
| 1,162,150 A | 11/1915 | Estelle |
| 1,412,174 A | 4/1922 | Eustis et al. |
| 1,432,543 A | 10/1922 | Eustis et al. |
| 1,432,544 A | 10/1922 | Eustis et al. |
| 1,451,333 A | 4/1923 | Eustis et al. |
| 1,480,059 A | 1/1924 | Greenawalt |
| 1,751,099 A | 3/1930 | Pike |
| 1,782,909 A | 11/1930 | Pike |
| 1,937,068 A | 11/1933 | Pawlek |
| 2,094,277 A | 9/1937 | Mitchell |
| 2,393,582 A | 1/1946 | Agnew |
| 2,583,099 A | 1/1952 | Oliver |
| 2,587,630 A | 3/1952 | Konrad et al. |
| 2,653,905 A | 9/1953 | Aannerud |
| 2,810,686 A | 10/1957 | Bodamer et al. |
| 2,975,120 A | 3/1961 | Kenmore et al. |
| 3,345,212 A | 10/1967 | Schweitzer |
| 3,676,107 A | 7/1972 | Barnard et al. |
| 3,766,026 A | 10/1973 | Kruesi |
| 3,787,293 A | 1/1974 | Kamentani |
| 3,788,959 A | 1/1974 | Smith |
| 3,876,748 A | 4/1975 | Roorda et al. |
| 4,060,464 A | 11/1977 | Fahlstrom et al. |
| 4,062,924 A | 12/1977 | Glaum et al. |
| 4,113,588 A | 9/1978 | Watanabe et al. |
| 4,149,946 A | 4/1979 | Burke |
| 4,159,232 A | 6/1979 | Bacon et al. |
| 4,206,021 A | 6/1980 | Rivory |
| 4,272,343 A | 6/1981 | Brunsell et al. |
| 4,676,828 A | 6/1987 | Andre |
| 4,997,533 A | 3/1991 | Kawatra et al. |
| 5,227,032 A | 7/1993 | Sullivan |
| 5,492,608 A | 2/1996 | Sandoval et al. |
| 5,569,370 A | 10/1996 | Gomez |
| 5,948,264 A | 9/1999 | Dreisinger et al. |
| 6,284,123 B1 | 9/2001 | Cimermancic et al. |
| 6,309,531 B1 | 10/2001 | Murray |
| 7,572,546 B2 | 8/2009 | Karamanev |
| 7,641,889 B1 | 1/2010 | Salinas et al. |
| 7,855,005 B2 | 12/2010 | Sahu |
| 8,337,805 B1 | 12/2012 | Suh et al. |
| 8,338,008 B2 | 12/2012 | Zu et al. |
| 8,394,529 B2 | 3/2013 | Keshavarz et al. |
| 8,449,756 B2 | 5/2013 | Monzyk et al. |
| 8,764,962 B2 | 7/2014 | Allanore et al. |
| 8,785,023 B2 | 7/2014 | Horne et al. |
| 8,852,777 B2 | 10/2014 | Keshavarz et al. |
| 8,916,281 B2 | 12/2014 | Chang et al. |
| 8,951,665 B2 | 2/2015 | Keshavarz et al. |
| 8,980,454 B2 | 3/2015 | Pham et al. |
| 8,980,484 B2 | 3/2015 | Chang et al. |
| 9,035,617 B2 | 5/2015 | Parakulam et al. |
| 9,509,011 B2 | 11/2016 | Evans et al. |
| 10,181,615 B2 | 1/2019 | Song et al. |
| 10,230,125 B2 | 3/2019 | Evans et al. |
| 10,403,919 B2 | 9/2019 | Evans et al. |
| 10,586,996 B2 | 3/2020 | Evans et al. |
| 10,680,263 B2 | 6/2020 | Song et al. |
| 10,947,630 B2 | 3/2021 | Cardarelli |
| 11,201,343 B2 | 12/2021 | Song et al. |
| 11,753,732 B2 | 9/2023 | Pham et al. |
| 11,767,604 B2* | 9/2023 | Pham .................. C25B 9/19 205/587 |
| 12,054,837 B2 | 8/2024 | Pham et al. |
| 12,065,749 B2* | 8/2024 | Pham .................. C25B 9/19 |
| 2006/0219574 A1 | 10/2006 | Rahma et al. |
| 2010/0044243 A1 | 2/2010 | Cardarelli |
| 2010/0089763 A1* | 4/2010 | Darron ................ C25C 7/06 204/242 |
| 2011/0089045 A1* | 4/2011 | Cardarelli ............ C25D 3/20 205/349 |
| 2014/0027301 A1 | 1/2014 | Botte |
| 2014/0272483 A1 | 9/2014 | Pham et al. |
| 2015/0125768 A1 | 5/2015 | Mosso et al. |
| 2015/0155586 A1 | 6/2015 | Pham et al. |
| 2017/0321336 A1 | 11/2017 | Amigo Palacios et al. |
| 2018/0073156 A1 | 3/2018 | Ogawa et al. |
| 2018/0079663 A1 | 3/2018 | Miyamoto et al. |
| 2018/0294502 A1 | 10/2018 | Selverston et al. |
| 2018/0316033 A1 | 11/2018 | Evans |
| 2019/0309427 A1* | 10/2019 | James .................. C25B 9/40 |
| 2020/0056298 A1 | 2/2020 | Voskian et al. |
| 2020/0157696 A1 | 5/2020 | Cardarelli |
| 2021/0075039 A1 | 3/2021 | Song et al. |
| 2021/0135269 A1 | 5/2021 | Song et al. |
| 2021/0135270 A1 | 5/2021 | Song et al. |
| 2021/0143455 A1 | 5/2021 | Song et al. |
| 2021/0234184 A1 | 7/2021 | Song |
| 2021/0359315 A1 | 11/2021 | Song et al. |
| 2022/0052363 A1 | 2/2022 | Song et al. |
| 2022/0123344 A1 | 4/2022 | Song et al. |
| 2022/0149417 A1 | 5/2022 | Song et al. |
| 2024/0158939 A1 | 5/2024 | Pham et al. |
| 2024/0263333 A1 | 8/2024 | Pham et al. |
| 2024/0368788 A1 | 11/2024 | Pham et al. |
| 2024/0368789 A1 | 11/2024 | Pham et al. |

FOREIGN PATENT DOCUMENTS

| | | |
|---|---|---|
| DE | 4218915 | 12/1993 |
| EP | 415482 | 10/1992 |
| EP | 2268852 | 12/2018 |
| GB | 191209612 A | 7/1912 |
| GB | 114305 A | 2/1918 |
| GB | 654474 A | 6/1951 |
| GB | 1341229 A | 12/1973 |
| GB | 1476104 | 6/1977 |
| JP | 2006/241568 | 9/2006 |
| WO | 2009/114925 | 9/2009 |
| WO | 2012/145797 | 11/2012 |
| WO | 2019/227165 A1 | 12/2019 |
| WO | 2020/126456 A1 | 6/2020 |
| WO | 2022/070119 | 4/2022 |
| WO | 2022/204379 | 9/2022 |
| WO | 2022/204387 | 9/2022 |

(56) References Cited

FOREIGN PATENT DOCUMENTS

| WO | 2022/204391 | 9/2022 |
|---|---|---|
| WO | 2022/204394 | 9/2022 |

OTHER PUBLICATIONS

Bergthorson, et al. (Dec. 2015) "Direct Combustion of Recyclable Metal Fuels for Zero-Carbon Heat and Power," Appl. Energy, 160, 368-382, DOI: https://doi.org/10.1016/j.apenergy.2015.09.037.

Chen et al. (Sep. 2017) "Redox Flow Battery: Fundamentals and Applications," Chapter 5 in: Khalid, M. (Ed.), Redox—Principles and Advanced Applications. ISBN: 978-953-51-3394-0.

Du, et al. (Jan. 2017) "Hydrogen reduction of hematite ore fines to magnetite ore fines at low temperatures," J. Chem., 2017, 1919720, 1-11 DOI: https://doi.org/10.1155/2017/1919720.

Hawthorne, et al. (Nov. 2014) "An investigation into factors affecting the iron plating reaction for an all-iron flow battery," J. Electrochem. Soc., 162, A108-A113 DOI: https://doi.org/10.1149/2.059150 1jes.

International Search Report and Written Opinion, dated Aug. 2, 2022, corresponding to International Patent Application No. PCT/US2022/21729, 16 pp.

International Search Report and Written Opinion, dated Aug. 2, 2022, corresponding to International Patent Application No. PCT/US2022/021732, 20 pp.

International Search Report and Written Opinion, dated Jun. 16, 2022, corresponding to International Patent Application No. PCT/US2022/021712, 9 pp.

International Search Report and Written Opinion, dated Jun. 16, 2022, corresponding to International Patent Application No. PCT/US2022/021722, 10 pp.

Koutsoupa (2021) "Electrolytic iron production from alkaline bauxite residue slurries at low temperatures," Johnson Matthey Technol. Rev. 65(3), DOI: 10.1595/205651320X15918757312944.

Longa-Avello, et al. (May 2017) "Study of the calcination process of two limonitic iron ores between 250° C. and 950° C.", Rev. Fac. Ing., 26 (45), 33-45, DOI: http://orcid.org/0000-0001-5602-7921.

Lopes, et al. (Jun. 2020) "Electrochemical Deposition of Zero-Valent Iron from Alkaline Ceramic Suspensions of $Fe_2\text{-}xAl_xO_3$ for Iron Valorisation," J. Electrochem. Soc., 167, 102508-102515, DOI: 10.1149/1945-7111/ab9a2b.

Maihatchi, et al. (Sep. 2020) "Electrolytic iron production from alkaline suspensions of solid oxides: compared cases of hematite, iron ore and iron-rich Bayer process residues," J. Electrochem. Sci. Eng. 10(2)(2020) 95-102, DOI: https://doi.org/10.5599/jese.751.

Manohar, et al. (2016) "A High Efficiency Iron-Chloride Redox Flow Battery for Large-Scale Energy Storage," J. Electrochem. Soc. 163 (1) A5118-A5125, DOI: 10.1149/2.0161601jes.

Mostad, et al. (Feb. 2008) "Electrowinning of iron from sulphate solutions," Hydrometallurgy, 90 (2-4) 213-220, DOI: https://doi.org/10.1016/j.hydromet.2007.07.014.

Extended European Search Report issued Mar. 24, 2025 in European Application No. 22776638.3.

Extended European Search Report issued Mar. 24, 2025 in European Application No. 22776642.5.

Extended European Search Report issued Mar. 24, 2025 in European Application No. 22776645.8.

Extended European Search Report issued Mar. 24, 2025 in European Application No. 22776647.4.

* cited by examiner

IMPURITY REMOVAL IN AN IRON CONVERSION SYSTEM

CROSS-REFERENCE TO RELATED APPLICATIONS

This application is a continuation of U.S. application Ser. No. 18/550,189 filed Sep. 12, 2023, which is a U.S. National Stage Application filed under 35 U.S.C. § 371 of International Application No. PCT/US2022/021712, filed Mar. 24, 2022, which claims the benefit of and priority to U.S. Provisional Patent Application Ser. No. 63/165,502, filed Mar. 24, 2021, which is incorporated herein by reference in its entirety for all purposes to the extent not inconsistent herewith.

GOVERNMENT FUNDING

Inventions in this application were made with government support under Award Number 2039232 awarded by the US National Science Foundation. The government has certain rights in inventions herein.

FIELD

This application relates generally to the fields of electrochemistry and hydrometallurgy, and more particularly to systems and methods for extracting iron from iron-containing feedstocks using electrochemical and/or hydrometallurgical processes.

BACKGROUND

Iron oxide ores may be converted into relatively pure metallic iron by removing oxygen (i.e., reducing the oxides) and recovering metallic iron in a form that can be processed into useful goods in subsequent processes. Iron can then be made into steel by adding a small quantity of carbon and other elements, depending on the type of steel to be made. For thousands of years, both of these tasks (reduction and carbon addition) have been achieved predominantly by heating iron ore to very high temperatures (e.g., about 1,700° C.) in the presence of carbon, typically produced by burning coal (or coke). Carbon monoxide produced by burning the coal or coke combines with oxygen in the iron oxides, thereby reducing the oxides to metallic iron and releasing carbon dioxide. In fact, modern steel production accounts for about 10% of global $CO_2$ emissions.

SUMMARY

Provided herein are methods, and associated systems, for producing substantially pure metallic iron from iron-containing ores and/or other iron-containing raw materials. Various embodiment methods and systems are described herein for converting iron ore from an ore or other impure state into metallic iron using chemical and/or electrochemical conversion techniques without the necessity of burning fossil fuels. In particular, various embodiments described herein provide for dissolving the iron ore material into an acidic solution, chemically and/or electrochemically adjusting properties of the acidic solution, and electroplating iron (and optionally other metals) from the acidic solution in an electrochemical cell.

Various embodiments of the systems and methods include at least a first independent electrochemical process for adjusting parameters of the acid solution in order to enhance or accelerate ore dissolution, and a second independent electrochemical process for electroplating iron from an acidic solution.

Optionally, embodiments of the methods disclosed herein can provide for a process for electroplating iron from iron-containing ore such that the steady state operation is characterized by the overall input substantially consisting of iron-containing ore and the overall output substantially consisting of high-purity iron, wherein water and acid are regenerated as part of the process. Optionally, embodiments of method disclosed herein can provide for a process for electroplating iron from iron-containing ore being substantially free of generation of $CO_2$ during steady state operation. Optionally, embodiments of the methods disclosed herein can provide for a process for electroplating iron from iron-containing ore being substantially free of generation of $Cl_2(g)$ during steady state operation. Optionally, embodiments of the methods disclosed herein also include processes for making steel using the high-purity iron produced according to embodiments herein.

Disclosed is a method of processing and dissolving an iron-containing ore, the method comprising:
thermally reducing one or more non-magnetite iron oxide materials in the iron-containing ore to form magnetite in the presence of a reductant, thereby forming thermally-reduced ore; and
dissolving at least a portion of the thermally-reduced ore using an acid to form an acidic iron-salt solution;
wherein the acidic iron-salt solution comprises protons electrochemically generated in an electrochemical cell.

Also disclosed is a method of processing and dissolving an iron-containing ore, the method comprising:
in a dissolution tank, contacting the iron-containing ore with an acid to dissolve at least a portion of the iron-containing ore thereby forming an acidic iron-salt solution having dissolved $Fe^{3+}$ ions;
recirculating at least a portion of the acidic iron-salt solution between the dissolution tank and a cathode chamber of an electrochemical cell, the electrochemical cell comprising a cathode in the presence of at least a portion of the acidic iron-salt solution serving as a catholyte in the cathode chamber, an anode in the presence of an anolyte, and a separator separating the catholyte from the anolyte;
electrochemically reducing at least a portion of the dissolved $Fe^{3+}$ ions from the catholyte at the cathode to form $Fe^{2+}$ ions in the catholyte; and
electrochemically generating protons in the electrochemical cell and providing the electrochemically generated protons to the catholyte; wherein the acidic iron-salt solution in the dissolution tank, in the presence of the iron-containing ore, is characterized by a steady state concentration of free protons being at least 0.2 M.

Further disclosed is a method of processing and dissolving an iron-containing ore, the method comprising:
thermally reducing one or more non-magnetite iron oxide materials in the iron-containing ore to form magnetite in the presence of a reductant, thereby forming thermally-reduced ore;
wherein the reductant comprises $H_2$ gas; and
wherein at least a portion of the $H_2$ gas is generated chemically via a reaction of iron metal with an acid and/or at least a portion of the $H_2$ gas is generated electrochemically via a parasitic hydrogen evolution reaction of an iron electroplating process; and dissolving at least the thermally-reduced ore using an acidic solution to form an iron-salt solution;
  wherein the step of dissolving comprises dissolving the formed magnetite in said acidic solution.

Additionally disclosed is a system for processing and dissolving an iron-containing ore, the system comprising:
  a first dissolution tank for dissolving a first iron-containing ore using a first acid; wherein:
    dissolution of the first ore in the first acid forms a first acidic iron-salt solution comprising dissolved $Fe^{3+}$ ions in the first dissolution tank;
  an electrochemical cell fluidically connected to the first dissolution tank; wherein:
    the electrochemical cell comprises a cathode chamber having a catholyte in the presence of a cathode, an anode chamber having an anolyte in the presence of an anode, and a separator separating the catholyte and the anolyte; and
  a first circulation subsystem that circulates at least a portion of the first acidic iron-salt solution from the first dissolution tank to the cathode chamber and at least a portion of the catholyte from the electrochemical cell to the first dissolution tank;
  wherein at least a portion of the $Fe^{3+}$ ions from the first acidic iron-salt solution are electrochemically reduced at the cathode to $Fe^{2+}$ ions in the catholyte, thereby consuming the $Fe^{3+}$ ions from the first acidic iron-salt solution.

Disclosed is a method for producing iron, the method comprising:
  providing a feedstock having an iron-containing ore to a dissolution subsystem comprising a first electrochemical cell;
    wherein the first electrochemical cell comprises a first anodic chamber having a first anolyte in the presence of a first anode, a first cathodic chamber having a first catholyte in the presence of a first cathode, and a first separator separating the first anolyte from the first catholyte; and
    wherein the first anolyte has a different composition than the first catholyte;
  dissolving at least a portion of the iron-containing ore using an acid to form an acidic iron-salt solution having dissolved first $Fe^{3+}$ ions;
  providing at least a portion of the acidic iron-salt solution, having at least a portion of the first $Fe^{3+}$ ions, to the first cathodic chamber;
  first electrochemically reducing said first $Fe^{3+}$ ions in the first catholyte to form $Fe^{2+}$ ions;
  transferring the formed $Fe^{2+}$ ions from the dissolution subsystem to an iron-plating subsystem having a second electrochemical cell;
  second electrochemically reducing a first portion of the transferred formed $Fe^{2+}$ ions to Fe metal at a second cathode of the second electrochemical cell; and
  removing the Fe metal from the second electrochemical cell thereby producing iron.

Also disclosed is a method for producing iron, the method comprising:
  providing a feedstock having an iron-containing ore to a dissolution subsystem comprising a first electrochemical cell;
    wherein the first electrochemical cell comprises a first anodic chamber having $H_2$ gas in the presence of a first anode, a first cathodic chamber having a first catholyte in the presence of a first cathode, and a first separator separating the first anodic chamber from the first catholyte; and
  dissolving at least a portion of the iron-containing ore using an acid to form an acidic iron-salt solution having dissolved first $Fe^{3+}$ ions;
  providing at least a portion of the acidic iron-salt solution, having at least a portion of the first $Fe^{3+}$ ions, to the first cathodic chamber;
  first electrochemically reducing said first $Fe^{3+}$ ions in the first catholyte to form $Fe^{2+}$ ions;
  transferring the formed $Fe^{2+}$ ions from the dissolution subsystem to an iron-plating subsystem having a second electrochemical cell;
  second electrochemically reducing a first portion of the transferred formed $Fe^{2+}$ ions to Fe metal at a second cathode of the second electrochemical cell; and
  removing the Fe metal from the second electrochemical cell thereby producing iron.

Further disclosed is a system for producing iron, the system comprising:
  a dissolution subsystem having a dissolution tank and a first electrochemical cell fluidically connected to the dissolution tank;
    wherein the first electrochemical cell comprises a first anodic chamber having a first anolyte in the presence of a first anode, a first cathodic chamber having a first catholyte in the presence of a first cathode, and a first separator separating the first anolyte from the first catholyte; and
    wherein the first anolyte has a different composition than the first catholyte; and
  a iron-plating subsystem fluidically connected to the dissolution subsystem and having a second electrochemical cell; and
  a first inter-subsystem fluidic connection between the dissolution subsystem and the iron-plating subsystem;
  wherein:
  the dissolution tank receives a feedstock having an iron-containing ore;
  the dissolution tank comprises an acidic iron-salt solution for dissolving at least a portion of the iron-containing ore to generate dissolved first $Fe^{3+}$ ions;
  the first $Fe^{3+}$ ions are electrochemically reduced at the first cathode to form $Fe^{2+}$ ions in the first catholyte;
  the formed $Fe^{2+}$ ions are transferred from the dissolution subsystem to the iron-plating subsystem via the first inter-subsystem fluidic connection;
  the second electrochemical cell comprises a second cathode for reducing at least a first portion of the transferred formed $Fe^{2+}$ ions to Fe metal; and
  the Fe metal is removed from the second electrochemical cell.

Additionally disclosed is a system for producing iron, the system comprising:
  a dissolution subsystem having a dissolution tank and a first electrochemical cell fluidically connected to the dissolution tank;
    wherein the first electrochemical cell comprises a first anodic chamber having $H_2$ gas in the presence of a first anode, a first cathodic chamber having a first catholyte in the presence of a first cathode, and a first separator separating the first anodic chamber from the first catholyte; and
  a iron-plating subsystem fluidically connected to the dissolution subsystem and having a second electrochemical cell; and a first inter-subsystem fluidic connection between the dissolution subsystem and the iron-plating subsystem;
wherein:
the dissolution tank receives a feedstock having an iron-containing ore;
the dissolution tank comprises an acidic iron-salt solution for dissolving at least a portion of the iron-containing ore to generate dissolved first $Fe^{3+}$ ions;
the first $Fe^{3+}$ ions are electrochemically reduced at the first cathode to form $Fe^{2+}$ ions in the first catholyte;
the formed $Fe^{2+}$ ions are transferred from the dissolution subsystem to the iron-plating subsystem via the first inter-subsystem fluidic connection;
the second electrochemical cell comprises a second cathode for reducing at least a first portion of the transferred formed $Fe^{2+}$ ions to Fe metal; and
the Fe metal is removed from the second electrochemical cell.

Disclosed is a method for producing iron, the method comprising:
providing a feedstock having an iron-containing ore and one or more impurities to a dissolution subsystem comprising a first electrochemical cell;
wherein the first electrochemical cell comprises a first anodic chamber having a first anolyte in the presence of a first anode, a first cathodic chamber having a first catholyte in the presence of a first cathode, and a first separator separating the first anolyte from the first catholyte;
dissolving at least a portion of the iron-containing ore using an acid to form an acidic iron-salt solution having dissolved first $Fe^{3+}$ ions;
providing at least a portion of the acidic iron-salt solution, having at least a portion of the first $Fe^{3+}$ ions, to the first cathodic chamber;
first electrochemically reducing said first $Fe^{3+}$ ions in the first catholyte to form $Fe^{2+}$ ions;
producing an iron-rich solution in the dissolution subsystem, the iron-rich solution having at least a portion of the formed $Fe^{2+}$ ions and at least a portion of the one or more impurities;
treating at least a first portion of the iron-rich solution to remove at least a portion of the one or more impurities from the iron-rich solution, thereby forming a treated iron-rich solution having at least a portion of the formed $Fe^{2+}$ ions;
wherein the step of treating comprises raising a pH of the iron-rich solution from an initial pH to an adjusted pH thereby precipitating at least a portion of the one or more impurities in the treated iron-rich solution;
delivering at least a first portion of the treated iron-rich solution to an iron-plating subsystem having a second electrochemical cell;
second electrochemically reducing at least a first portion of the transferred formed $Fe^{2+}$ ions to Fe metal at a second cathode of the second electrochemical cell; and
removing the Fe metal from the second electrochemical cell thereby producing iron.

Also disclosed is a system for producing iron, the system comprising:
a dissolution subsystem having a first dissolution tank and a first electrochemical cell fluidically connected to the first dissolution tank;
wherein the first electrochemical cell comprises a first cathodic chamber having a first anolyte in the presence of a first anode, a second anodic chamber having a first catholyte in the presence of a first cathode, and a first separator separating the first anolyte from the first catholyte; and
an iron-plating subsystem fluidically connected to the dissolution subsystem and having a second electrochemical cell; and
a first impurity-removal subsystem;
wherein:
the first dissolution tank receives a feedstock having one or more iron-containing ores and one or more impurities;
the first dissolution tank comprises an acidic iron-salt solution for dissolving at least a portion of the one or more iron-containing ores to generate dissolved first $Fe^{3+}$ ions in the acidic iron-salt solution;
at least a portion of the acidic iron-salt solution, having at least a portion of the first $Fe^{3+}$ ions, is provided to the first cathodic chamber;
the first $Fe^{3+}$ ions are electrochemically reduced at the first cathode to form $Fe^{2+}$ ions in the first catholyte;
an iron-rich solution is formed in the dissolution subsystem, the iron-rich solution having at least a portion of the formed $Fe^{2+}$ ions and at least a portion of the one or more impurities;
at least a portion of the iron-rich solution is provided to the first impurity removal subsystem to remove at least a portion of the one or more impurities from the iron-rich solution, thereby forming a treated iron-rich solution having at least a portion of the formed $Fe^{2+}$ ions;
wherein a pH of the iron-rich solution is raised, in the first impurity removal subsystem, from an initial pH to an adjusted pH to precipitate the removed portion one or more impurities;
at least a first portion of the treated iron-rich solution is delivered from the first impurity-removal subsystem to the iron-plating subsystem;
the second electrochemical cell comprises a second cathode for reducing at least a portion of the transferred delivered $Fe^{2+}$ ions to Fe metal; and
the Fe metal is removed from the second electrochemical cell.

Further disclosed is a method for producing iron, the method comprising:
in a first dissolution tank, contacting a first iron-containing ore with an acid to dissolve at least a portion of the first iron-containing ore thereby forming an acidic iron-salt solution having dissolved first $Fe^{3+}$ ions;
circulating at least a portion of the acidic iron-salt solution between the first dissolution tank and a first cathodic chamber of a first electrochemical cell, thereby providing at least a portion of the first $Fe^{3+}$ ions to a first catholyte of the first cathodic chamber;
wherein the first electrochemical cell comprises a first anodic chamber having a first anolyte in the presence of a first anode, the first cathodic chamber having the first catholyte in the presence of a first cathode, and a first separator separating the first anolyte from the first catholyte;
first electrochemically reducing at least a portion of the first $Fe^{3+}$ ions at the first cathode to form $Fe^{2+}$ ions in the first catholyte;
electrochemically generating protons in the first electrochemical cell;
wherein the step of circulating comprises providing at least a portion of the electrochemically generated protons and at least a portion of the formed $Fe^{2+}$ ions from the first catholyte to the acidic iron-salt solution;

producing a first iron-rich solution having the formed $Fe^{2+}$ ions in a dissolution subsystem, the dissolution subsystem comprising the first dissolution tank and the first electrochemical cell;

transferring at least a portion of the first iron-rich solution to an iron-plating subsystem, the iron-plating subsystem comprising a second electrochemical cell;

second electrochemically reducing a first portion of the formed $Fe^{2+}$ ions to Fe metal at a second cathode of the second electrochemical cell;

wherein the second electrochemical cell comprises a second cathodic chamber having a second catholyte in the presence of the second cathode; a second anodic chamber having a second anolyte in the presence of a second anode, and a second separator separating the first anolyte from the first catholyte; and removing the Fe metal from the second electrochemical cell thereby producing the iron.

Additionally disclosed is a system for producing iron, the system comprising:

a dissolution subsystem for producing an iron-rich solution, wherein the dissolution subsystem comprises a first dissolution tank, a first electrochemical cell, and a first circulation subsystem; wherein:

in the first dissolution tank, an iron-containing ore is contacted with an acid to dissolve at least a portion of the iron-containing ore to thereby form an acidic iron-salt solution having dissolved $Fe^{3+}$ ions;

the first circulation subsystem circulates at least a portion of the acidic iron-salt solution between the first dissolution tank and a first cathodic chamber of the first electrochemical cell, thereby providing at least a portion of the first $Fe^{3+}$ ions to a first catholyte of the first cathodic chamber;

wherein the first electrochemical cell comprises a first anodic chamber having a first anolyte in the presence of a first anode, the first cathodic chamber having the first catholyte in the presence of a first cathode, and a first separator separating the first anolyte from the first catholyte;

the first electrochemical cell electrochemically reduces at least a portion of the first $Fe^{3+}$ ions at the first cathode to form $Fe^{2+}$ ions in the first catholyte;

the first electrochemical cell electrochemically generates protons and provides the electrochemically generated protons to the catholyte; wherein the first circulation system provides the electrochemically generated protons from the first catholyte to the acidic iron-salt solution; and the iron-rich solution produced in the first subsystem comprises the formed $Fe^{2+}$ ions;

a transition subsystem comprising a first inter-subsystem fluidic connection for transferring at least a portion of the iron-rich solution to an iron-plating subsystem;

the iron-plating subsystem comprising a second electrochemical cell;

wherein the second electrochemical cell comprises a second cathodic chamber having a second catholyte in the presence of the second cathode; a second anodic chamber having a second anolyte in the presence of a second anode, and a second separator separating the first anolyte from the first catholyte having a second catholyte in the presence of a second cathode;

wherein at least a first portion of the transferred formed $Fe^{2+}$ ions are electrochemically reduced to Fe metal at the second cathode, and an iron-removal subsystem for removing the Fe metal from the second electrochemical cell thereby producing the iron.

STATEMENTS REGARDING CHEMICAL COMPOUNDS AND NOMENCLATURE

Figure 1A:
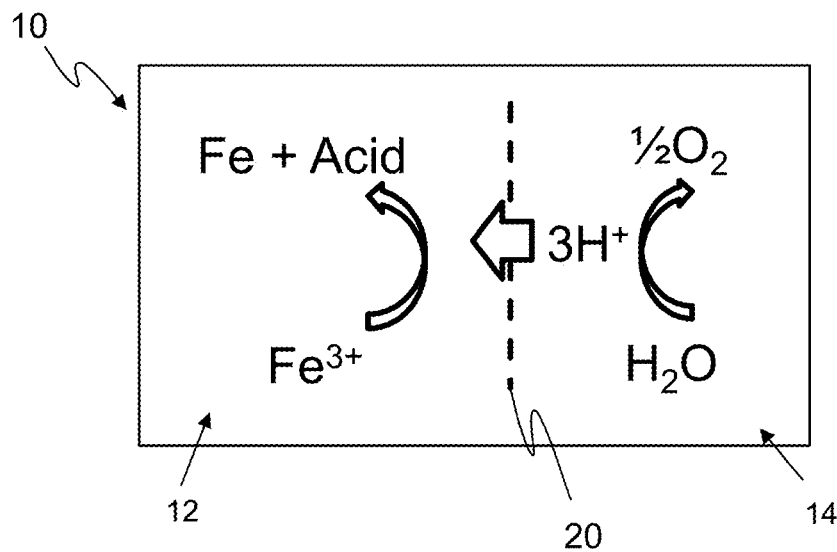
FIG. 1A. Schematic diagram of a possible approach to make iron by combining electroplating with oxygen generation.

In general, the terms and phrases used herein have their art-recognized meaning, which can be found by reference to standard texts, journal references and contexts known to those skilled in the art. The following definitions are provided to clarify their specific use in the context of this disclosure.

In various embodiments, the present disclosure provides processes, systems, and methods for enabling efficient, low-temperature aqueous hydrometallurgical processes for producing pure iron from various iron source materials including relatively low-purity iron feedstock materials. In broad terms, an iron feedstock material is dissolved in an acidic aqueous solution, and metallic iron is electrolytically plated and removed as a solid. In various embodiments, iron feedstock materials or aqueous iron may be converted from one form to another during one or more process steps.

As used herein, the terms "pure iron" and "high purity iron" are used in a relative sense to refer to a metallic iron material that is more pure than an iron source material, and contains an acceptably low quantity of one or more impurities.

As used herein, the terms "iron source material" and "iron feedstock" are used synonymously to refer to iron-containing materials that may be used as inputs into the various systems and methods described herein. "Iron source materials" and "iron feedstocks" may include iron in any form, such as iron oxides, hydroxides, oxyhydroxides, carbonates, or other iron-containing compounds, ores, rocks or minerals, including any mixtures thereof, in naturally-occurring states or beneficiated or purified states. The term "iron-containing ore" or simply "iron ore" may include materials recognized, known, or referred to in the art as iron ore(s), rock(s), natural rock(s), sediment(s), natural sediment(s), mineral, and/or natural mineral(s), whether in naturally-occurring states or in beneficiated or otherwise purified or modified states.

Some embodiments of processes and systems described herein may be particularly useful for iron ores including hematite, goethite, magnetite, limonite, siderite, ankerite, turgite, bauxite, or any combination thereof.

Optionally, an iron source material or iron feedstock may comprise an iron metal material, such as, but not limited to, iron dust (e.g., fine particulate produced as a byproduct of ironmaking or steelmaking processes in blast furnaces, oxygen furnaces, electric arc furnaces, etc.), iron powder, scrap steel, and/or scrap cast iron. "Iron source materials" and "iron feedstocks" may also contain various other non-iron materials, generally referred to as "impurities."

As used herein, the term "impurity" refers to an element or compound other than a desired final product material (e.g., iron). In various embodiments, depending on the intended end-use of a product material, a given element or compound may or may not be considered an "impurity." In some cases, one or more elements or compounds that may be impurities to one process or sub-process may be isolated or purified, collected, and sold as a secondary product material.

In various embodiments herein, various compositions, compounds, or solutions may be substantially "isolated" or "purified" to a degree sufficient for the purposes described herein. In various embodiments, a substantially purified composition, compound or formulation (e.g., ferrous iron solutions, ferric iron solutions, or plated metallic iron) may have a chemical purity of 90% (e.g., by molarity of ionic concentrations or by weight), optionally for some applications 95%, optionally for some applications 99%, optionally for some applications 99.9%, optionally for some applications 99.99%, and optionally for some applications 99.999% pure.

Reference made herein to a "tank" is intended to include any vessel suitable for containing liquids, such as highly acidic or caustic aqueous solutions if needed. In some embodiments, such a vessel may include additional features or components to assist or improve mixing of solid and/or liquid contents of the vessel. For example, a dissolution tank may include passive or actively operated structures or features for agitating a solution or solid/liquid mixture. A dissolution tank or other tank useful in the systems and methods herein may also include features to allow for sparging a gas into or through solid and/or liquid contents of the tank to increase gas contact with solid and/or liquid materials within the tank. Various tanks may also include baskets, sieves, pans, filters, or other structures to collect and separate solids from liquids. In some embodiments, a tank may be configured to direct liquid or gas flow through the tank in such a way as to agitate the mixture therein (e.g., flow-directing structures, pumps, impellers, baffles, impellers, stir-bars, stir blades, vibrators, cyclonic flow channels, etc.).

In some embodiments described herein, a system for converting iron ore into iron metal (i.e., an "iron conversion system") may comprise two or more subsystems. Some embodiments include a "dissolution subsystem" in which components of an iron-containing feedstock are dissolved into an aqueous solution. Some embodiments further include an "iron plating subsystem" in which dissolved iron is electrochemically reduced to iron metal in an "electroplating" (or simply "plating") process. The iron metal may subsequently be removed from the iron plating subsystem.

In some embodiments, an aqueous iron-containing solution may be transferred to and treated in a "transition subsystem" after leaving the dissolution subsystem and before being delivered to the plating subsystem. Treatments within the transition subsystem may include pH adjustment, impurity removal, filtration, or other processes. In some embodiments, any of the above sub-systems may be fluidically coupled to one another by an "inter-subsystem fluidic connection" which may comprise any combination of fluid-carrying conduits (pipes, channels, troughs, etc.) and any number of flow control devices, including valves, pumps, expansion chambers, gas-liquid separators, solid-liquid separators, filters, or other similar devices.

The term "iron electroplating" (or "iron plating" as used synonymously herein) refers to a process by which dissolved iron is electrochemically reduced to metallic iron on a cathodic surface. Equivalent terms "electrodeposition," "electroforming," and "electrowinning" are also used herein synonymously with "iron electroplating." The shape or form-factor of the electroplated iron need not be a "plate" by any definition of that term. For example, electroplated iron may take any shape or form and may be deposited on any suitable cathodic surface as described in various embodiments herein.

The term "dissolution step" includes processes occurring in the dissolution subsystem, including but not limited to dissolution of iron oxide materials and electrochemical process(es) occurring in or via an "acid regeneration cell," including but not limited to the claimed step of electrochemically reducing $Fe^{3+}$ ions to $Fe^{2+}$ ions in the acid regeneration cell. Dissolution step processes may also include oxidizing water or hydrogen gas in the first electrochemical cell, for example, to generate protons, which may allow for regeneration of the acid (in the form of protons) that is used to facilitate dissolution of an iron-containing feedstock.

The term "iron plating step" includes process(es) occurring in the iron plating subsystem, including but not limited to the electrochemical process(es) occurring in or via the claimed "plating cell," including but not limited to the step of "electrochemically reducing" $Fe^{2+}$ ions to Fe metal in the "plating cell" also referred to herein as the "plating cell." The iron plating process may also include oxidizing a second portion of $Fe^{2+}$ ions to form $Fe^{3+}$ ions. In some embodiments, such $Fe^{2+}$ ions may be provided from the first electrochemical cell or from another part of the system.

As used herein, unless otherwise specified, the terms "ferrous iron solution" or "ferrous solution" may refer to an aqueous solution that contains dissolved iron that is at least predominantly (i.e., between 50% and 100%) in the $Fe^{2+}$ (i.e., "ferrous") ionic state with the balance of dissolved iron being in the "ferric" $Fe^{3+}$ state. Similarly the term "ferrous ion" refers to one or more ions in the ferrous ($Fe^{2+}$) state.

As used herein, unless otherwise specified, the terms "ferric iron solution" or "ferric solution" may refer to an aqueous solution that contains dissolved iron that is at least predominantly (i.e., between 50% and 100%) in the $Fe^{3+}$ (i.e., "ferric") ionic state with the balance of dissolved iron being in the "ferrous" $Fe^{2+}$ state. Similarly the term "ferric ion" refers to one or more ions in the ferric ($Fe^{3+}$) state. Either "ferric solutions" or "ferrous solutions" may also contain other dissolved ions or colloidal or particulate materials, including impurities.

As used herein, any reference to a "PEM" or "proton exchange membrane" may be interpreted as also including a "CEM" or "cation exchange membrane", both terms may include any available membrane material that selectively allows passing positively charged cations and/or protons. The abbreviation "AEM" is used to refer to anion exchange membranes selective to negatively-charged aqueous ions and includes any available anion-selective membrane.

As used herein, aqueous protons and electrochemically generated protons are intended to be inclusive of aqueous protons and aqueous hydronium ions.

As used herein, the term "unprocessed ore" refers to an iron-containing ore that has been neither thermally reduced nor air roasted according to embodiments disclosed herein. Unprocessed ore is optionally a raw iron-containing ore.

As used herein, electrochemically generated ions, such as electrochemically generated protons and electrochemically generated iron ions (e.g., $Fe^{2+}$, $Fe^{3+}$), refer to ions that are generated or produced in an electrochemical reaction. For example, electrochemical oxidation of water at an anode may electrochemically generated protons and electrochemically generated oxygen.

As used herein, the term "thermally reducing" refers to a thermal treatment at an elevated temperature in the presence of a reductant. Thermal reduction is also referred to in the art as reduction roasting. Optionally, thermal reduction is performed at a temperature selected from the range of 200° C. and 600° C. Optionally, the reductant is a gas comprising hydrogen ($H_2$) gas. Additional description and potentially useful embodiments of thermal reduction may be found in the following reference, which is incorporated herein in its entirety: "Hydrogen reduction of hematite ore fines to magnetite ore fines at low temperatures", Hindawi, Journal of Chemistry, Volume 2017, Article ID 1919720.

As used herein, the term "parasitic hydrogen" or hydrogen ($H_2$) from a "parasitic hydrogen evolution reaction of an iron electroplating process" refers to hydrogen ($H_2$) gas electrochemically generated by a side reaction concurrently with an iron electroplating reaction (e.g., $Fe^{2+}$ to Fe or $Fe^{3+}$ to $Fe^{2+}$ to Fe) in the same electrochemical cell. Additional description and potentially useful embodiments of pertaining to parasitic hydrogen evolution may be found in the following reference, which is incorporated herein in its entirety: "An investigation into factors affecting the iron plating reaction for an all-iron flow battery", Journal of the Electrochemical Society 162 (2015) A108.

As used herein, the term "air roasting" refers to a thermal treatment performed at an elevated temperature in the presence of air. Air roasting of ore, such as iron-containing ore, can break down or decrease average particle size of an ore. Optionally, air roasting is performed at temperature selected from the range 300° C. and 500° C. Additional description and potentially useful embodiments of air roasting may be found in the following reference, which is incorporated herein in its entirety: "Study of the calcination process of two limonitic iron ores between 250° C. and 950° C.", Revista de la Facultad de Ingeneria, p. 33 (2017).

As used herein, the term "redox couple" refers to two chemical species, such as ions and/or molecules, that correspond to a reduced species and an oxidized species of an electrochemical reaction or a half-cell reaction. For example, in the electrochemical reduction of $Fe^{3+}$ ions to $Fe^{2+}$ ions, the corresponding redox couple is $Fe^{3+}/Fe^{2+}$, where $Fe^{3+}$ is the oxidized species and $Fe^{2+}$ is the reduced species. As used herein, the order in which a redox couple is described (e.g., $Fe^{3+}/Fe^{2+}$ vs. $Fe^{2+}/Fe^{3+}$) is not intended to denote which species is the reduced species and which is the oxidized species. Additional description and potentially useful embodiments of redox couples may be found in the following reference, which is incorporated herein in its entirety: "Redox—Principles and Advanced Applications": Book by Mohammed Khalid, Chapter 5: Redox Flow Battery Fundamental and Applications.

As used herein, the terms "steady state" and "steady-state" generally refer to a condition or a set of conditions characterizing a process, a method step, a reaction or reactions, a solution, a (sub)system, etc., that are true longer than they are not true during operation or performance of the process, method step, reaction or reactions, solution, (sub) system, etc. For example, dissolution of an ore or feedstock may be characterized by a steady state condition, wherein the steady state condition is true during at least 50%, optionally at least 60%, optionally at least 70%, optionally at least 80%, optionally at least 90%, optionally at least 95% of a time during which the dissolution is occurring. For example, a steady state condition may be exclusive of conditions characterizing the transient start-up and shut-down phases of a process such as dissolution of a feedstock.

The term "cathodic chamber" refers to a region, compartment, vessel, etc. comprising a cathode, or at least a portion or surface thereof, and a catholyte. The term "anodic chamber" refers to a region, compartment, vessel, etc. comprising an anode, or at least a portion or surface thereof, and an anolyte.

As used herein, the term "iron-rich solution" may be also referred to as an "iron iron-rich solution" or a "ferrous product solution", corresponding to the iron ion-rich solution formed in the ore dissolution subsystem.

As used herein, the term "ore dissolution subsystem" may also be referred to as the "dissolution subsystem", "first subsystem", and "STEP 1." The "dissolution subsystem" comprises the "acid regenerator" described herein.

As used herein, the term "iron-plating subsystem" may also be referred to as the "second subsystem" and "STEP 2."

As used herein, the term "precipitation pH" refers to a pH at which the referenced one or more ions or salts are thermodynamically favored or expected to precipitate out of the host aqueous solution. Generally, the solubility of ions and salts dissolved in an aqueous solution may depend on the pH of the aqueous solution. As pH increases in the acidic region, many metallic ions form metal hydroxides which tend to precipitate out of the host solution due to decreasing solubility. The precipitation pH is defined herein as the pH corresponding to a point where solubility of a given ion or salt is below a concentration threshold. The precipitation pH may be an upper boundary beyond which the solubility of a given ion or salt is less than 1 mM, optionally less than 0.1 mM.

As used herein, the term "metallic iron" refers to a material comprising metallic iron, such as but not limited to scrap iron, electroplated iron, iron powder, etc.

As used herein, the term "supporting salt" and "supporting ion" refers to a salt and ion, respectively, corresponding to or serve as a supporting electrolyte or which form, at least partially, a supporting electrolyte when dissolved in order to increase a conductivity of a host solution. In some embodiments, for example, the electrolytes and solutions in either the dissolution subsystem and the plating subsystem may contain dissolved iron species, acid, and additionally inert salts serving as supporting electrolyte to enhance the electrolyte conductivity, which may be particularly beneficial at low ferrous concentrations, wherein the inert salts serving as supporting electrolyte to enhance conductivity may be referred to as supporting salts. Supporting salts may include any electrochemically inert salt such as sodium chloride, potassium chloride, ammonium chloride, sodium sulfate, potassium sulfate, ammonium sulfate, sodium chloride, potassium chloride, ammonium chloride or others, or combinations of salts. The concentration of the supporting salts in the solution, if used, may range from about 0.1 to about 1 M, for example.

As used herein, the term "wt. %" or "wt %" refers to a weight percent, or a mass fraction represented as a percentage by mass. The term "at. %" or "at %" refers to an atomic percent, or an atomic ratio represented as a percentage of a type of atom with respect to total atoms in a given matter, such as a molecule, compound, material, nanoparticle, polymer, dispersion, etc. The term "mol. %" refers to molar percent or percent by moles. The term "vol. %" refers to volume percent.

As used herein, the term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

As used herein, the term "±" refers to an inclusive range of values, such that "X±Y," wherein each of X and Y is independently a number, refers to an inclusive range of values selected from the range of X−Y to X+Y. In the cases of "X±Y" wherein Y is a percentage (e.g., 1.0±20%), the inclusive range of values is selected from the range of X−Z to X+Z, wherein Z is equal to X·(Y/100). For example, 1.0±20% refers to the inclusive range of values selected from the range of 0.8 to 1.2.

DETAILED DESCRIPTION

In the following description, numerous specific details of devices, device components and methods are set forth to provide a thorough explanation of the precise nature of the various inventions described herein. It will be apparent, however, to those of skill in the art that the various inventions can be practiced without these specific details. Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of devices and methods may nonetheless be operative and useful.

Steel, a trillion-dollar commodity, is the foundational building block of the industrial world that accounts for three Gigatons or about 10% of global carbon dioxide emissions per year. The conventional steel-making process generates large $CO_2$ emissions because coke (purified coal) is used as reductant of iron ore (i.e., to reduce iron oxide to iron metal) and coal is used as fuel for heating and melting the iron. Coal-based iron and steel production has been the most common and inexpensive process for centuries. Unfortunately, the true social cost has merely been deferred to the present when rising atmospheric $CO_2$ increasingly threatens to cause catastrophic climate change.

As the cost of renewable and zero-carbon energy falls, switching from fossil fuels to clean electricity for steelmaking is an increasingly attractive alternative. However, the intermittent nature of renewable energy generation sources, and the complications of dissolving and reducing iron ores and removing impurities makes electrically driven iron production very challenging.

The need for compatibility with renewable energy intermittency is particularly at odds with high temperature processes that are difficult to turn down or interrupt unless a large backup storage of energy is available to maintain the high temperature. There is thus a need for a low-temperature electrical-based process for producing sufficiently pure iron from iron ore which also exhibits good compatibility with renewable energy intermittency.

Conventional wisdom among experts in the fields of hydrometallurgy and iron processing suggests that hydrometallurgical processing of iron is economically impractical due to perceived thermodynamic and economic limitations on the rate of dissolution of iron feedstocks, particularly iron oxide ores. Such experts are further skeptical of the ability to efficiently extract iron by electroplating due to the possibility of an electrochemical "shuttle" between $Fe^{2+}$, $Fe^{3+}$, and $Fe^0$ states in contact with an acidic solution. The systems and methods herein provide various mechanisms for overcoming these perceived obstacles.

In various embodiments, the present disclosure provides processes, systems, and methods for enabling efficient, low-temperature aqueous metallurgical processes for producing relatively pure metallic iron from various iron source materials including relatively low-purity iron feedstock materials that may be incompatible with other available iron-making and steelmaking processes. Solution-based iron extraction processes such as those described herein may generally allow for highly cost-efficient separation and removal of impurities from iron feedstock materials of varying purity while emitting zero greenhouse gasses by using clean electrical energy sources. In some cases, waste materials produced during one process step may be advantageously used to improve other process steps. Various examples of these and other advantages will be clear from the description herein.

In various embodiments described herein, metallic iron may be extracted from iron feedstocks (including those with high quantities of iron oxide such as most iron-containing ores) by dissolving the iron feedstock in an acidic solution, optionally treating the solution to remove some impurities, and then electrolytically depositing metallic iron from the solution into a solid form that may be removed and used in subsequent processes to make steel or other iron-containing products.

Most iron oxide ores contain iron in the iron (III) state. For example the very common mineral hematite ($Fe_2O_3$) is entirely in the iron (III) state, and magnetite ($Fe_3O_4$) contains Fe(III) in addition to Fe(II). When dissolved, hematite will dissociate to $Fe^{3+}$ ions and magnetite will dissociate to both $Fe^{3+}$ and $Fe^{2+}$ ions. In order to electrolytically deposit iron, any $Fe^{3+}$ will need to be first reduced to $Fe^{2+}$. In some embodiments of systems and methods described herein, reduction of $Fe^{3+}$ to $Fe^{2+}$ and electroplating may be done in a single electrolytic cell, typically at the cost of substantial parasitic hydrogen evolution due to incidental electrochemical reduction of protons to form hydrogen gas. In some embodiments, such hydrogen evolution is referred to as "parasitic" because it consumes charge and reactants from the cell and may be thermodynamically favored under certain conditions over more desired reactions, such as reduction of $Fe^{2+}$ to Fe. In other embodiments herein, the reduction of $Fe^{3+}$ to $Fe^{2+}$ and the electrolytic deposition step are separated into two separate electrolytic cells. This allows for de-coupling of the processes, and further facilitates impurity removal and other beneficial processes in the system.

Optional features, benefits, and/or embodiments of the systems and methods disclosed herein may include any of the following: (i) any acid can be used for dissolution of iron feedstock materials, including but not limited to hydrochloric acid, sulfuric acid, phosphoric acid, nitric acid, acetic acid, oxalic acid, citric acid, boric acid, perboric acid, carbonic acid, methanesulfonic acid, or any mixture or combination of these or other acids; (ii) iron feedstock may include any iron-containing material that may be dissolved in an acid in a system such as those described herein, including scrap steel, scrap cast iron, iron dust, iron powder, iron ores or other iron-containing mineral (iii) iron ore can include any iron oxide such as, but not limited to, hematite ($Fe_2O_3$), maghemite, ferrihydrite, magnetite ($Fe_3O_4$), or hydroxides such as geothite (FeOOH), akaganite, lepidocrocite, ferrihydrite, limonite, or any combinations of these; (iv) the various electrochemical cells and systems described herein may be operated at a wide range of pH in the acidic range from less than zero to seven; and/or (v) hydrogen oxidation or other reactions can be used to replace water oxidation at the anode of the electrochemical cells.

To make pure iron for high-volume steel making, it is desirable that the iron-containing feedstock be a relatively low-cost iron source material. Iron ores exist in a wide range of purity, with common impurities including silicates, kaolinite (a silicate clay mineral), compounds of phosphorous, aluminum, sulfur, magnesium, calcium, and other elements or minerals. Because existing steelmaking processes require relatively high purity iron ores, lower-purity ores and scrap materials with high quantities of impurities may be available at lower cost. The various aqueous iron production systems and methods described herein may be used with iron-feedstocks of any degree of purity, including high-purity iron ores, low-purity iron ores, iron or steel scrap, iron dust, or other iron-containing feedstock materials, including many that would otherwise be considered waste due to their incompatibility with existing large-volume steelmaking processes. For example, "fines" or "tailings" from mining and ore beneficiation processes may also be used as iron feedstock materials in various embodiments of the systems and methods herein.

In some embodiments, iron ore (and other iron feedstocks) can be converted into an aqueous solution by dissolving the feedstock material in acid, but the process is not necessarily easy or fast at low temperatures. Some example embodiments are provided herein for pre-treating some iron feedstock materials to improve dissolution processes and/or subsequent impurity removal. These may advantageously include the re-use of waste materials produced by other process steps.

Iron can be made at low temperatures (defined broadly as lower than 120° C., and in some particular embodiments lower than 80° C. or lower than 70° C.) via electroplating of a solution containing dissolved iron salts. There being no need to continuously maintain a high temperature, such low-temperature processes are far more compatible with the intermittency of renewable energy sources.

In various embodiments herein, iron dissolved in an aqueous solution may be electrochemically converted to metallic iron either in a single-step or in multiple steps. Iron may exist in solution in the form of "ferric" $Fe^{3+}$ ions or "ferrous" $Fe^{2+}$ ions. In order to convert any dissolved $Fe^{3+}$ ions into iron metal ($Fe^0$), they must first be reduced to $Fe^{2+}$ ions. In some embodiments, reduction of $Fe^{3+}$ to $Fe^{2+}$ and reduction of $Fe^{2+}$ to $Fe^0$ may be done in a single cell. In other embodiments (e.g., as described herein with reference to FIG. 2-FIG. 6), reduction of ferric $Fe^{3+}$ to ferrous $Fe^{2+}$ may be decoupled from reduction of $Fe^{2+}$ to metallic iron $Fe^0$.

Single-Step Iron Conversion

In some embodiments, metallic iron can be made from an aqueous iron solution in a single-step process by reducing ferric and/or ferrous ions (from dissolution of an iron feedstock in acid) to iron metal via electroplating in a cathode chamber of an electrochemical cell while oxidizing water to generate oxygen in the anode half-cell chamber.

An iron feedstock material may be converted into an aqueous solution by dissolving the feedstock in acid (e.g., as described in various embodiments elsewhere herein). Once in solution, ferric iron may be converted directly to iron metal using an electrolytic electrochemical cell in which reduction of ferric iron to metallic iron occurs at the cathode and oxidation of water to oxygen occurs at the anode, according to the equations:

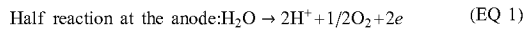
Half reaction at the anode:$H_2O \rightarrow 2H^+ + 1/2O_2 + 2e$ (EQ 1)

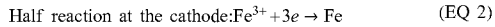
Half reaction at the cathode:$Fe^{3+} + 3e \rightarrow Fe$ (EQ 2)

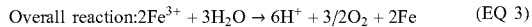
Overall reaction:$2Fe^{3+} + 3H_2O \rightarrow 6H^+ + 3/2O_2 + 2Fe$ (EQ 3)

FIG. 1A shows a schematic of the conversion according to this process. However, the dissolution of iron ore oxides in acids is generally not fast and generates ferric ($Fe^{3+}$) salt in most cases. The presence of predominantly ferric salt in the dissolved ore solution can cause inefficient metallic iron plating because of interactions between ferric iron in solution and the plated iron metal. More severely, if a proton exchange membrane (PEM) is used as separator membrane in the electrochemical cell, acid is generated on the cathode side which is also the plating side. As a result, the produced acid tends to attack the plated iron causing very poor Coulombic (or, Faradaic) efficiency in the cell.

Additionally, the low pH of the acidic solution is likely to cause a parasitic hydrogen evolution reaction during iron plating. Such hydrogen evolution further decreases the Coulombic (or, Faradaic) efficiency of the one-step iron conversion process. However, any hydrogen that is generated may be captured and re-used for another purpose as described elsewhere herein.

Figure 1B:
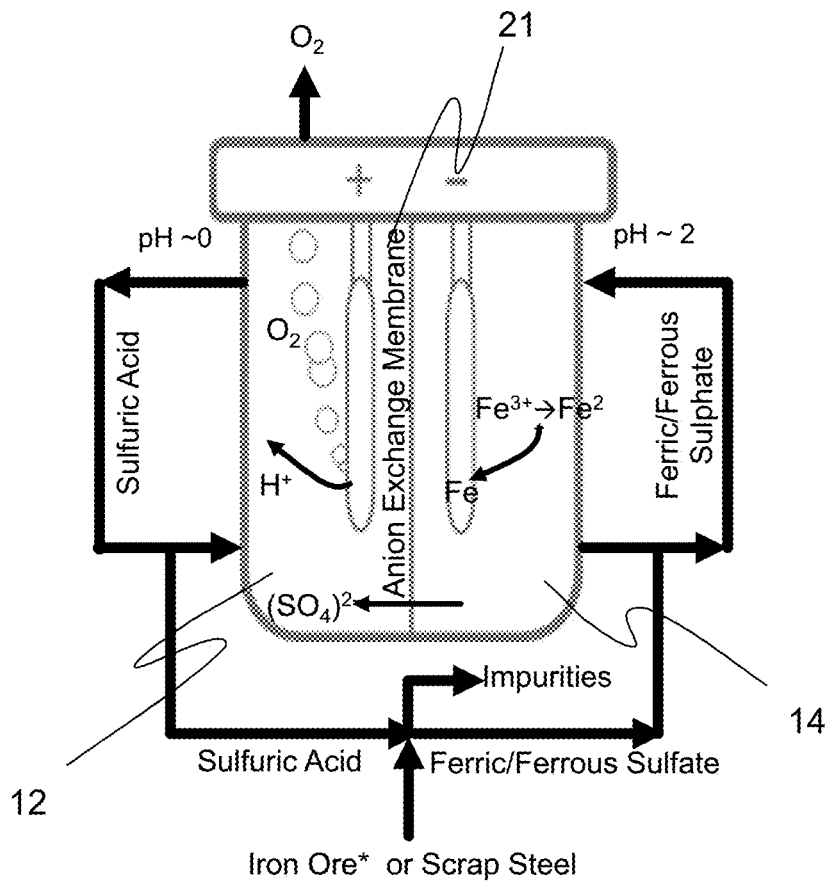
FIG. 1B. Schematic diagram of a possible approach to make iron by dissolving an iron feedstock in sulfuric acid and combining electroplating with oxygen generation with an example acid chemistry with approximate pH ranges.

Alternatively, as shown in FIG. 1B, an Anion Exchange Membrane (AEM) may be used. In this case, the acid is generated on the anode side, preventing the direct attack of plated iron by acid, but the acid is mixed with the water side causing significant dilution and the acid cannot be easily recovered for further use in iron ore dissolution. This would imply a non-recoverable acid and large acid waste generation.

In an alternative embodiment, instead of oxidizing water at the anode of the electrolytic cell, a stream of hydrogen gas may be directed to the anode chamber to be oxidized at the anode. In some embodiments, such a "hydrogen depolarized" anode may be made with lower cost materials than may be needed in some embodiments of an oxygen-evolving anode. In various embodiments, hydrogen for such an embodiment may be provided from a hydrogen storage system or from a hydrogen production system such as a water electrolyzer (e.g., a PEM water electrolzyer, an AEM water electrolzyer, or an alkaline water electrolyzer).

An alternative two-step iron conversion process overcomes the above shortcomings while introducing new synergistic advantages.

Two-Step Iron Conversion

With reference to FIG. 2, FIG. 3, FIG. 4, and FIG. 6, in some embodiments, an iron conversion system 100 may be separated into two main subsystems: a dissolution subsystem 102 and a plating subsystem 130. The dissolution subsystem 102 may generally be configured to dissolve iron feedstock materials 152 efficiently and relatively quickly at low temperatures to form a dissolved-iron solution 122. The dissolution subsystem 102 may be further configured to convert ferric ($Fe^{3+}$) ions in the dissolved-iron solution 122 to ferrous ($Fe^{2+}$) ions in an "acid regeneration" cell 104 prior to the dissolved-iron solution 122 being transferred to a plating cell 132 in the plating subsystem 130. The plating subsystem 130 may generally be configured to electrolytically plate the dissolved ferrous iron into a solid form that may be removed at 148 and sold as relatively pure iron and preparing the plating subsystem 130 for further plating. Once the dissolved-iron solution 122 is sufficiently depleted of ferrous iron by the plating cell 132, it may be returned to the dissolution subsystem 102 for use in subsequent dissolutions coupled with the acid regeneration cell 104.

As will be further described below, in some embodiments the dissolved iron solution 122 may be divided into a plating anolyte and a plating catholyte. The plating anolyte may be recirculated between a plating anolyte tank 144 and the anode chamber 138 of the plating cell 132 within which species in the plating anolyte will be oxidized at the anode electrode 140. The plating catholyte may be recirculated between a plating catholyte tank 142 and the cathode chamber 134 of the plating cell 132 where iron will be electroplated onto the cathode electrode 108. Iron may be removed at 148 from the plating cell 132 by various methods, examples of which are described below. In some cases, hydrogen gas may be evolved 146 from the plating cell cathode chamber 134. Such hydrogen gas may be captured and stored for use in other sub-processes described herein.

De-coupling the reduction of ferric to ferrous from the reduction of ferrous to iron metal allows for substantial improvements and cost-savings in the overall system 100 as compared to performing both reduction steps in a single plating cell (e.g., as described with reference to FIG. 1A & FIG. 1B).

As shown, the acid regeneration cell 104 may be configured to reduce ferric ions (produced during dissolution of feedstocks 120) to ferrous ions in a cathode chamber 106 while oxidizing a consumable reactant, supplied from a reactant source 116, at the anode 112. In some embodiments, the anodic reactant may be water and the anode 112 may evolve oxygen 111 from an anode chamber 110. In alternative embodiments, the acid regeneration cell anode 110 may be configured to oxidize a hydrogen gas reactant supplied from the reactant source 116 (which may be a storage system or a hydrogen production system such as a water electrolyzer).

In various embodiments, one or more treatment steps 124, 126, 128, 125, 127 may be performed to adjust the dissolved-iron solution 122 to remove materials or to increase or decrease concentrations of one or more components of the solution. For example, a treatment step 124 (FIG. 2, FIG. 6) may comprise directing the dissolved-iron solution 122 exiting a dissolution tank 118 through a treatment vessel configured to remove solid particulates and/or colloidal dispersions of materials released during dissolution. In some cases, silica from iron feedstocks may enter the dissolved-iron solution 122 as a gel-like mass in a colloidal dispersion, which may interfere with operations within an acid regeneration cell 104. A treatment step 124 may comprise contacting the solution with a flocculant such as polyethylene glycol, polyethylene oxide, or other flocculant known to be effective at removing colloidal silica from a solution. The treatment step 124 may further comprise any other solid-liquid separation techniques, devices, or additives as needed to remove materials that may be detrimental to operations in the acid regeneration cell 104.

The plating subsystem 130 may comprise a plating cell 132 with a cathode electrode 136 in a cathode chamber 134 that is fluidically coupled to a catholyte tank 142 and an anode electrode 140 in an anode chamber 138 that is fluidically coupled to an anolyte tank 144. Ferrous ions may be reduced to plated metallic iron in the cathode chamber 134 of the plating cell 132 while ferrous ions are oxidized to ferric ions in the anode chamber 138 of the plating cell 132.

Figure 2:
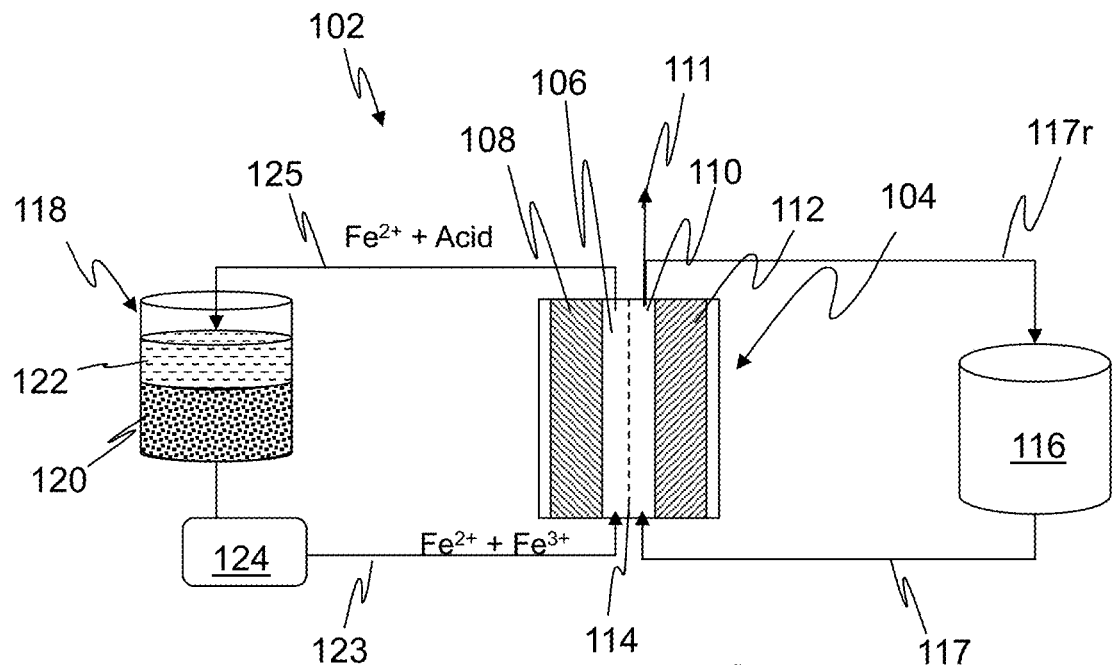
FIG. 2. Schematic diagram illustrating a feedstock dissolution and acid regeneration sub-system.
Figure 3:
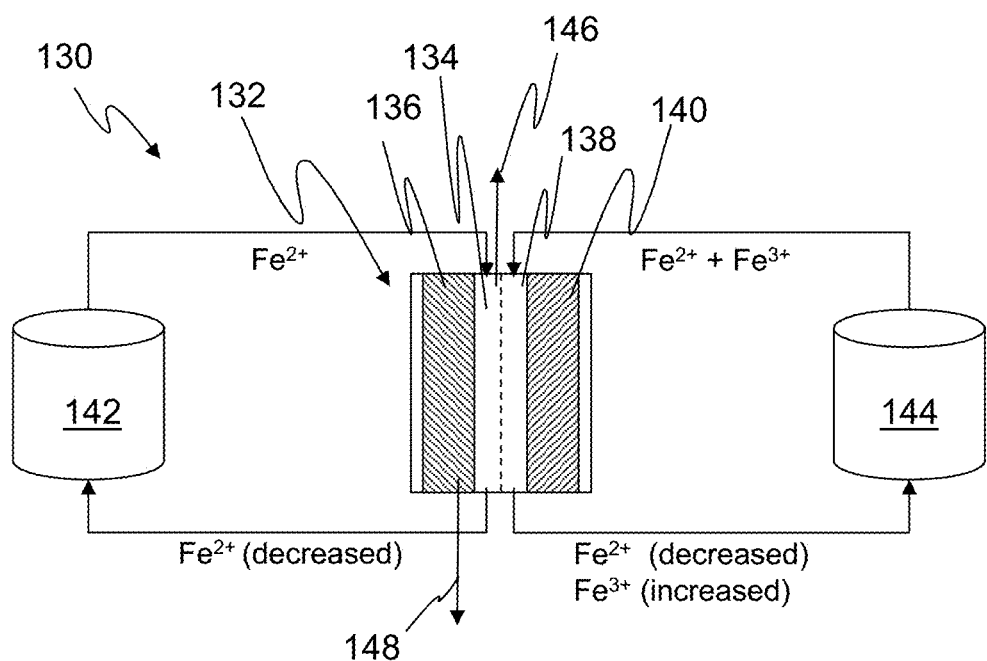
FIG. 3. Schematic diagram illustrating an iron plating sub-system.

Dissolution of Iron Feedstock Aided by Acid Regeneration:

Applicants have discovered that dissolution of iron ores (and other iron feedstock materials) may be greatly accelerated by the use of an acid regeneration cell coupled to a dissolution tank 118. As shown in FIG. 2, an acid regeneration cell 104 may be configured to recirculate an acid dissolution solution 122 between a cathode chamber 106 of the acid regeneration cell 104 and one or more dissolution tanks 118. A source 116 of a consumable reactant 117 oxidizable to protons (e.g., water, hydrogen gas, or another gaseous or aqueous substance oxidizable to form protons) may be fluidically coupled to the anode chamber of the acid regeneration cell 104.

Dissolution of an iron feedstock 120 coupled with an acid regeneration cell 104 involves the dissolution of iron feedstock material in an aqueous acid solution in which the acid is electrochemically re-generated by an electrolytic acid regeneration cell 104. An example is provided below with reference to a hydrochloric acid (HCl) solution and reference to FIG. 2, however the process is not limited to hydrochloric acid and may be conducted in substantially the same manner with any acid, including sulfuric acid, nitric acid, citric acid, acetic acid, boric acid, methanesulfonic acid, oxalic acid, or other acids. Similarly, hematite ($Fe_2O_3$) is given as an example of an iron ore feedstock, but the process applies to all other iron feedstock materials, including goethite, magnetite ($Fe_3O_4$), siderite ($FeCO_3$), and other ores and any other iron feedstock materials.

In some embodiments, the iron feedstock 120 may be milled or ground to form particles within a desired range prior to introduction into the dissolution tank 122. In other embodiments, the feedstock 122 may be pre-treated by air roasting and/or by thermal reduction (as described herein with reference to FIG. 9 and FIG. 10) prior to introduction to the dissolution tank 118.

When hematite is dissolved in a hydrochloric acid solution, the following reaction occurs:

$$Fe_2O_3 + 6HCl \rightarrow 2Fe^{3+} + 6Cl^- + 3H_2O \qquad \text{(EQ 4)}$$

Hematite becomes ferric chloride when dissolved in hydrochloric acid solution. Dissolution of iron oxide is in general not a fast reaction, and experiments have shown that increasing concentrations of ferric chloride ($FeCl_3$) as the product of hematite dissolution tends to slow down the dissolution rate. On the other hand, increasing acid concentrations tends to support faster dissolution. Experiments have also shown that the addition of ferrous ($Fe^{2+}$) salts, such as ferrous chloride (the reduced form of ferric chloride), tends to increase the dissolution rate as well. In fact, the combination of these effects may result in substantially complete dissolution of hematite or goethite ores within acceptable timeframes of less than about 24 to 30 hours.

In one embodiment, the feedstock dissolution process may be coupled with an electrochemical process as shown in FIG. 2. The dissolution tank 118 may be partially filled with solid iron feedstock 120 (e.g., hematite and/or geothite in this example) and an acid solution 122 (hydrochloric acid in this example). The hematite and/or geothite feedstock may be partially dissolved by the acid to form a ferric chloride solution (i.e., $FeCl_3$ which dissociates into $Fe^{3+}$ and $Cl^-$ ions in solution), consuming acid while generating water in the process. If other types of iron ores are used such as magnetite ($Fe_3O_4$) or siderite ($FeCO_3$), there is possible formation of ferrous chloride in addition to ferric.

The ferrous and ferric chloride solution 123 (denoted $Fe^{2+}+Fe^{3+}$ in FIG. 2) may be fed from the dissolution tank 118 to the cathode chamber 106 of the acid regeneration cell 104 (which may be a stack of multiple cells). The acid regeneration cell 104 includes a cathode 108, an anode 112 and a separator membrane 114. The separator membrane 114 may be of any type available, including proton exchange membranes (PEM) (or cation exchange membranes), anion exchange membranes (AEM), polymer or ceramic microporous separators, or other porous separators, ionomers, or combinations of these.

In some embodiments, it is advantageous for the acid regeneration cell separator 114 to be a PEM membrane or a microporous separator or a combination thereof to provide for regeneration of acid (protons) in the catholyte by allowing the protons produced at the anode 112 to cross into the cathode chamber 106. Water from a reservoir 116 may be fed into the anode chamber 110 of the acid regeneration cell 104. When an electrical current is applied to the cell 104, water is oxidized to generate oxygen gas and protons, according to half reaction (5).

$$\text{Half reaction at the anode:} H_2O \rightarrow 2H^+ + 1/2O_2 + 2e \qquad \text{(EQ 5)}$$

If a proton exchange membrane (PEM) or microporous separator is used as the separator membrane between the anode and cathode, the proton generated by water electrolysis (according to equation (5)) migrates from the anode chamber 110 to the cathode chamber 106.

At the cathode 108, the reduction of ferric to ferrous occurs according to:

$$Fe^{3+} + e \rightarrow Fe^{2+} \quad \text{(EQ 6)}$$

Note that the reaction may be controlled to stop at ferrous generation without going all the way to iron metal deposition in the acid regeneration cell 104 or even to just hydrogen generation. Deposition of iron may be caused by an insufficient supply of $Fe^{3+}$ ions into the acid regeneration cell 104 at the current density at which it is being operated. That is, if $Fe^{3+}$ ions are being electrochemically reduced to $Fe^{2+}$ at a rate faster than the $Fe^{3+}$ ions are replaced by $Fe^{3+}$ ions from newly dissolved feedstock (e.g., at too low of a flow rate or too high of a current for a given flow rate), then the next-most-likely reactions will be water reduction to form hydrogen gas and then iron deposition. If this occurs, it will be detectable as a dramatic increase in cell voltage of at least 0.77 V above steady state ferric reduction. Therefore, if a cell voltage significantly higher (e.g., 0.77 V or more) than the ferric-to-ferrous conversion potential is detected, then hydrogen generation and/or iron deposition may be stopped and further prevented by increasing the flow rate of ferric solution and/or by decreasing the current density applied to the acid regeneration cell 104. In some embodiments, acid regeneration cell current density may be increased or decreased in response to a detected or communicated increase or decrease in available power from an intermittent or renewable energy power source.

On the other hand, some amount of iron deposition in the acid regeneration cell 104 is not necessarily a problem as any deposited iron will be dissolved by new ferric ($Fe^{3+}$) when the concentration of ferric again rises. Therefore, in some embodiments, in response to detecting deposition of iron in the acid regeneration cell 104, the flow rate of catholyte may be increased and/or an electrical current applied to the acid regeneration cell 104 may be increased until voltage returns to a "normal" range due to an increased concentration of ferric ions.

As the ferric solution is converted to a ferrous solution, the same result may happen (i.e., the quantity of available $Fe^{3+}$ may be too low for the applied current). Therefore, in some embodiments, it may be beneficial to operate the acid-regeneration cell according to a so-called CC-CV protocol, in which the cell is operated at a constant current (CC), allowing voltage to vary, until a threshold voltage is reached, where the threshold voltage indicates the onset of iron deposition (or a mixed potential average voltage between ferric-to-ferrous conversion and iron plating). Upon reaching the threshold cell (or half-cell) voltage, the acid regeneration cell 104 may be operated at a constant voltage equal to or below the threshold voltage, allowing current to decrease and asymptotically approach zero. The constant-voltage may be applied until a target current or current density is reached (e.g., about 0.1 mA/cm$^2$ to about 10 mA/cm$^2$ optionally about 0.1 mA/cm$^2$ to about 0.5 mA/cm$^2$) or for a sufficient time that "enough" $Fe^{3+}$ is converted to $Fe^{2+}$. The target current and/or time needed to reach "enough" may be determined empirically and based on economic factors.

The proton coming from the acid regeneration cell 104 anode 112 forms an acid with anions made available from the ferric iron salt reduction (e.g., hydrochloric acid may form with the chloride available from the ferric chloride reduction). The solution 125 exiting the cathode chamber 106 of the acid regeneration cell 104 is thus enriched in ferrous salt and acid (e.g., ferrous chloride and hydrochloric acid). Since iron metal formation is generally prevented in this step, there is no efficiency loss due to acid attack of the metal. The solution 125 is then returned to the dissolution tank where the newly generated acid is used to dissolve more iron feedstock 120, converting it to ferric salt (e.g., ferric chloride) and the process continues. Acid is thereby regenerated for further iron ore dissolution.

On the anode 112 side of the acid regeneration cell 104, the solution 117r exiting the anode chamber 110 may be fed through a gas-liquid separation device (not shown in FIG. 2) where oxygen may be removed from the solution before returning remaining water to the water reservoir and subsequently back to the acid regeneration cell 104 anode chamber. Alternatively or in addition, gas separation may be done directly within the water reservoir 116.

One function of the electrochemical acid regeneration cell 104 is to reduce ferric iron to ferrous iron, thereby converting the product of dissolution to a different product with a reduced oxidation state. This removal of ferric ions avoids the accumulation of the product of dissolution and has been found to substantially improve the dissolution rate of iron ore to a degree greater than expected. Furthermore, the process converts ferric which accumulation could hinder further dissolution, into ferrous, a compound found to have beneficial effect on iron oxide dissolution. During the dissolution process with continuous liquid recirculation, the acid regeneration cell 104 causes the ferric concentration to remain relatively low while increasing the ferrous concentration, thereby generating double benefits to the dissolution of iron feedstocks containing substantial quantities of iron oxide.

A second function of the acid regeneration cell 104 is to regenerate the acid that is consumed by the dissolution of iron feedstock. Without the acid regeneration cell 104, acid concentration would decrease progressively as the dissolution progresses and acid is consumed in the dissolution reaction. When a PEM is used as the separator membrane in the acid regeneration cell 104, the acid is regenerated and is mixed with the ferrous-rich solution in the cathode chamber 106 and returned to the dissolution tank 118 where both have a positive benefit on the dissolution of iron feedstock 120.

In some embodiments, the dissolution tank 118 can be maintained at a temperature above ambient as higher temperature helps with dissolution. Typical temperature ranges may be between 20 to 120° C., preferably between 40 to 100° C. in some embodiments, and particularly between about 50° C. and about 90° C. In various embodiments, the acid regeneration cell 104 may be operated at a temperature of about 40° C. to 80° C., preferably around 60 C+/−10° C. The current density applied to an acid regeneration cell 104 may be between about 0.1 A/cm$^2$ to about 2 A/cm$^2$.

In some embodiments, final dissolved iron concentration targets may typically be between 0.1 M to 4 M, preferably between 0.5 to 2 M in some embodiments. Generally iron concentration should be held below its solubility limit in the solution used so as to avoid unwanted precipitation.

The flow rate of catholyte through the acid regeneration cell 104 cathode chamber 106 may be controlled to deliver at least the stoichiometric ratio of ferric ions to electrons for a given applied current across the acid regeneration cell 104 (as described herein above). Similarly, water (or other reactant) flow in the anode chamber 110 is preferably maintained in excess of the stoichiometric requirement for water splitting (or other reactant-consuming reaction) at current applied to the acid regeneration cell 104. In various embodiments, the current applied to the acid regeneration cell 104 may be in the range of about 0.1 mA/cm$^2$ to about 2,000 mA/cm$^2$, or in some more particular embodiments in the range of about 0.5 mA/cm2 to about 1,000 mA/cm$^2$, or may be variable in that range, depending on the available ferric concentration and/or on the availability of electricity. As will be clear based on the present disclosure and the accompanying drawings, the acid regeneration cell 104 may be operated at a different current density than the plating cell 132.

In some embodiments, the cathode 108 for acid regeneration cell 104 may be any carbon or graphite-based electrode such as carbon or graphite felt, paper or cloth or any electrode material stable in the ferric/ferrous salt environment. The acid regeneration cell 104 anode 112 may be any typical electrode available in the art of water electrolysis, including but not limited to: precious metal electrodes (e.g., mixed metal oxides comprising metal and oxides or other compounds of Ir, Ru, Pt, Rh, Pd, etc.), dimensionally stable anode (DSA), lead and lead dioxide electrodes, other oxide-based electrodes, etc. The metal or mixed metal oxides may or may not be supported on catalyst support, including titanium particles, etc. In some embodiments as described herein, the acid regeneration cell 104 anode 112 may be a hydrogen-depolarized anode configured to oxidize hydrogen gas, and may therefore comprise any suitable hydrogen-oxidation catalyst similar to those conventionally used in PEM-based hydrogen fuel cells, including platinum on carbon or any other hydrogen oxidation catalyst. The acid regeneration cell 104 may operate over a wide temperature range, between 20 to 100° C., preferably between 40 to 80° C. in some embodiments.

The water solution to be fed to the anode chamber 110 of the acid regeneration cell 104 may be pure water or may include salts to increase the osmotic pressure relative to the catholyte as described further below. In the case of sulfate chemistry for example, the salt may include any soluble sulfate salt such as ferric sulfate, sodium sulfate, potassium sulfate, ammonium sulfate, etc. Such supporting salts may be particularly beneficial in the plating cell in order to maintain electrolyte conductivity as ferrous iron is removed from solution by the plating reaction. This water may come from an external source or may be recovered from the system since the dissolution of iron ore generates water, or may be a combination of both external and internally recovered water.

As described herein, water is produced by the dissolution of ores (which may also contain water themselves in some cases). As a result, water content is continually increasing in the acid regeneration cell catholyte (i.e., the iron-rich acid solution that will ultimately be transferred to the plating cell), with more ore dissolution, causing further dilution of the solution. At the same time, water is being split (and thereby consumed) in the anolyte of the acid regeneration cell 104. Therefore, it may be desirable to extract water from the acid regeneration cell 104 catholyte and add the extracted water to the source of water feeding the anolyte. In some embodiments, this may be achieved by osmosis. Thus, in some embodiments, the acid regeneration cell 104 anolyte 117 may be provided with a salt concentration that exceeds a maximum salt concentration in the acid regeneration catholyte 123 so as to create osmotic pressure for water to cross from the catholyte to the anolyte. In alternative embodiments, water may be extracted from the acid regeneration cell catholyte by more active methods such as flash distillation, membrane distillation, reverse osmosis, or other methods. Separated water may be filtered or otherwise purified if needed prior to adding it to the acid regeneration cell anolyte at any convenient point.

In some embodiments, the acid solution may be continuously circulated between the acid regeneration cell 104 cathode chamber and a dissolution tank 118. In each cycle through the dissolution tank 118, a portion of the acid will be consumed by the dissolution reaction (e.g., equation 4 above), and in each cycle through the acid regeneration cell 104, a portion of the acid will be regenerated concurrently with the reduction of a portion of the ferric. Therefore, by continuously recirculating the acidic catholyte between the acid regeneration cell 104 and the dissolution tank 118, a steady-state concentration of acid (e.g., as measured by proton concentration or pH) may be maintained in the catholyte throughout most of the dissolution process. For example, in some embodiments, during steady state operation of acid regeneration coupled dissolution, a concentration of protons in the catholyte of at least 0.2 M may be maintained. In some embodiments, during normal operation, the initial state, defined as beginning of a new cycle, corresponds to a mostly ferric solution returning from the plating subsystem, which has low acid content. In some embodiments, the initial acid concentration (after the return of electrolyte from the acid regeneration subsystem and prior to re-starting the acid regenerator) will typically be at its lowest point in the cycle, generally less than 0.2 M (moles per liter). The reduction of the returned ferric in the acid regeneration cell may create the acid.

Figure 6:
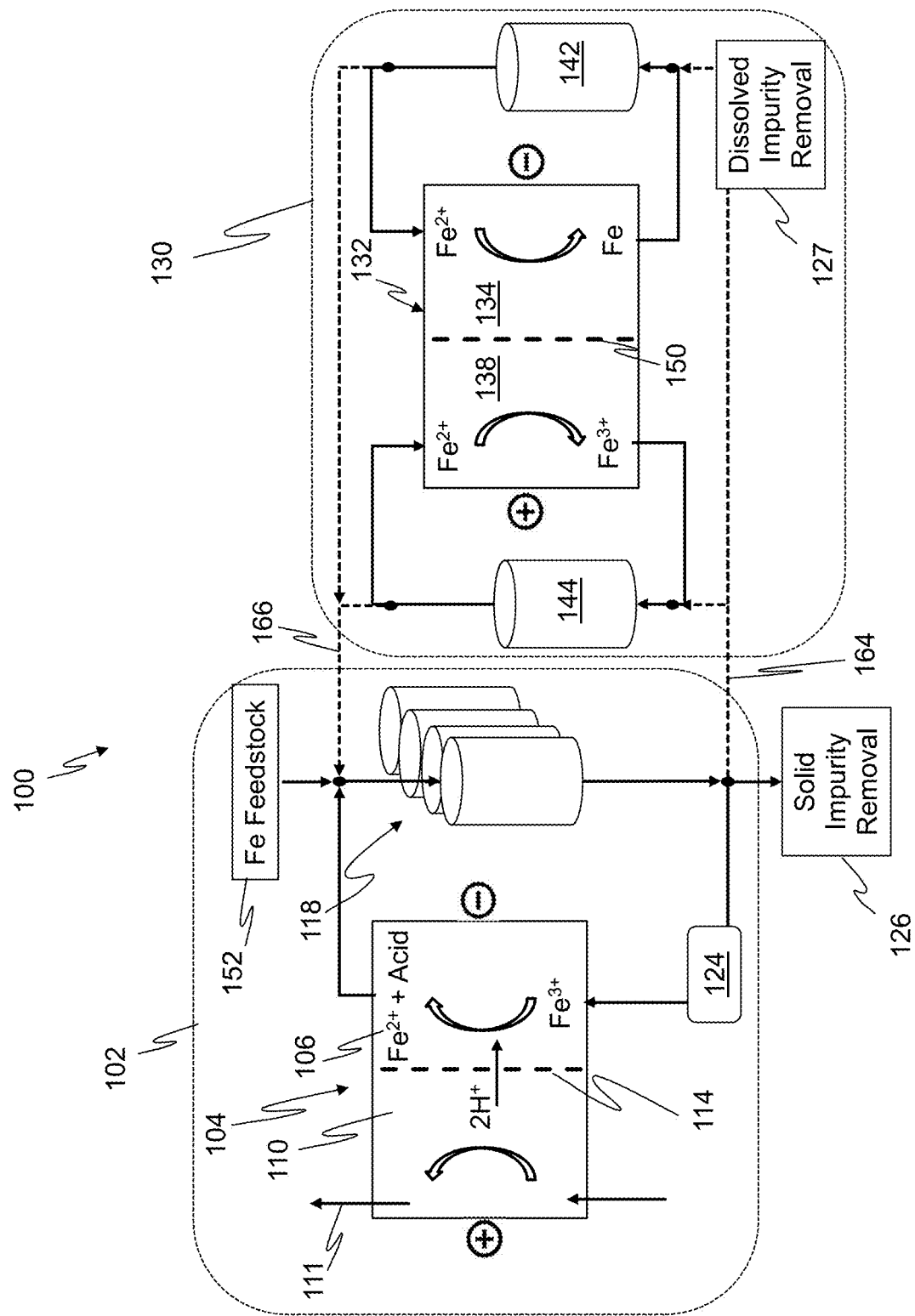
FIG. 6. Schematic diagram illustrating a two-step iron conversion system with various sub-systems, including an acid regeneration subsystem comprising oxygen evolution, and further demonstrating possible fluid flows between subsystems.

As shown in FIG. 6 the "dissolution tank" 118 may comprise many separate tanks 118 which may be used sequentially or otherwise to further de-couple the dissolution subsystem process and apparatus 102 from the plating process and apparatus 130, providing further advantages with respect to managing the different reaction rates of the two steps. For example, in some embodiments, an acid solution may be recirculated between the acid regeneration cell 104 and a first dissolution tank 118 until a desired dissolution stop point is reached, at which point valves or other flow control devices may be operated to stop flow between the acid regeneration cell 104 and the first dissolution tank 118 and to couple the acid regeneration cell 104 with a second dissolution tank 118. Alternatively or in addition, in some embodiments an acid solution (acid regeneration catholyte) may be left resident in a dissolution tank 118 for a period of time before resuming flow with the acid regeneration cell 104. In these and other embodiments, a single acid regeneration cell 104 may be coupled with multiple different dissolution tanks 118 at different times.

In some embodiments, the conversion of $Fe^{3+}$ to $Fe^{2+}$ (ferric to ferrous) may typically be driven as far as possible, asymptotically approaching a solution that is 0% ferric and 100% ferrous. In practical terms, some ferric ions will likely remain in solution when the dissolution process is deemed "complete," and the acid pH may remain lower than then natural pH of a pure ferrous iron solution. If the solution pH remains too low (i.e., lower than the natural pH of a pure ferrous solution) during the iron plating process, then a parasitic hydrogen evolution reaction may occur until the excess protons are evolved. In some embodiments, some acid remaining near the end of a dissolution process may be consumed by contacting the acid solution with a quantity of a highly-soluble ore material (e.g., magnetite) as described herein with reference to FIG. 10. Alternatively, any remaining acid or ferric present at the end of dissolution may be consumed in an "accessory iron" treatment (which may also result in hydrogen evolution) as described herein below. Any hydrogen that is evolved by such reactions may be captured and re-used for another purpose as described elsewhere herein.

In various embodiments, the acid solution in the acid regeneration cell 104 catholyte 122 may have variable acid concentration ranging between 0.01 M to 6 M. As dissolution proceeds, acid will be consumed. The acid regeneration cell 104 advantageously recovers one mole of protons for each mole of ferric that is reduced. Nonetheless, each mole of ferric dissolved from feedstock consumes three moles of protons, thus further dissolution of feedstock will further decrease total proton concentration in the catholyte.

Therefore, in some embodiments, a dissolution process may be terminated when an acid concentration (e.g. as measured by pH or other measure of proton concentration) reaches a predetermined low point. For example, in some embodiments, a dissolution process may be terminated when proton concentration in the acid regeneration catholyte falls to a low point of 0.4 M, 0.3 M, 0.2 M, 0.1 M (corresponding to a pH of 0.4, 0.52, 0.7, 1, respectively) or a lower point.

Alternatively or in addition, a dissolution process may be terminated when a total iron concentration (i.e., the sum of $Fe^{2+}$ and $Fe^{3+}$ concentrations) reaches a desired maximum. In various embodiments, a desired maximum iron concentration may be about 1 M to about 4 M. Total iron concentration may be measured by coulometric titration techniques, by optical methods such as UV visible spectroscopic analysis, red/green/blue (RGB) analysis or other optical or spectroscopic techniques. In some specific embodiments, a dissolution process may be stopped when a desired iron concentration reaches a maximum of 1 M, 1.5 M, 2 M, 2.5 M, 3 M, 3.5 M, 4 M, or greater, for example, or greater, for example, depending on the acid chemistry.

In some embodiments, once an end of dissolution condition is identified, the ferrous-iron-rich acid solution may be transferred from the acid regeneration cell 104 to a subsequent process step. In some embodiments, the next step may be an "accessory iron" treatment as described below. In other embodiments, the ferrous-iron-rich solution may be transferred directly to the plating subsystem.

In other embodiments, when an end of dissolution condition is identified, an electrical current to the acid regeneration cell may be stopped so as to cease acid regeneration, and the iron-rich acidic catholyte may be contacted with a thermally reduced ore such as magnetite in order to consume a portion of the remaining acid. In some embodiments, the magnetite may be added to the dissolution tank after (or just before or about the same time as) stopping current to the acid regeneration cell. In other embodiments, the catholyte solution may be redirected to a separate vessel containing substantially only magnetite ore. Because magnetite dissolves very quickly compared to other ore types (as described herein), contacting the catholyte solution with magnetite at the end of dissolution will tend to consume a portion of remaining acid (protons), thereby decreasing the quantity of acid to be removed or consumed in subsequent steps (e.g., in a plating cell, in a polishing cell, or in an "accessory iron" treatment as described herein). In various embodiments, other processes involving sequential dissolution of differently-processed ores are possible, some embodiments of which are described herein below with reference to FIG. 5A and FIG. 5B.

In other embodiments, when an end of dissolution condition is identified, an electrical current to the acid regeneration cell 104 may be stopped so as to cease acid regeneration, and the iron-rich acidic catholyte may be contacted with a reduced ore such as magnetite in order to consume a portion of remaining acid. In some embodiments, the magnetite may be added to the dissolution tank 118 after (or just before or about the same time as) stopping current to the acid regeneration cell 104. In other embodiments, the catholyte solution may be redirected to a separate vessel containing substantially only magnetite ore (as described further with reference to FIG. 10 below). Because magnetite dissolves very quickly compared to other ore types (as described herein), contacting the catholyte solution with magnetite at the end of dissolution will tend to consume a portion of remaining acid (protons), thereby decreasing the quantity of acid to be removed or consumed in subsequent steps (e.g., in a plating cell, in a polishing cell, or in an "accessory iron" treatment as described herein). In various embodiments, other processes involving sequential dissolution of differently-processed ores are possible, some embodiments of which are described herein below with reference to FIG. 10.

In some embodiments, as described elsewhere herein an optional solid-liquid separation step 124 may be performed after each cycle through a dissolution tank. In some cases, dissolution of iron feedstock may cause a quantity of silica (or other undissolved material) to enter the liquid as particles or a colloidal dispersion. Therefore, in some embodiments, it may be desirable to separate the solid material(s) from the solution before returning the solution to the acid regeneration cell 104. In some embodiments, solids may be removed at this stage by any suitable solid liquid separation device or technique, including filtration, gravity settling, hydrocyclones, flocculation, high shear or low shear crossflow separation, or any combination of these or others. In some embodiments, colloidal material such as silica may be removed by flocculation with a flocculant such as polyethylene glycol, polyethylene oxide, or similar materials. In some embodiments, an additional treatment step 126 (FIG. 4), such as an accessory iron treatment, a solid-liquid separation, or other treatment process may be performed on all of the liquid exiting the dissolution subsystem 102. In some embodiments, for example, the insoluble materials such as quartz may be separated out by filtering or other solid-liquid separation. In some embodiments, for example, the insoluble but fine suspension such as colloidal silica may be removed in a separate step such as flocculation, optionally followed by filtration, settling, and/or other physical separation means.

In various embodiments, an acid regeneration cell 104 may be configured as a single cell or as a cell-stack in which multiple electrochemical acid regeneration cells are combined into a common unit 104, either in an electrically series-connected bipolar configuration, or in an electrically-parallel connected monopolar configuration, or a combination of these. Acid regeneration cell-stacks may be configured in any manner common in electrochemical cell stacks, including filter-press configurations (e.g., compressed by hydraulic pistons or by tie rods or other compression devices), or other configurations. In various embodiments, additional components typical of an electrochemical stack may include current collectors, bipolar plates, flow channels, end plates, etc.

In various embodiments, additional components or equipment may be included such as filtering systems, pumps and heat exchangers, etc. to provide for other operations including fluid transfer from the dissolution tank to the acid regeneration cell 104 and to/from other subsystems and to enable temperature regulation. In some embodiments, raw ore, roasted ore, and/or reduced ore may be provide, such as in a selected sequence, in the same dissolution tank, for example, to selectively vary the feedstock conditions. In some embodiments, instead of using multiple tanks, raw ore, roasted ore, and/or reduced ore may be provide, such as in a selected sequence, in the same dissolution tank, for example, to selectively vary the feedstock conditions.

Accessory Iron Treatment

In some embodiments, all or a portion of an iron-rich acid solution at the completion of a dissolution process may be directed to a reaction vessel in which an "accessory iron treatment" process may be performed. Depending on the condition of the iron-rich acid solution at the end of dissolution and the desired condition of a solution to be delivered to a plating subsystem, one or more of three possible reactions may occur: acid consumption, ferric reduction, and/or impurity precipitation.

Metallic iron used for the purpose of reacting with or otherwise modifying the composition of an iron-rich acid solution is referred to herein as "accessory iron" and may include any material comprising metallic iron in particles of sufficiently small size to promote desired reactions with the solution. Accessory iron materials may include, but are not limited to scrap steel, scrap iron, iron dust (e.g., fine particulate iron-containing dust from other industrial processes), pig iron, electrolytic iron, or iron recycled from any iron conversion process described herein (or other processes), or combinations of these or other metallic-iron-containing materials. The accessory iron materials may be any particle size, but smaller particles may generally be capable of faster reaction rates. However, even relatively large particles (e.g., larger than 2 cm) may be used as "accessory iron" in some embodiments.

When an iron-rich acid solution is contacted with metallic iron, any remaining acid will tend to react with the metallic iron to convert the metallic iron into ferrous ($Fe^{2+}$) ions while releasing hydrogen gas according to:

$$Fe + 2H^+ \rightarrow Fe^{2+} + H_2 \quad (EQ\ 7)$$

Therefore, in some embodiments, the accessory iron reaction vessel (e.g., a tank or other vessel in which the solution may be contacted with the accessory iron) may be configured as a closed vessel from which evolved hydrogen gas may be collected and directed to another process or sub-system as described elsewhere herein.

In some embodiments, any remaining $Fe^{3+}$ ions present in the iron-rich acid solution at the completion of a dissolution process may be reduced to $Fe^{2+}$ by exposing the $Fe^{3+}$ ions to metallic iron which will be dissolved and will react with the ferric ions to convert both into ferrous ions. For example, $Fe^{3+}$ may be reduced to $Fe^{2+}$ by flowing a mostly-ferrous solution over or through a quantity of metallic iron particles ("accessory iron"). This will have the effect of converting some of the metallic iron and $Fe^{3+}$ to $Fe^{2+}$ in solution according to the equation:

$$Fe^{3+} + Fe \rightarrow 2Fe^{2+} \quad (EQ\ 8)$$

Advantageously, these two reactions (acid consumption and ferric reduction) will increase the efficiency of the iron plating in the plating subsystem both by decreasing (or potentially eliminating) $Fe^{3+}$ as well as by decreasing the occurrence of the parasitic hydrogen evolution reaction during iron plating.

In some embodiments, excess acid and ferric ions may be consumed in a separate electrochemical cell ("polishing cell") configured to electrolytically convert remaining $Fe^{3+}$ to $Fe^{2+}$ and raise pH of catholyte by consuming acid. Such a cell may allow for decoupling of impurity removal from the process of consuming excess acid and ferric. In some embodiments, a polishing cell may be configured substantially similarly to a plating cell, but without the need to provide for removal of metallic iron. In some embodiments, a polishing cell may be configured to cause $H_2$ evolution without any electroplating and using precious metal electrodes such as Pt at the cell cathode.

Removal of Impurities

Some impurities, including kaolinite and other silicate minerals are generally insoluble in the acid solution produced in the acid-regeneration cell. Therefore, when ores or other feedstocks containing such insoluble impurities are ground to small particles and placed in a dissolution tank connected to an acid regeneration cell 104, the insoluble impurities may be filtered out of the solution, collected at the bottom of the tank and removed from the tank as solids, or removed by any other suitable solid-liquid separation technique or apparatus. In various embodiments, the collected solid impurities may be treated and disposed of or used in other processes for which the "impurities" may be feedstocks.

Some solid impurities, including some forms of amorphous silica, may tend to form a colloidal dispersion in the acid solution. Such materials may be separated from the solution by flocculation with a flocculant such as polyethylene glycol or polyethylene oxide. Nonetheless, some silica may remain dissolved.

Some impurities may form relatively low-solubility compounds with iron or other materials in solution. The term "solubility" refers to the compound's thermodynamic solubility limit in a given solution, which is the concentration limit above which the compound will begin to precipitate out of solution as a solid.

Significant soluble impurities include compounds of aluminum, silicon, titanium and phosphorous among others. Aluminum compounds dissolve to form $Al^{3+}$ cations, and phosphorus may typically dissolve to form phosphate $PO_4^{3-}$. These impurities can pose various problems for downstream processes such as pumping, filtration, acid regeneration, iron plating, etc. Aluminum impurities may exist in iron ores in amounts up to about 10 weight percent of the unprocessed ore. While phosphorous tends to exist in much smaller amounts (e.g., typically less than 1%, but can be more), even small amounts of phosphorous must be removed prior to steel-making processes, and therefore is undesirable in plated iron produced by the plating cell. In particular, aluminum and phosphorous impurities have been found to interfere with iron electroplating processes.

Figure 8A:
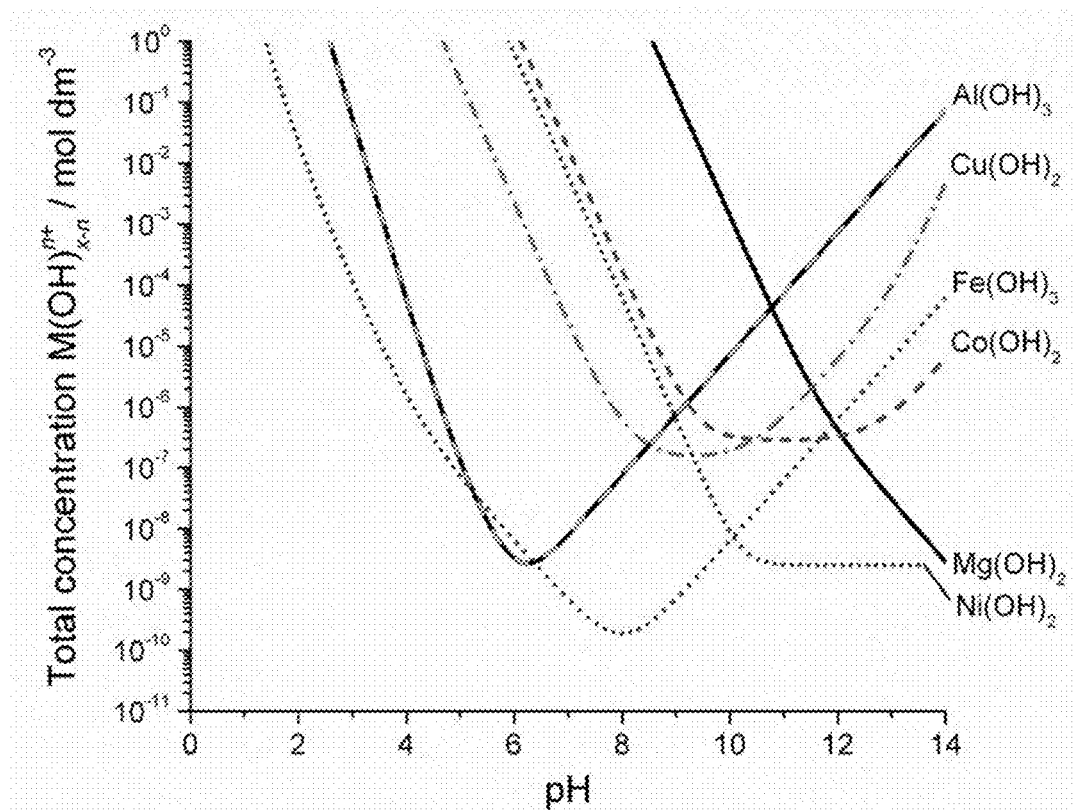
FIG. 8A. Solubility diagram illustrating solubility of various metal hydroxides at varying solution pH values.

As shown in FIG. 8A, the solubility of aluminum hydroxide decreases significantly as pH increases above 3 (e.g., 6 orders of magnitude solubility drop between pH 3 and 5). While not shown, iron (II) hydroxide ($Fe(OH)_2$, or "ferrous" hydroxide) has a higher solubility in this pH range. This suggests that aluminum hydroxide ($Al(OH)_3$) may be precipitated without substantial precipitation of iron ions by raising the pH above 3 until about 5 (e.g., from a pH of about 1 or 2 at the end of dissolution). Similarly, phosphates of iron or aluminum may also be precipitated without necessarily precipitating substantial quantities of iron for similar reasons. In some cases, colloidal silica may also be removed by raising the solution pH (e.g., by flocculation along with precipitation of other species). Titanium hydroxide, if present will also precipitate in a similar pH range, and may also be separated and removed from the solution.

It is generally desirable to raise the pH of the dissolved-ore solution without adding new elements into solution (as any such new elements may further affect and/or complicate other processes). Therefore, in some embodiments, metallic "accessory iron" may be used to raise the solution pH sufficiently to precipitate these impurities.

As the pH rises with additional consumption of accessory iron (i.e., by reacting with acid to form hydrogen gas), phosphorus will tend to precipitate predominantly as an aluminum phosphate salt, so iron is not necessarily consumed when removing phosphorous.

$$Al^{3+}_{(aq)} + PO_4^{3-}_{(aq)}(\text{at pH} = 1) \rightarrow AlPO_{4(s)}(\text{at pH} = 3) \quad (EQ\ 9)$$

For the metal cations like aluminum, iron displaces the cation in solution to precipitate the metal as a hydroxide. In a system designed for producing substantially pure iron, the quantity of an impurity may be expressed in terms of the molar ratio of the impurity to iron. For example, for each mole of aluminum to be removed, 1.5 moles of accessory iron must be used according to equation 10 (using sulfuric acid as a non-limiting example):

$$Al_2(SO_4)_{3(aq)} + 3Fe + 6H_2O \rightarrow 2Al(OH)_{3(s)} + 3FeSO_{4(aq)} + 3H_2 \quad (EQ\ 10)$$

Water is consumed and hydrogen gas is generated by this reaction. The removed protons were acidic due to hydrolysis from the cation (equation 11 below). In some cases, at least a portion of the evolved hydrogen gas may be collected and used in another process within the system as described herein.

$$Al^{3+} + H_2O \rightarrow AlOH^{2+} + H^+ \quad (EQ\ 11)$$

In some cases, it may be beneficial to remove impurities by iron addition only to the portion of the iron-rich acidic solution to be used for iron electroplating (i.e., the portion of the solution to be used as plating catholyte). Therefore, in the case in which an acid regenerator is used and electrolyte is divided into two portions for the electroplating step, only the portion designated as the plating cell catholyte (e.g., about ⅓ of the electrolyte exiting the acid regenerator) may be treated by addition of accessory iron metal.

As metallic iron is dissolved in the solution, it will also convert any dissolved ferric iron ($Fe^{3+}$) to ferrous iron ($Fe^{2+}$). For example, 0.5 mole of metallic iron will be consumed for each mole of ferric sulfate converted to ferrous sulfate according to Equation EQ 12 (as an example with a sulfuric acid case):

$$Fe_2(SO_4)_3 + Fe \rightarrow 3FeSO_4 \quad (EQ\ 12)$$

Dissolved metallic iron can also consume remaining acid in the treated electrolyte in a 1-to-1 molar ratio according to Equation EQ 13:

$$H_2SO_4 + Fe \rightarrow FeSO_4 + H_2 \quad (EQ\ 13)$$

Therefore, a quantity of accessory iron to be added to a quantity of electrolyte may be determined based on measured, estimated, or assumed quantities of impurities (e.g., aluminum and/or phosphorous in particular), remaining ferric ions, and remaining acid. It may be beneficial to expose the electrolyte to excess accessory iron (i.e., more metallic iron than is required to achieve the reactions of Equations EQ 10, EQ 11, EQ 12, EQ 13, so that some metallic iron remains after those reactions have proceeded as far as they will). If needed, accessory iron can be separated from the precipitated impurities through any of a variety of separation methods, including flotation, filtration and magnetic separation. Similarly, the precipitated impurities may be removed from the solution by any suitable solid-liquid separation devices or techniques. In some embodiments, the treated solution may be pumped out of the vessel where the impurity removal (and/or accessory iron) treatment is performed, leaving iron metal and precipitated impurities in the tank for the next treatment cycle.

Figure 8B:
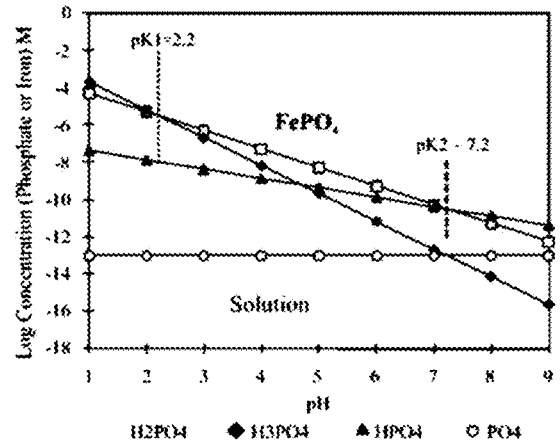
FIG. 8B.
Figure 8C:
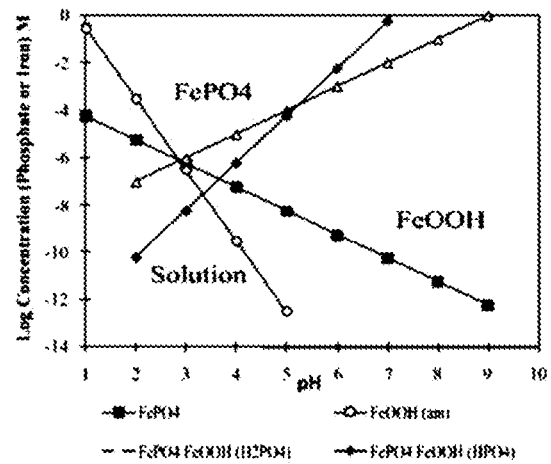
FIG. 8C: Solubility diagrams illustrating solubility of various iron phosphates and iron oxides.
Figure 8D:
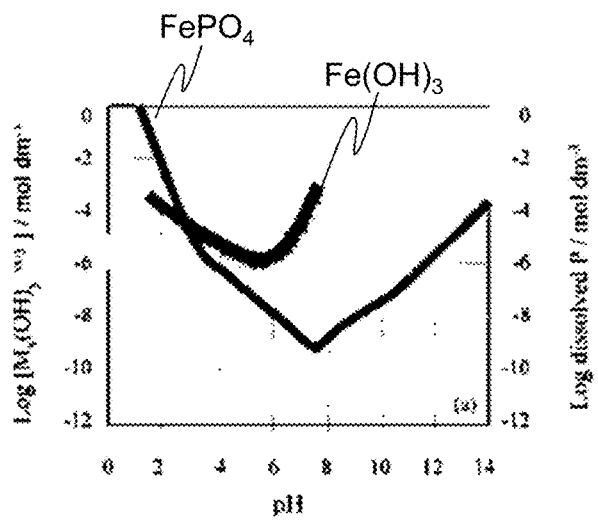
FIG. 8D. Solubility diagram illustrating solubility of iron phosphate and ferric iron hydroxide.
Figure 8E:
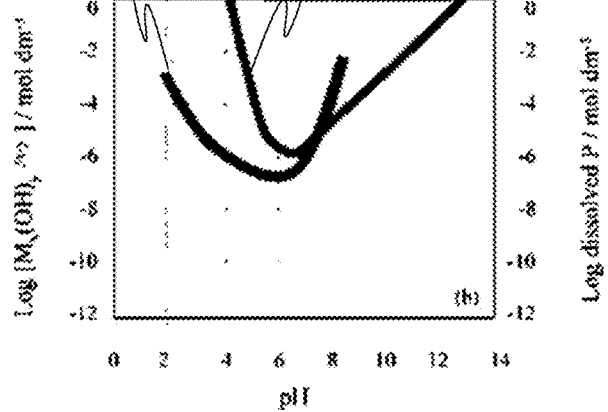
FIG. 8E: Solubility diagram illustrating solubility of aluminum phosphate and aluminum hydroxide.

Even if aluminum is not present, phosphorous may be effectively removed by precipitation of iron phosphates as suggested by the solubility diagram in FIG. 8B and FIG. 8C which shows solubility of various iron phosphate and oxide compounds. At the beginning of the treatment phase, there is always a residual ferric concentration. As seen in FIG. 8C, ferric phosphate has very low solubility and hence, as soon as pH increases due to reaction in EQ. 7, iron phosphate will precipitate out of the solution.

Various other methods of managing or removing impurities may be used depending on the type of impurity. For example, insoluble impurities may simply be removed as solids by filtration, gravity, centrifugal separation, or other mechanical separation. Soluble impurities that could interfere with iron plating may be removed by forming compounds with other materials such as iron (including during an "accessory iron" treatment), aluminum, or may simply be allowed to deposit along with the iron if the concentration of such impurities in the final plated material is acceptable (which may depend on the particular product or end use of a produced iron material).

Soluble impurities that are harmless to plating may be simply left in solution. Eventually, concentrations of such impurities may build up to a point that they can be removed by extracting water. Alternatively, infrequent impurities may eventually build up in concentration (e.g., over enough dissolution and plating cycles) sufficiently to be removed by precipitation due to a pH shift or by other methods. In still other embodiments, an electrolyte solution may simply be replaced when such impurities build to sufficient levels.

Iron Plating Subsystem

In some embodiments, the one-step iron conversion process described above with reference to FIG. 1A and FIG. 1B may be adapted for use in converting ferrous iron produced in the acid regeneration cell 104 into metallic iron in a second electrochemical cell configured differently than the plating cell 132 described above. In such embodiments, the ferrous iron solution from the acid regeneration cell 104 may be used to plate Fe metal at the cathode of an electrochemical plating cell (not illustrated), while oxidizing water at the anode of the same plating cell. An anion exchange membrane may be used here so that acid is generated on the anode side (i.e. water oxidation side, thereby minimizing acid reactions with the plated iron). However, such embodiments have the disadvantage that the water-splitting electrode may be relatively expensive and therefore most economically operated at high current density, while the iron plating reaction proceeds relatively slowly and cannot be effectively driven at high current densities.

In some embodiments, a lead oxide electrode may be used as a relatively low cost oxygen evolution anode in a plating cell, which may make lower current-density operation more economically practical. In an alternative embodiment, the plating cell anode may be a hydrogen oxidation anode configured to oxidize hydrogen gas provided from a source such as a hydrogen storage device or directly from a water electrolyzer (e.g., a PEM, AEM or alkaline water electrolyzer). Another approach to decreasing cost of the plating cell is to couple the iron deposition (ferrous reduction) reaction with a different oxidation reaction, such as oxidizing a portion of the ferrous solution from the dissolution subsystem.

With reference to FIG. 6 (but also to other figures), some embodiments of an iron conversion system 100 may include a plating subsystem 130 configured to produce iron metal from the aqueous iron solution produced in the dissolution subsystem. As described above, the process of dissolution in the dissolution subsystem 102 may be operated until the iron concentration in the solution reaches a desired value. At that point (or after subsequent treatment such as an "accessory iron" treatment), the solution is preferably a predominantly ferrous solution. In some embodiments, the solution may then be divided into two separate streams representing a catholyte and an anolyte to be used in a plating cell 132.

The solution exiting the dissolution subsystem 102 may be transferred to a plating subsystem 130 via a transfer system 164. The transfer system 164 is illustrated as a simple conduit but may include any number of flow control or process control devices as needed. Similarly, at the end of a plating process some spent electrolyte solution(s) may be transferred from the plating subsystem 130 to the dissolution subsystem 102 at transfer 166, which may also include any number of flow control or process control devices as needed.

In some embodiments, a solution entering a plating subsystem 130 may be divided into catholyte and anolyte streams in approximately one-third and two-thirds proportions of the original liquid volume entering the plating subsystem 130. The one-third volume may be directed to and stored in one or more catholyte storage tanks 142, and the two-thirds volume may be directed to and be stored in one or more separate anolyte storage tanks 144. For simplicity of description, it is assumed herein that there is one catholyte storage tank and one anolyte storage tank. In various embodiments, the two tanks 142, 144 may have different volumes, or may have the same volume and the volumes may be used at different volumetric rates. The catholyte 142 and anolyte 144 tanks may be fluidically connected to the cathode chamber 134 and anode chamber 138, respectively, of an electrochemical plating cell 132.

The plating cell 132 may include a cathode chamber 134 having a cathode electrode 136, a membrane 150 and an anode chamber 138 having an anode electrode 140. The two electrodes 136, 140 are separated by a membrane 150, which may be a PEM, AEM, or microporous separator. Additional components typical of an electrochemical cell or stack may include current collectors, bipolar plates, flow channels, end plates, etc., depending on a chosen plating cell configuration. Example plating cell configurations are described elsewhere herein, but any plating cell configuration may be used.

Figure 4:
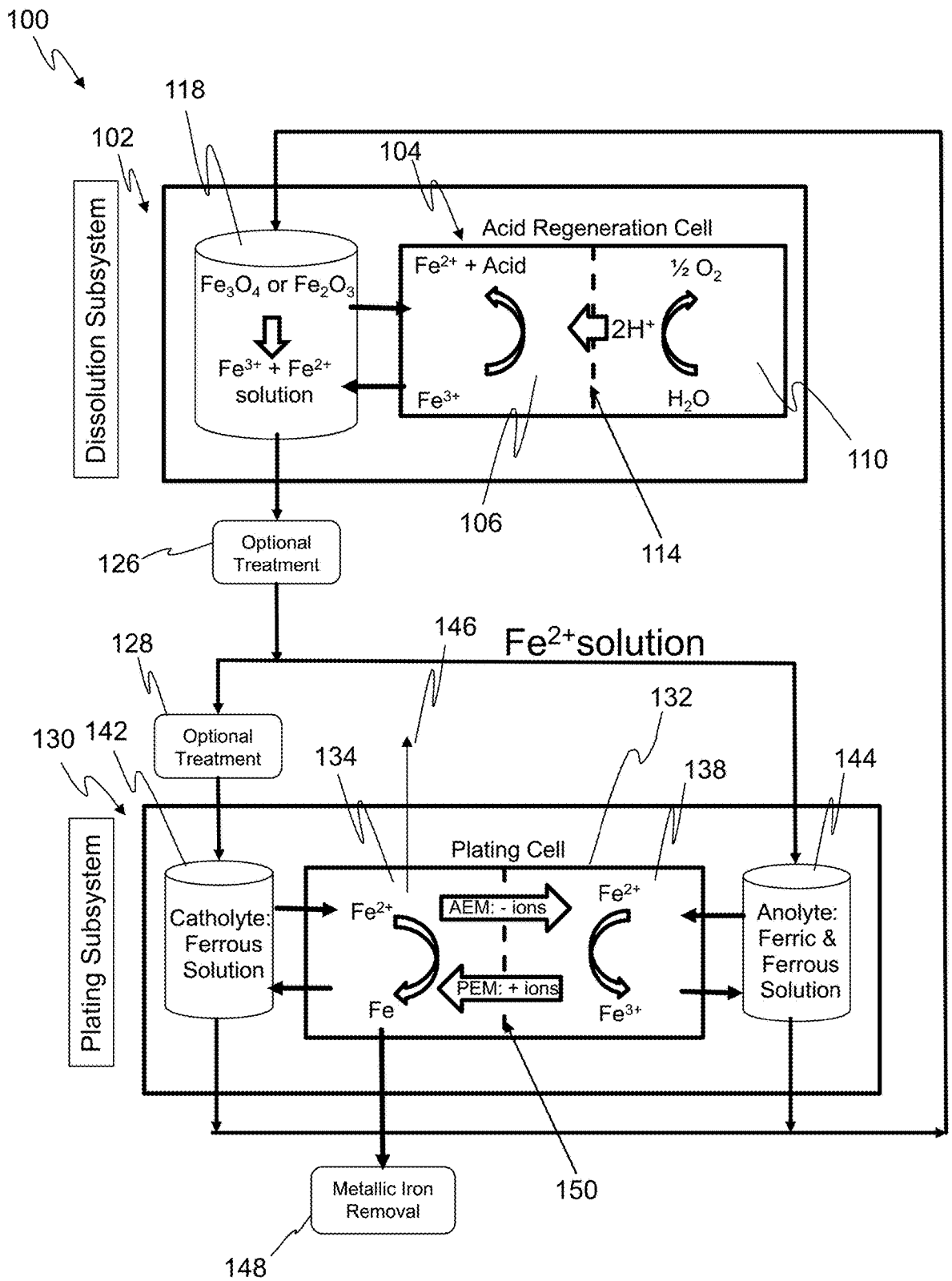
FIG. 4. Schematic diagram illustrating a two-step iron conversion system with various sub-systems.
Figure 5:
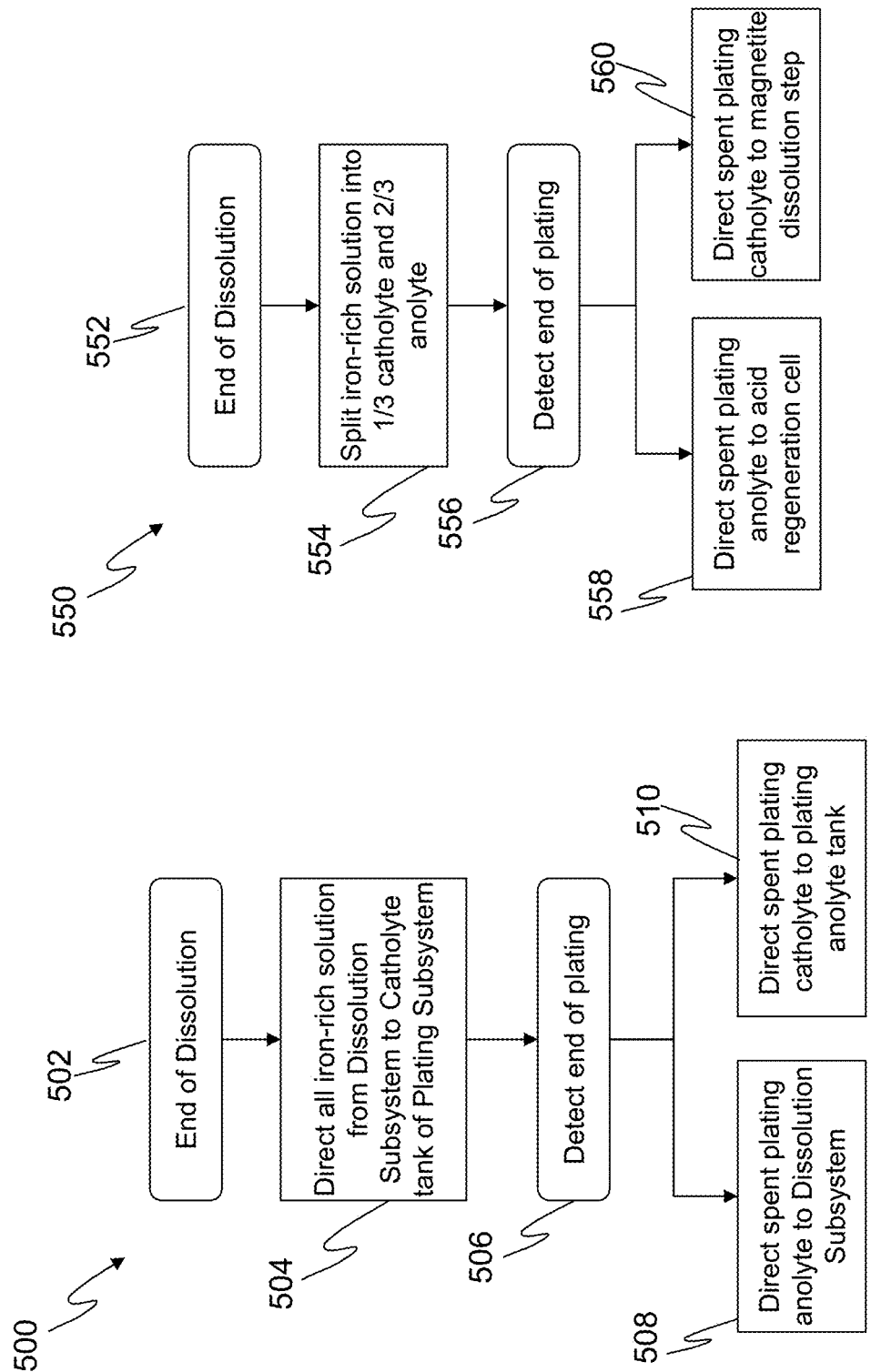
FIG. 5A and FIG. 5B. Schematic process flow diagrams illustrating alternative processes for allocating an iron-rich acidic solution from a dissolution subsystem to anolyte and catholyte tanks of a plating subsystem.

As shown in FIG. 4, a plating 132 cell may be configured to plate metallic iron at a cathode electrode 136 while oxidizing a portion of the $Fe^{2+}$ ions to $Fe^{3+}$ ions. In this configuration, the cost of an oxygen evolution anode is avoided by using a very low-cost carbon or graphite anode material.

When an electrical current is applied across the plating cell, iron metal is electroplated on the cathode by reducing ferrous ions according to:

$$Fe^{2+} + 2e \rightarrow Fe \qquad (EQ\ 14)$$

Simultaneously, the anolyte stream of ferrous solution may be oxidized to ferric on the anode of the plating cell, according to:

$$2Fe^{2+} \rightarrow 2Fe^{3+} + 2e \qquad (EQ\ 15)$$

Combining (EQ 14) and (EQ 15) gives the overall plating cell reaction:

$$3Fe^{2+} \rightarrow 2Fe^{3+} + Fe \qquad (EQ\ 16)$$

The iron electroplating reaction requires two electrons per ferrous ($Fe^{2+}$) ion while the oxidation of ferrous to ferric ($Fe^{3+}$) only requires one electron per ion. To achieve charge balance, there is a need for twice as much ferrous ions on the anode side 138 of the plating cell 132 than on the cathode side 134. This is the reason for splitting the ferrous solution entering the plating subsystem into ⅓ (catholyte) and ⅔ (anolyte) portions of the initial ferrous solution from the acid regeneration cell 104. This implies that the flow rate of the anolyte through the anode side 138 of the plating cell 132 may be double of that of the catholyte through the cathode side 134. In some embodiments, the anolyte flow rate may be more than twice the catholyte flow rate. In some embodiments, the anolyte flow rate may be less than twice the catholyte flow rate.

In some embodiments, ferrous solution entering the plating subsystem 130 may be divided into anolyte and catholyte portions in different proportions, depending on efficiency of one or both electrodes, total iron concentration, or other factors. Therefore, in various embodiments, the ferrous solution entering the plating subsystem may be divided into catholyte and anolyte portions in catholyte/anolyte ratios from about 90%/10% to about 20%/80%, optionally 70%/30% to about 30%/70%, and in some particular embodiments catholyte/anolyte ratios may include 80%/20%, 70%/30%, 75%/25%, 70%/30%, 65%/45%, 60%/40%, 65%/35%, 50%/50%, 45%/65%, 40%/60%, 35%/65%, 33%/67%, 30%/70%, 25%/75%, 20%/80% (all values may vary by +/−3%).

The plating anolyte and catholyte may be recirculated between their respective tanks 144, 142 and their respective half-cell chambers 138, 134 in the plating cell 132 for any number of plating cycles (where one plating cycle comprises fully replacing a volume of anolyte and catholyte in the plating cell). In some embodiments, the fluid circulation of plating anolyte and plating catholyte may be continuous when electrical current is applied.

In some embodiments, plated iron may be removed at 148 from the cathode chamber 134 and/or cathode substrate, and plating electrolytes may be recycled to the dissolution subsystem 102 for re-use in further dissolution and acid regeneration operations. In some embodiments, a plating process may be complete once a desired quantity of iron has been plated in a batch mode. In other embodiments, plated iron may be continuously removed from the plating cathode chamber 134, and electrolytes may be replaced once reactants (e.g., $Fe^{2+}$) are consumed beyond a desired point.

In various embodiments, the plating cathode half-cell 134 may be configured to plate iron in any manner allowing for removal of the plated iron material. Various plating and metal removal methods are used in other hydrometallurgical plating operations, any of which may be adapted for use in this iron plating system.

Depending on a chosen method of plating and removing iron from the cathode half-cell, the plating cell may be operated in a batch mode, in which plating is stopped once a desired quantity of iron has been plated so that the iron may be removed. Alternatively, the plating cell may be configured such that plating operates in a continuous mode with iron being removed from the cathode chamber continuously. In some embodiments, continuous plated iron removal may be similar to configurations used in some conventional zinc and copper electrowinning systems.

For example, iron may be plated as a plate or sheet onto a solid metal or graphite substrate (e.g., steel, copper, lead, zinc, nickel, or other material coated or plated with one or more of these or other metals or their alloys). In various embodiments, the plating cathode electrode and/or substrate 136 may be removable from the cathode chamber 134, or may be configured such that iron may be removed from the cathode chamber 134 without removing the cathode electrode 136 or substrate. In some embodiments, a substrate may be removable from a cathode electrode. In some embodiments, such a substrate may be substantially flat, and plated iron may be removed in a batch mode by chipping, prying, scraping, bending or otherwise separating a flat iron plate from the substrate. In other embodiments, a substrate may be cylindrical, and plated iron may be continuously removed by rotating the cylinder against one or more knives separating the plated iron as a continuous sheet, wire, strip, or other material. In still other embodiments, iron may be plated onto a continuous belt travelling through a plating cell cathode, and iron may be detached from the belt at a location outside of the cathode chamber. In other embodiments, iron may be plated onto seed particles which may increase in size in a particle growth manner, and the particles may be removed from the cathode chamber by any suitable separation mechanism. Various other iron plating and removal processes may also be used.

In various embodiments, the end of plating may be determined based on a mass of iron plated, a measured remaining concentration of ferrous ions in the plating catholyte, a cell voltage, or other metrics. For example, in some embodiments, a plating cycle may be complete when a target thickness of between about 1 mm and about 10 mm is reached.

Once the plating anolyte and catholyte are substantially depleted of reactants, i.e. of ferrous, the electrolytes may be directed to another process. In some embodiments, the catholyte may have a lower ferrous content than initially, and the anolyte may have predominantly ferric instead of ferrous species. In some embodiments, the spent anolyte and catholyte may be combined and directed back to the dissolution tank or the acid regeneration cell 104 of the dissolution subsystem to be re-used in a new dissolution cycle.

In some embodiments, it may be desirable to maintain at least a minimum concentration of $Fe^{2+}$ ions in the plating catholyte during plating. Experiments have shown that when the plating catholyte ferrous concentration falls below about 0.25 M, plating cell efficiency and plating quality tend to degrade. Therefore, in some embodiments, it may be desirable to maintain a ferrous concentration of at least 0.25 M or more throughout the plating process.

In order to effectively maintain a minimum ferrous concentration and optimally use electrolyte, an alternative approach to establishing anolyte and catholyte volumes for the plating subsystem may be used. For example, in order to maintain a minimum ferrous concentration in the plating catholyte, it may be beneficial to stop plating when catholyte ferrous concentration falls to a low point (e.g., as measured by optical, spectroscopic, or other methods) or when plating cell voltage rises above a set point (e.g., above about 2.4 V, 2.5 V, 2.6 V, 2.7 V, 2.8 V, 2.9 V, or 3 V, in various embodiments), and then using the "spent" catholyte as anolyte in a new plating process.

Figure 13A:
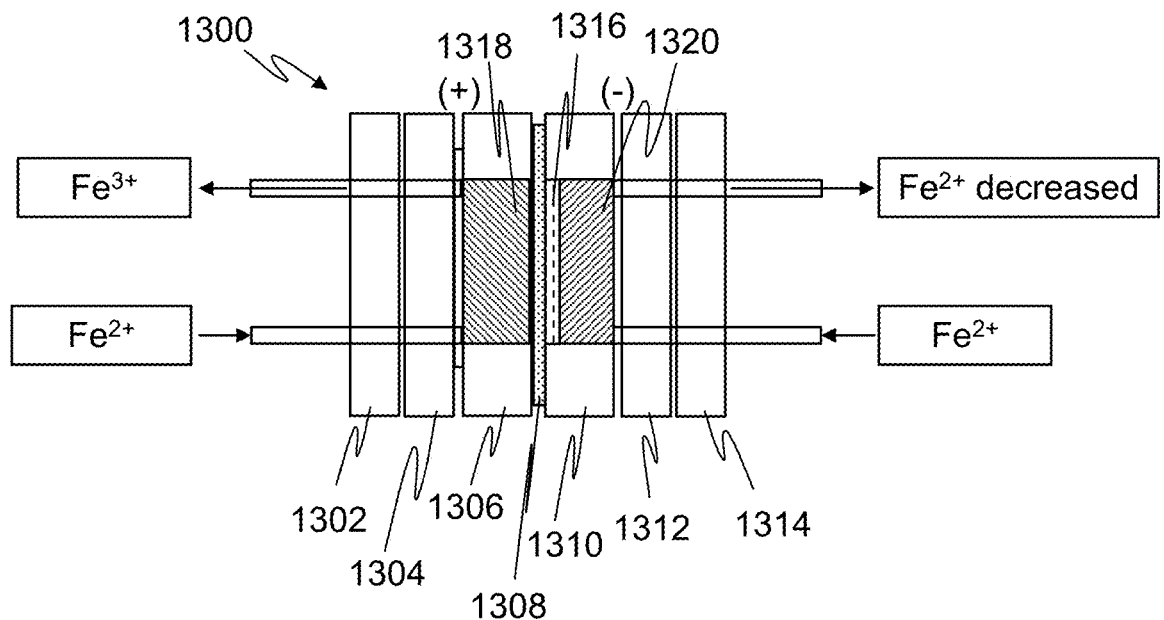
FIG. 13A: Diagram of an exemplary flow cell, according to certain embodiments.
Figure 13B:
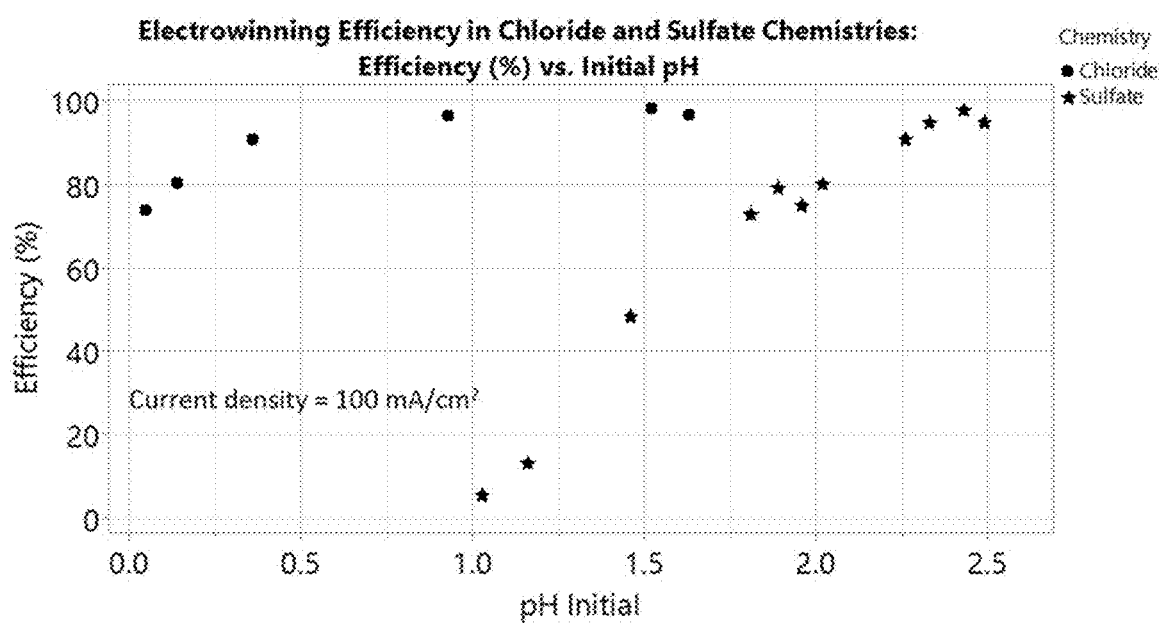
FIG. 13B: Plot of efficiency vs. pH for electrowinning using chloride and sulfate chemistries. Fe plating efficiency is greater than 80% for pH 2 in sulfate chemistry.
Figure 14:
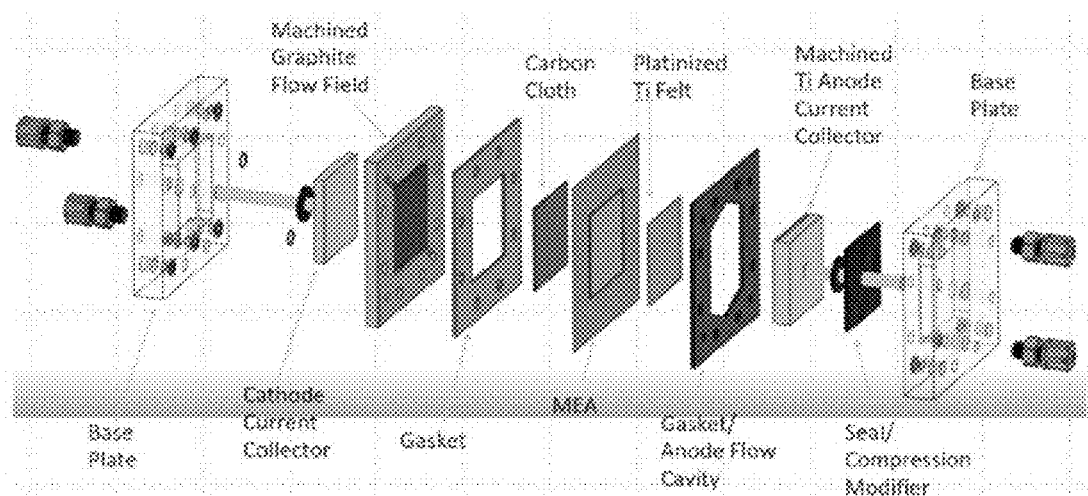
FIG. 14. Diagram of an exemplary acid regeneration cell. For example, this cell can be run at 400 $mA/cm_2$ for a greater than 97% Faradaic efficiency.
Figure 15:
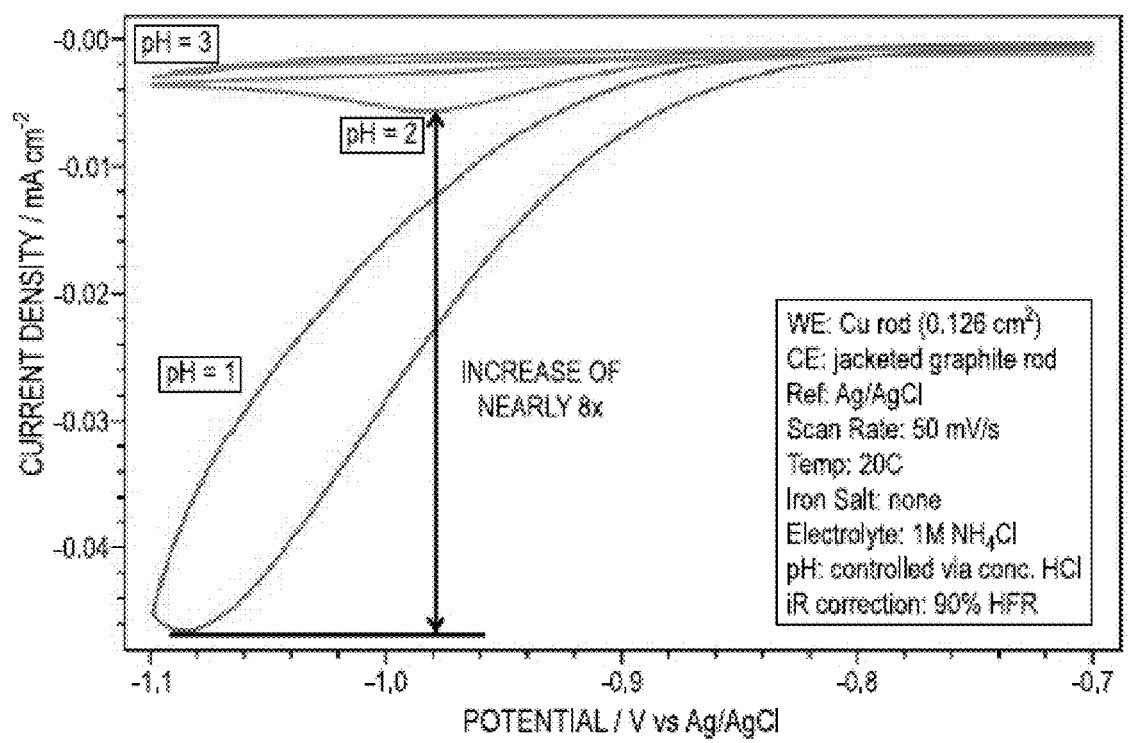
FIG. 15. CV sweep chart showing that, in hydrochloric acid chemistry, hydrogen evolution occurs at a markedly higher rate at pH below 2, with pH controlled via concentration of HCl.
Figure 16A:
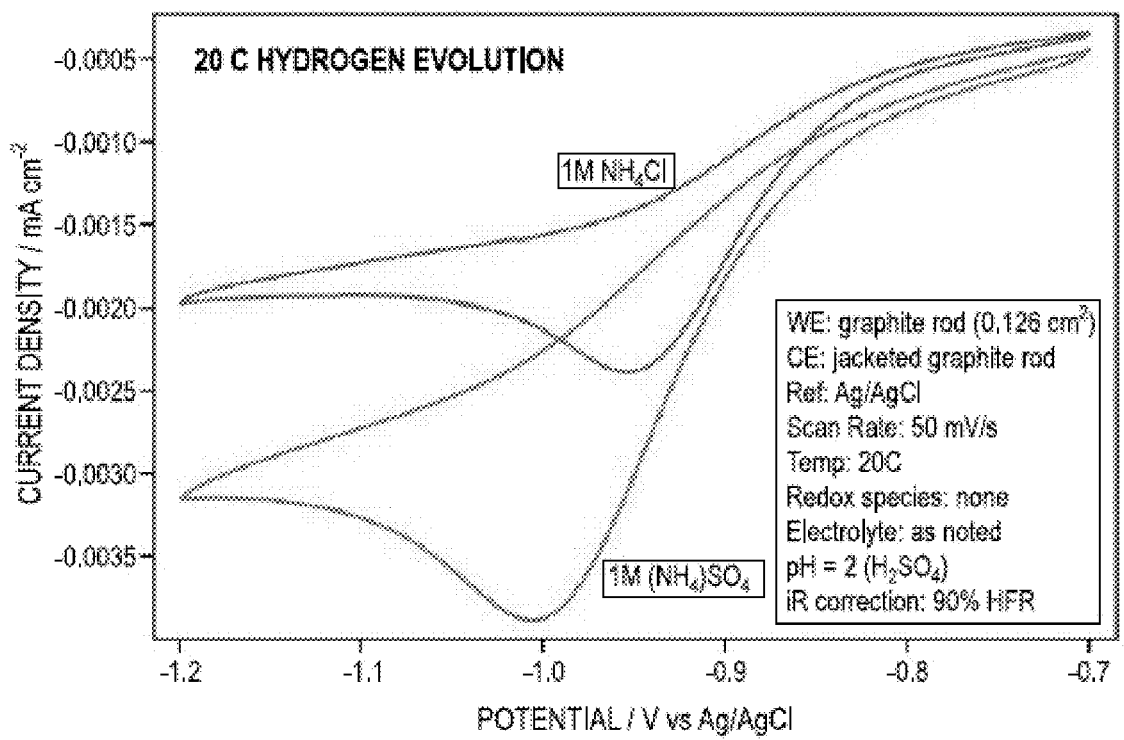
FIGS. 16A-16B. Plots of current density vs. voltage at 20 C (FIG. 16A) and at 60 C (FIG. 16B) in presence of 1M $NH_4Cl$ (FIG. 16A) or 1M $(NH_4)SO_4$ (FIG. 16B), with the parameters summarized in the insets. Chlorides have lower hydrogen generation than sulfates at room temperature, and have similar rate at 60 C.
Figure 16B:
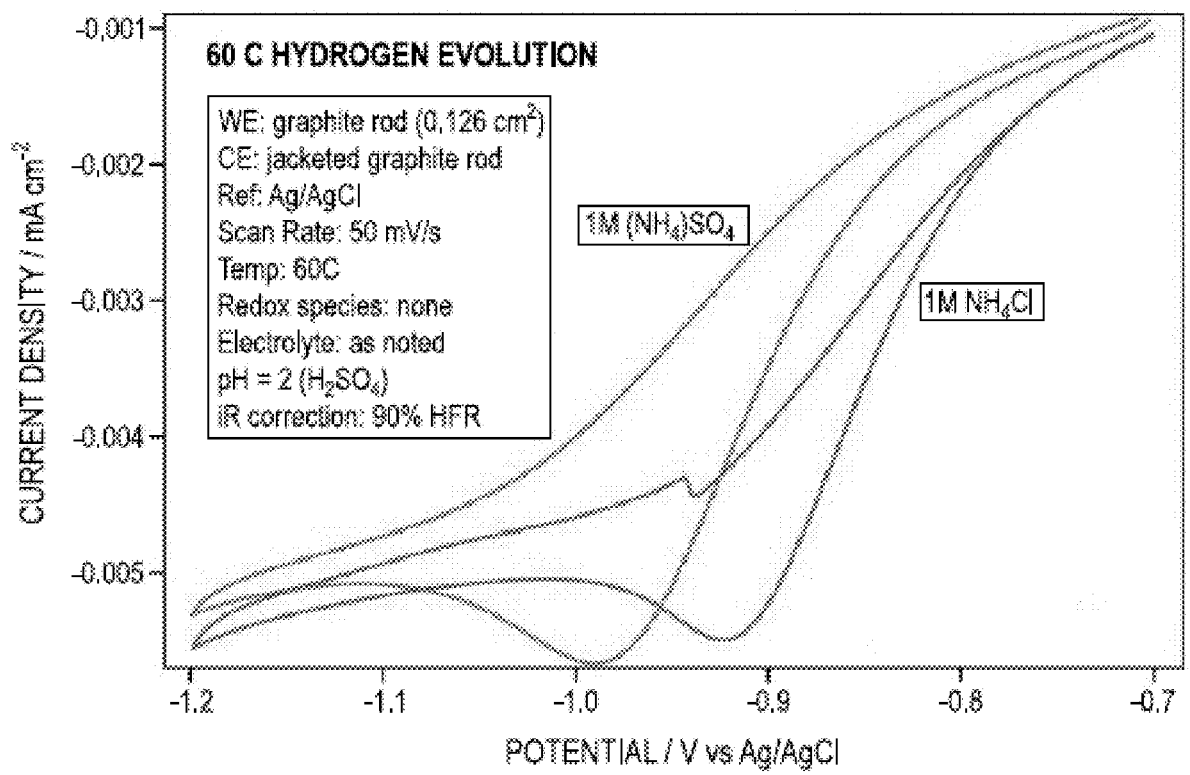
Figure 17A:
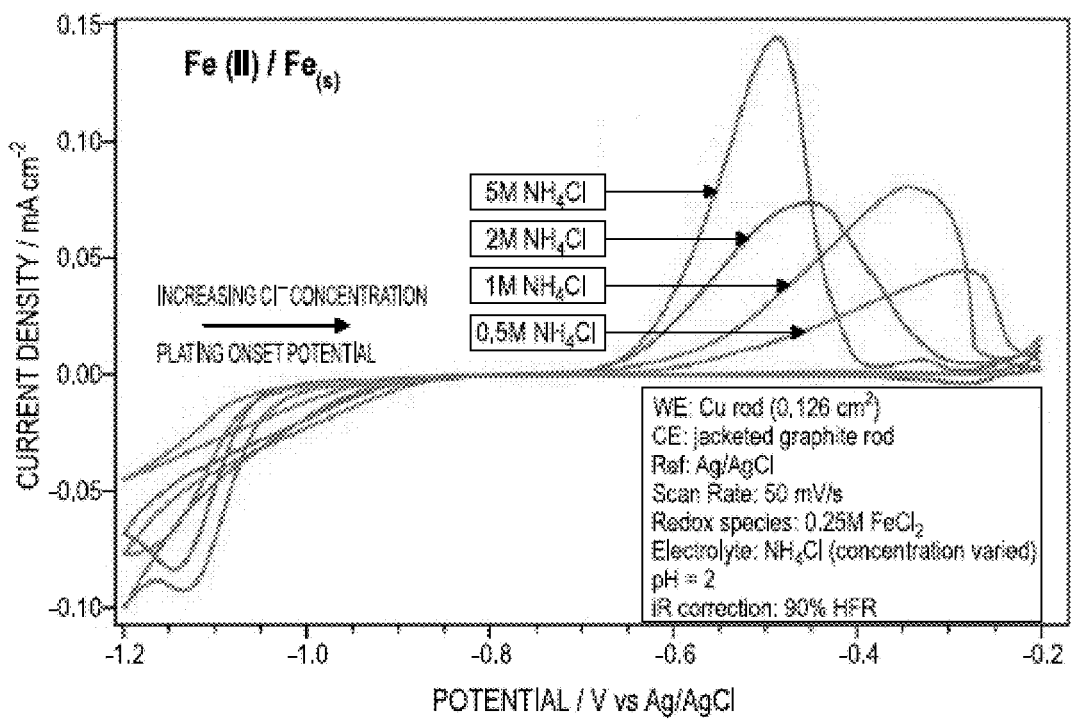
FIGS. 17A-17B. Plots of current density vs. voltage for Fe(II)/Fe(s) (FIG. 17A) and Fee(III)/Fe(II) (FIG. 17B) chemistries, with certain parameters summarized in the insets. Increasing chloride concentration improves the reversibility for both the Fe(II)/Fe$_{(s)}$ and the Fe(III)/Fe(II) couple.
Figure 17B:
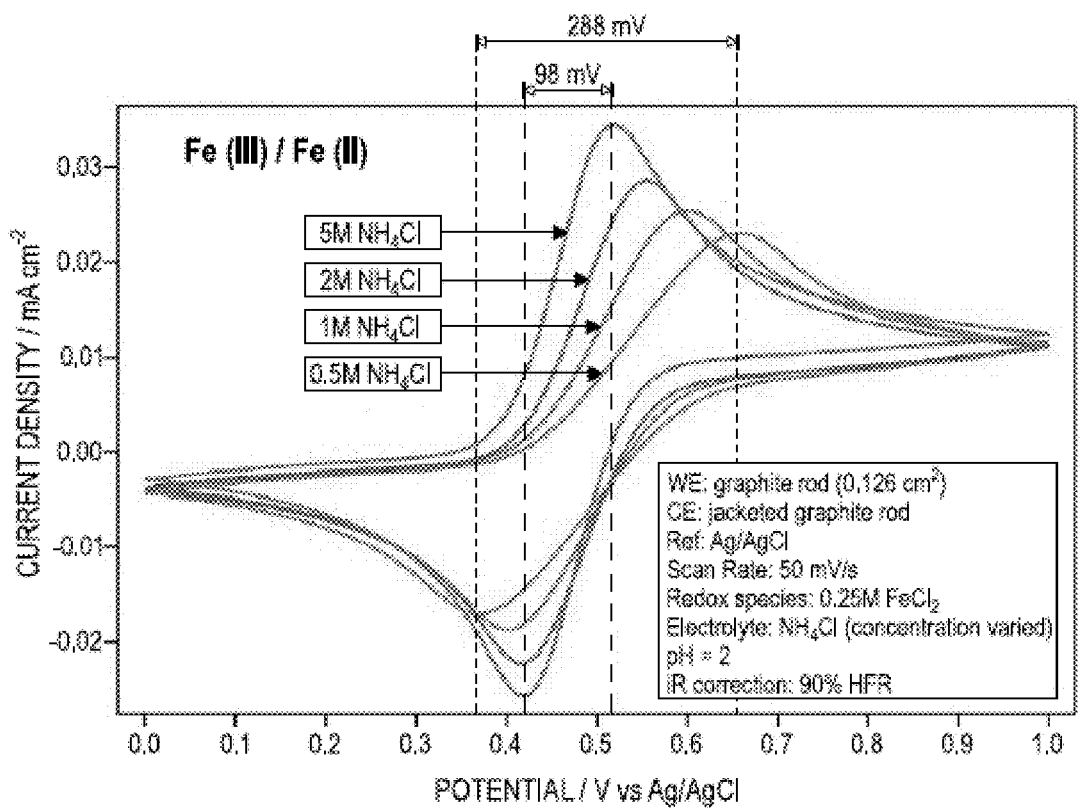

FIG. 13A illustrates an experimental plating cell 1300 comprising compression end plates 1302 and 1314, current collecting plates 1304, 1312, electrode-carrying plates 1306 and 1310 supporting an anode 1318 and a cathode electrode 1320 with a gap 1316 into which plated iron may expand. A separator 1308 divides the anode-containing chamber from the cathode-containing chamber.

FIG. 5A and FIG. 5B illustrate embodiments for storing and using plating anolyte and plating catholyte solutions which may advantageously facilitate maintaining at least a minimum ferrous concentration in the plating catholyte while producing a ferric-rich solution to be returned to the dissolution subsystem at the completion of plating. FIG. 5A illustrates a process 500 in which, after the end of a dissolution process 502 (and optionally after performing an "accessory iron" step), 100% of the iron-rich solution may be directed to the plating catholyte tank while the plating anolyte tank comprises "spent" catholyte from a previous plating cycle at block 510. A plating process may then be performed, plating iron from the catholyte and oxidizing ferrous to ferric in the anolyte. At the end of the plating process 506, the spent anolyte may be returned at 508 to the dissolution subsystem and the spent catholyte may be directed at 510 to the plating anolyte tank for the next plating cycle. In various embodiments, "directing the spent catholyte to the anolyte tank" may comprise actually moving the spent catholyte to a separate tank, or merely changing controls (e.g., valves, pumps, etc.) to designate the tank containing spent catholyte as a new anolyte tank.

FIG. 5B illustrates an alternative process 550 in which, after the end of a dissolution cycle 552 (and optionally after performing an "accessory iron" step), the iron-rich solution from the dissolution subsystem may be divided at 554 into approximate ⅓ catholyte and ⅔ anolyte quantities, and plating may proceed as described above. At the end of plating 556, the spent plating anolyte (which contains predominantly ferric) may be directed at 558 back to the acid regenerator of the dissolution subsystem, and the spent plating catholyte may be directed to a hematite dissolution step near the end of the dissolution process in the dissolution subsystem at block 560. In an embodiment, for example, anolyte and catholyte are combined together and at least a portion of the combined solution is sent to the dissolution subsystem/acid regeneration cell.

In some embodiments, the electrolytes and solutions in either the dissolution subsystem and the plating subsystem may contain dissolved iron species, acid and additionally inert salts serving as supporting electrolyte to enhance the electrolyte conductivity, which may be particularly beneficial at low ferrous concentrations. Supporting salts may include any electrochemically inert salt such as sodium chloride, potassium chloride, ammonium chloride, sodium sulfate, potassium sulfate, ammonium sulfate, or others, or combinations of salts. The concentration of the supporting salts in the solution, if used, may range from about 0.1 to about 1 M.

In various embodiments, a ferrous-oxidizing anode of the plating cell may be any carbon or graphite based electrode such as carbon/graphite felt, paper or cloth or any electrode material stable in the ferric/ferrous salt environment. The cathode of the plating cell, which is the plating electrode may be any conductive substrate suitable for electroplating including but not limited to sheet, plate, mesh, etc. and may be made of any material including carbon, graphite, steel, stainless steel, copper, zinc, titanium, or alloys or other combinations of these or other materials. Additionally, the substrate may comprise a multilayer structure with a core made of one type of material (e.g., a metal) for structural purpose and the surface made of another type of material for compatibility with the plating process and/or the acid solution. Examples of such multilayer structures include, copper-cladded or aluminum-cladded steel or stainless steel, copper plated steel or stainless steel or other multilayer materials.

Figure 19:
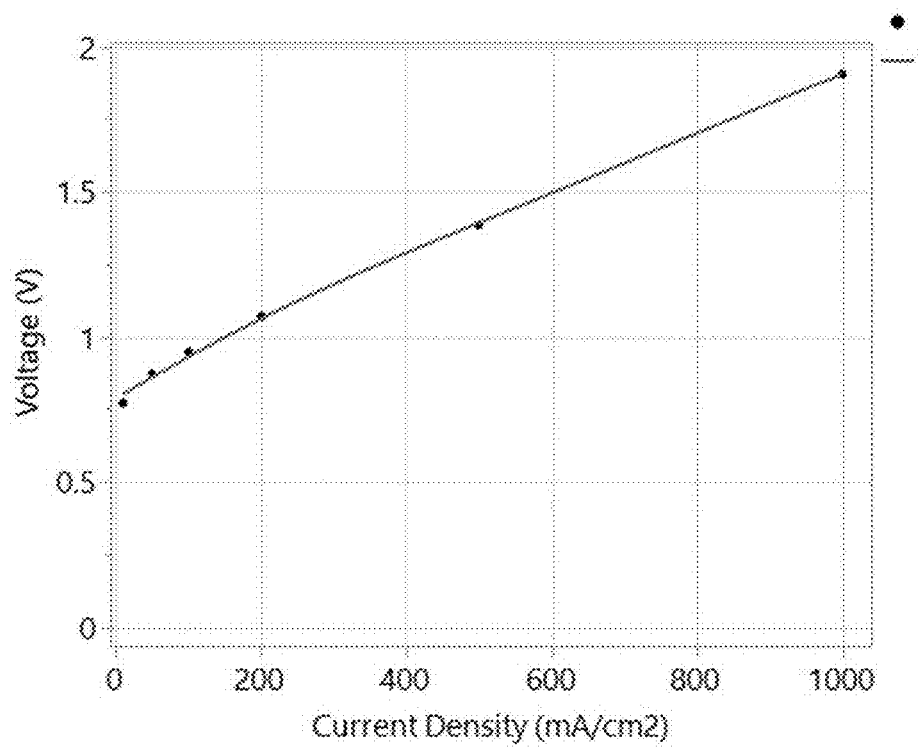
FIG. 19. Example of acid regeneration cell current voltage curve.
Figure 20:
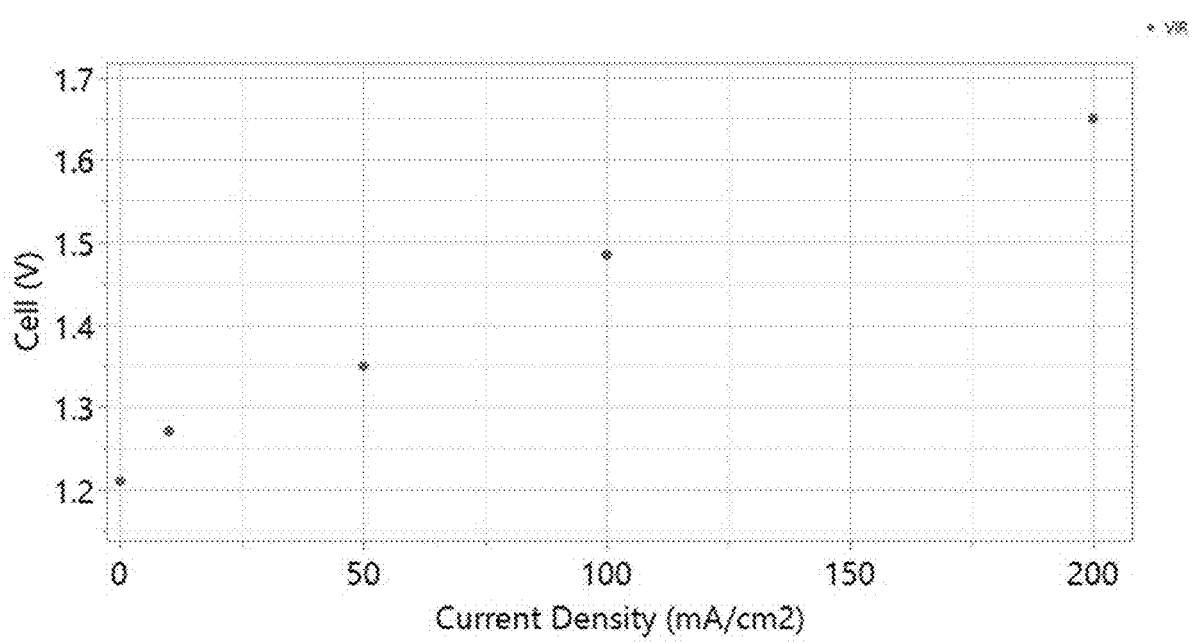
FIG. 20. Example of a plating cell current-voltage curve.

FIG. 19 illustrates an experimentally determined relationship between current density (measured in mA/cm$^2$) and cell voltage for an acid regeneration cell 104. FIG. 20 illustrates an experimentally determined relationship between current density (measured in mA/cm$^2$) and cell voltage for an iron plating cell. As can be seen, the acid regeneration cell can be operated at much higher current densities before reaching the cell voltage achieved by the plating cell at a much lower current density. The water-splitting reaction in the acid regeneration cell may also typically use more expensive catalysts, leading to increased capital expenses for such a cell. These factors suggest that it may be more cost-efficient to operate the acid regeneration cell at higher current densities to get value from the more-expensive cell. On the other hand, the iron plating reaction may be best performed at relatively low current densities to achieve plated iron with desired properties. Because the iron plating cell also typically uses less-expensive electrodes, operating the plating cell at a lower current density is more economically viable. In various embodiments, the current density applied to a plating cell may be in a range of about 20 to 300 mA/cm$^2$.

In various embodiments, the plating catholyte and plating anolyte tanks may be maintained at temperatures between 40 to 80° C., and the plating cell may be operated at a similar range of temperature.

As will be understood with reference to the drawings, the de-coupling of the feedstock dissolution and acid-regeneration step from the iron plating (deposition) step provides substantial advantages at little or no theoretical cost, since the two processes together fundamentally consume the same total theoretical energy as the one-step iron conversion process described above. Relatedly, decoupling of the dissolution tanks from the plating anolyte and plating catholyte tanks may provide further advantages to managing the different reaction rates of the two processes.

In various embodiments, the iron plating cell(s) may be advantageously operated at a current density of between about 20 mA/cm$^2$ to about 500 mA/cm$^2$, optionally 20 mA/cm$^2$ to about 200 mA/cm$^2$ and optionally 20 mA/cm$^2$ to about 100 mA/cm$^2$, and in some embodiments between about 50 mA/cm$^2$ and about 300 mA/cm$^2$ optionally 50 mA/cm$^2$ to about 200 mA/cm$^2$ and optionally 50 mA/cm$^2$ to about 100 mA/cm$^2$, and in some embodiments between about 75 mA/cm$^2$ and about 250 mA/cm$^2$, optionally 75 mA/cm$^2$ to about 200 mA/cm$^2$ and optionally 75 mA/cm$^2$ to about 100 mA/cm$^2$. In an embodiment, the iron plating cell(s) may be operated at a current density of less than or equal to 500 mA/cm$^2$, optionally, less than or equal to 400 mA/cm$^2$, optionally, less than or equal to 300 mA/cm$^2$, optionally, less than or equal to 200 mA/cm$^2$, optionally less than or equal to 100 mA/cm$^2$. In some embodiments, plating current densities may be variable during plating operation depending on process conditions and/or availability of electricity.

Pre-Treatment of Iron Feedstock to Aid Dissolution

Figure 9:
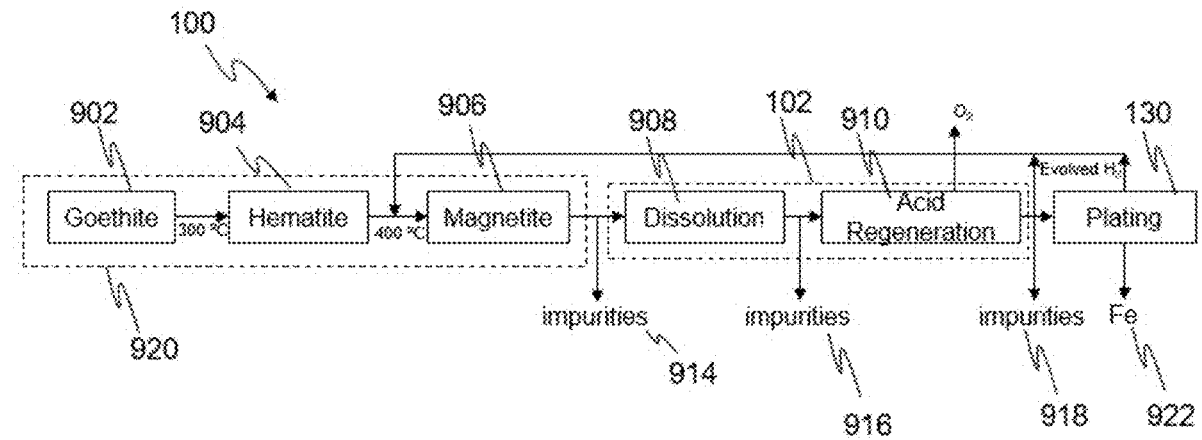
FIG. 9. A process flow diagram showing certain exemplary embodiments, including use of $H_2$ generated during iron electroplating in a process for converting iron oxides such as hematite to magnetite, followed by dissolution of the magnetite coupled with an acid regeneration cell.

FIG. 9 provides a very high-level schematic illustration of an iron conversion system 100 according to some embodiments. The diagram of FIG. 9 shows a pre-treatment section 920, a dissolution subsystem 102 comprising a dissolution section 908, an acid regeneration section 910 (each of which is described above), and a plating section 130 from which iron may be removed 922. Oxygen may be evolved from the acid regeneration section 910, and hydrogen may be evolved from the plating section 130 and/or from the impurity treatment section 918 between the acid regeneration 910 and plating 130 sections. Evolved hydrogen may be returned to a pre-treatment section 920 for use in some pre-treatments. Additional impurity removal steps (e.g., removing solid impurities, organic impurities, undissolved solids, or other impurities) 914 and 916 between the pre-treatment section 920 and the dissolution subsystem 102. As illustrated in FIG. 9, for example, goethite and hematite may be thermally reduced to magnetite, optionally where the reductant is H$_2$ gas evolved during plating. As illustrated in FIG. 9, for example, impurities may be removed at various stages of the process, such as in the dissolution subsystem (e.g., between the dissolution and acid regenerator (first electrochemical cell) and/or such as between the dissolution subsystem and the iron-plating subsystem.

As illustrated, prior to a dissolution subsystem 102, iron feedstocks and particularly some iron ores may be treated or modified in order to facilitate dissolution. In some embodiments, goethite ores 902 may be converted into hematite ores 904, which may be converted into magnetite ores 906. In other embodiments, some portions of ore may be kept in a goethite or hematite form.

Iron feedstock materials may contain iron or iron oxides in one or more of many possible forms, including steel, scrap steel (or scrap iron) mixed with other metals and non-metals, metallic iron of various purities, or iron oxides (including hydroxides and oxyhydroxides). However, some iron oxides commonly present in iron-containing ores dissolve relatively slowly. The following paragraphs pertain to improvements to the dissolution of iron-containing ores.

Different iron oxides have different dissolution kinetics. For example, magnetite (Fe$_3$O$_4$, which contains both Fe$^{3+}$ and Fe$^{2+}$) dissolves much more readily than oxides containing only Fe$^{3+}$ such as hematite (Fe$_2$O$_3$) and goethite (FeO(OH)). The difference in dissolution kinetics can be as much as 40 times between hematite and magnetite, for example. Many commercially available and economically viable iron ores contain large quantities of hematite and/or goethite. Optional embodiments herein include converting at least a portion of iron oxides such as hematite and/or geothite in iron-containing ore into magnetite for the benefit of faster dissolution. Conversion to magnetite may also provide the advantage of allowing for magnetic separation of magnetite-containing materials from less-magnetic forms of iron prior to dissolution in acid. Processing feedstock ore to convert certain iron oxides to magnetite is an optional aspect that may be advantageous for some applications, but is not necessary for the operation of the methods disclosed herein.

In other cases, it has been found that merely heating some hematite or goethite ores to sufficient temperatures even in an air atmosphere (i.e., "air roasting") may cause sufficient morphological change to the ore structures to allow for acid dissolution of those "roasted" ores within an acceptable timeframe (e.g., on the order of about 24 hours+/−6 hours), particularly when dissolution is coupled with an acid regeneration cell 104 as described herein. In some cases, even entirely untreated "raw" ores may be dissolved in acceptable timeframes when coupling dissolution with an acid regeneration cell 104.

Figure 21A:
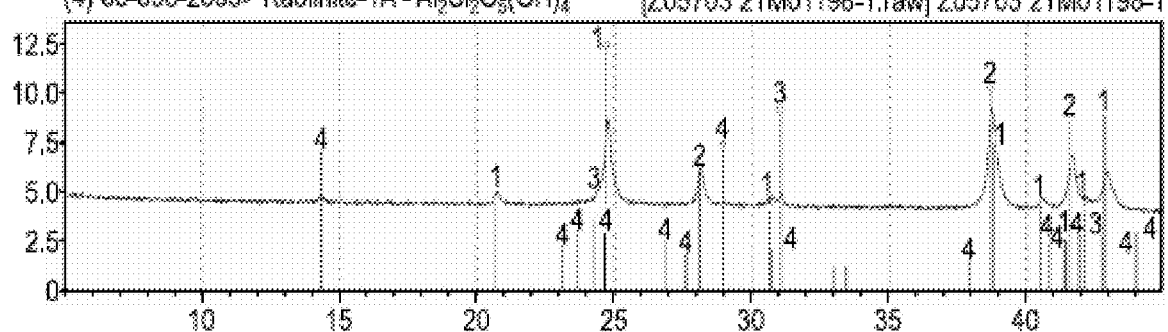
FIGS. 21A-21C. XRD spectrographs illustrating a commercial source of iron ore contains substantial quantities of geothite and hematite (FIG. 21A). After heat treatment at 450° C., the geothite is fully converted to hematite with a higher surface area (FIG. 21B). After heat treatment in a 4% hydrogen atmosphere at 450° C., nearly complete reduction to magnetite is achieved (FIG. 21C).
Figure 21B:
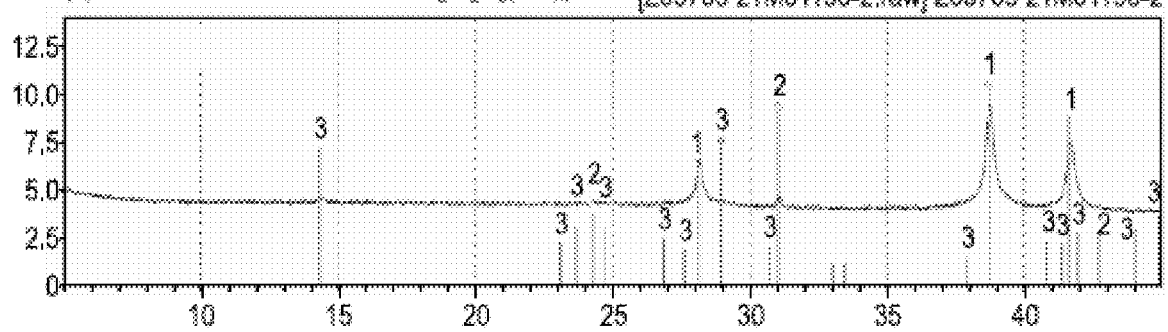
Figure 21C:
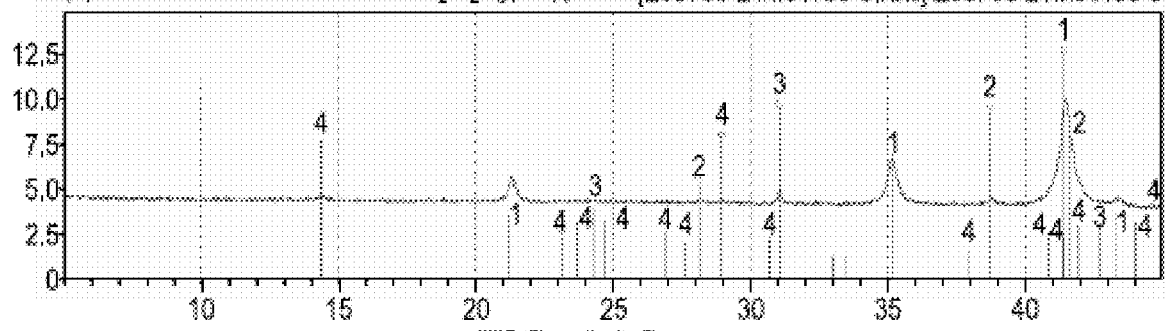

As illustrated in the X-Ray Diffraction patterns shown in FIG. 21A, FIG. 21B, and FIG. 21C, geothite can be converted to hematite by roasting in air at a temperature between about 200° C. and 600° C., and hematite can be thermally reduced to magnetite in hydrogen at a temperature of between 300° C. and 600° C.

In various embodiments, "air roasting" may be performed by heating ore in an air atmosphere to a temperature of between about 200° C. and 600° C. for a duration of about 1 minute to about one hour. In some particular embodiments air roasting may comprise heating ore to a temperature of about 200° C. to about 400° C. In various embodiments, air roasting of ore may include ramp-up time to achieve the target temperature from a starting temperature (e.g., ambient or room temperature). In some embodiments, a time duration of air roasting may begin when the ore material reaches a first target temperature.

In various embodiments, "thermal reduction" may be performed by heating ore in a reducing atmosphere to a temperature of between about 300° C. and 600° C. for a duration of about 1 minute up to about 5 hours, depending on the extent of reduction required and morphology of materials to be reduced. In some embodiments, the reducing atmosphere may comprise a gas mixture of about 1% to about 10% hydrogen gas (or other reducing gas) with a balance of an inert gas such as nitrogen, argon or other inert gas. In some embodiments, much higher hydrogen content gas mixes, even close to 100% $H_2$, may be used. In some embodiments, a thermal reduction atmosphere may also be humidified to contain about 5% to about 10% water vapor.

In some particular embodiments thermal reduction may comprise holding ore at a temperature of about 300° C. to about 500° C., in some specific embodiments to a temperature of about 375° C., 400° C., 425° C., 450° C., 500° C., 525° C., 550° C., or more. In various embodiments, when thermally reducing ore, the ore may be exposed to an air (or other non-reducing) atmosphere during a ramp-up time until a target temperature is reached, so as to conserve hydrogen gas that may be ineffective before reaching the target temperature. In some embodiments, a time duration of thermal reduction may begin when the ore material reaches a first target temperature.

In some embodiments, it may be desirable to stop thermal reduction of iron ore before complete reduction to iron metal, such as by removing the ore, decreasing the temperature, or maintaining a sufficient humidity level to prevent reduction to iron metal. In other embodiments, a portion of the ore may be allowed to reduce to iron metal before proceeding to a dissolution step.

Hematite can be reduced to magnetite using a reductant such as hydrogen, carbon monoxide, syngas, etc. This can be done for many different purposes, particularly for iron beneficiation using magnetic separation. It is contemplated herein that iron-making processes such as electroplating can involve generating a reductant, such as hydrogen, optionally as a side reaction (e.g., via a parasitic reaction or during iron plating) or as a direct result of an intermediate process step (e.g., an "accessory iron treatment" step as described herein).

Reductants, such as hydrogen produced by parasitic or incidental reactions, instead of being wasted, can be captured and used to reduce iron oxides such as hematite and goethite in ore to magnetite. As a result, some of the energy "wasted" by generating a reductant as a byproduct in a different process (e.g., hydrogen from electroplating or other process) can be thus recovered, and concurrently the reduced ore becomes much easier to dissolve.

Generally, according to certain embodiments, at least a portion of the reductant, such as $H_2$, may be a product of any portion, step, or reaction of a process for making iron.

According to certain embodiments, the reductant, such as $H_2$, may be generated prior to and/or external to an iron electroplating process, or electrochemical cells thereof. $H_2$ generation may occur during an electroplating process when, for example, the pH is low (e.g., too much residual acid in an input stream delivered to an electroplating cell), resulting in a reduction of Faradaic efficiency of the electroplating which allows for a side reaction (or, parasitic reaction) that generates $H_2$ concurrently with iron electroplating. Hence, when the plating starts, there may be significant $H_2$ generation until the pH increases to about 2 (or other value, depending on the acid chemistry used). In some embodiments, a plating cell or a similarly-configured polishing cell may be configured to allow for collection and storage of the hydrogen gas generated during such operations.

According to certain embodiments, systems and methods disclosed herein can include a combination of the above approaches as a solution to improve iron dissolution in acids. According to certain embodiments, methods disclosed herein can include use of a product of a side reaction (such as hydrogen), or byproduct, in the iron making process for the conversion of non-magnetite iron ore, or non-magnetite iron oxide compounds in an iron-containing ore, into magnetite to enhance dissolution kinetics. According to certain embodiments, methods disclosed herein can include the combination (i) reduction of iron oxide (e.g., an oxide ore) to magnetite with (ii) dissolution of the resulting material (magnetite) using acid.

According to certain embodiments, methods disclosed herein can include starting material being an iron-containing ore (e.g., ore, iron ore, rock, sediment, minerals). According to certain embodiments, methods disclosed herein can include the reductant (for converting non-magnetite iron oxides to magnetite) being a byproduct of another reaction step in the overall iron making process. According to certain embodiments, methods disclosed herein can include reductant (for converting non-magnetite iron oxides to magnetite) generation from a combination of the internal source (e.g., from the byproduct of the overall iron making process) and from an external source, including from a hydrogen storage, a natural gas reforming system providing hydrogen gas, or a water electrolyzer. According to certain embodiments, methods disclosed herein can include the reductant (for converting non-magnetite iron oxides to magnetite) being hydrogen, carbon monoxide, natural gas, syngas or a combination thereof. According to certain embodiments, methods disclosed herein can include using a byproduct of an electrochemical plating reaction to drive a different reaction such as using hydrogen byproduct to reduce iron oxides. The byproduct can be generated directly at the plating cell or prior to the plating cell in a separate reactor with a similar net production of hydrogen gas.

According to certain embodiments, included herein is a method for dissolving iron-containing iron ore having one or more non-magnetite iron oxide materials, the method comprising: exposing the iron ore to a reductant at a temperature between 200° C. and 600° C. and converting at least a portion of the iron oxides in the ore to magnetite, thereby forming a processed ore, and dissolving the processed ore using an acid to form an iron salt solution. Optionally, the reductant is the byproduct of another reaction in an iron making process.

In various embodiments, systems and methods herein may be configured to dissolve quantities of differently-treated iron-containing ore materials in order to achieve a desired target dissolved iron concentration within an acceptable time duration (e.g., within about 24 or 30 hours). Overall, as described herein, dissolution of iron oxide was found to be substantially improved in the presence of ferrous ions and in the presence of sufficient acid as created by the acid regenerator. Nonetheless, reduction of hematite ores to magnetite showed substantial improvement in dissolution rates and completeness in any environment.

Figure 10:
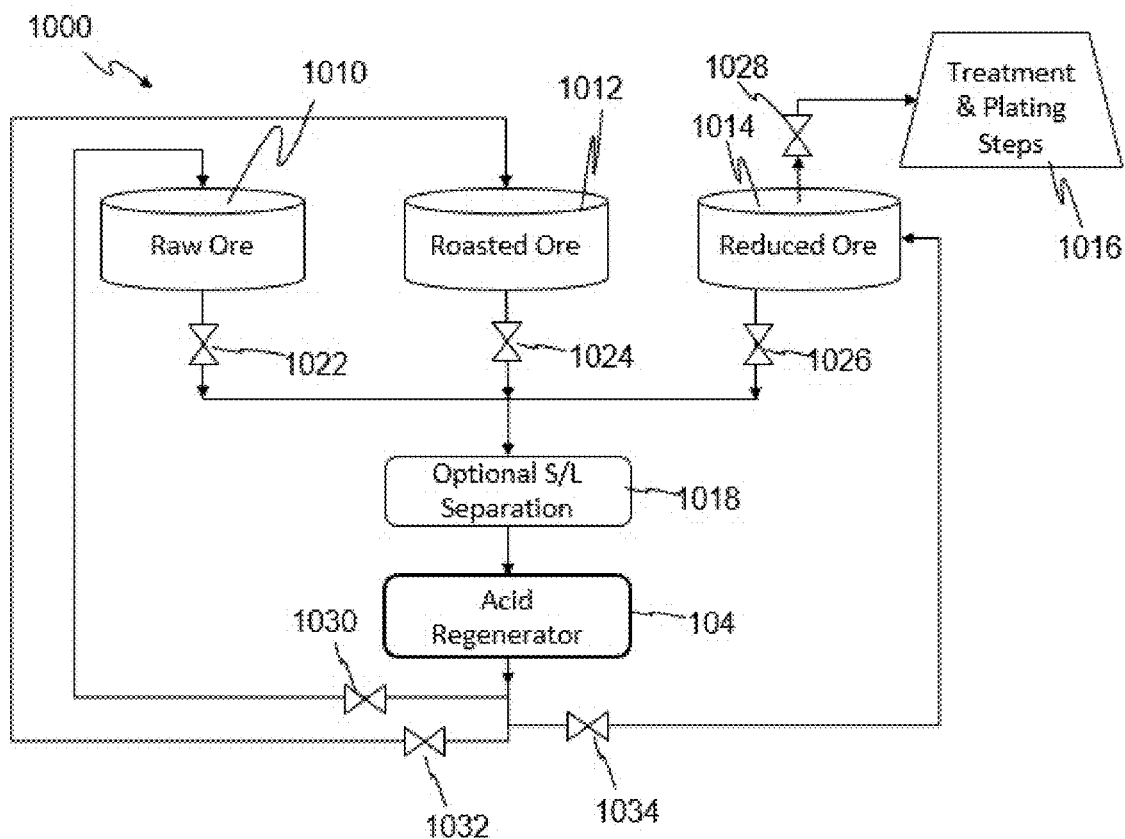
FIG. 10: A schematic system diagram illustrating an example system and process for dissolving variously-treated ores coupled to an acid regeneration system.

As illustrated in FIG. 10, a dissolution subsystem 1000 may comprise an acid regenerator 104 coupled to a plurality of ore-containing dissolution tanks 1010, 1012, 1014 (or more or fewer in other embodiments). As shown, each tank may contain a differently-processed ore material. For example, a first tank 1010 may contain "raw" ore that has not been thermally pre-treated. Such raw ore may contain goethite and/or other ore types. A second tank 1012 may contain ore that has been "roasted" as described above, for example air-roasting, and may contain hematite and/or other ore types. A third tank 1014 may contain thermally-reduced ore as described above, and may contain substantial quantities of magnetite and other ore types.

As described above and as illustrated in FIG. 7C (which shows dissolution time for differently-treated ores in an excess quantity of sulfuric acid), reduced ore dissolves very quickly reaching complete dissolution in a matter of hours, and roasted ore dissolves much more slowly, although dissolution rate may be increased somewhat by increasing temperature and/or the quantity of ferrous ions in solution. While not illustrated, raw ore has been shown to dissolve more slowly than roasted ore.

Figure 7A:
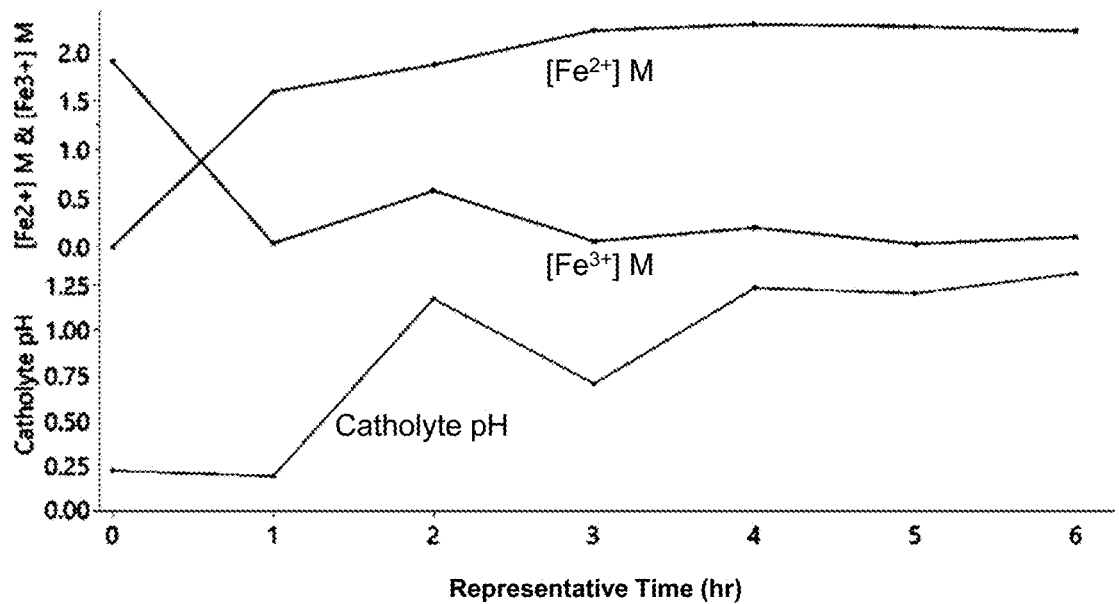
FIG. 7A: Graph illustrating experimental data showing the conversion of ferric to ferrous and the production of acid in an acid regeneration cell during dissolution coupled with acid regeneration and ferric reduction: using a starting solution of 1.8 M ferric sulfate which represents the end of a plating process, ferrous was generated by electrochemical reduction in the electrochemical cell 1 as evidenced by the increase in [$Fe^{2+}$] concentration. The generated acid enabled further dissolution of iron oxide, as the total final iron concentration was 2.5 M.
Figure 7B:
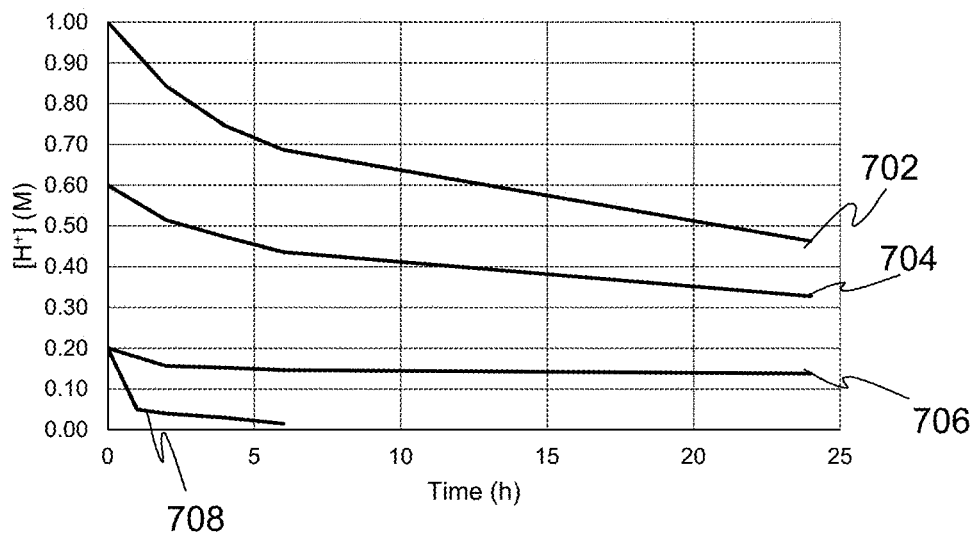
FIG. 7B: Graph illustrating experimental data showing dissolution rates of hematite and magnetite ores in various concentrations of sulfuric acid.
Figure 7C:
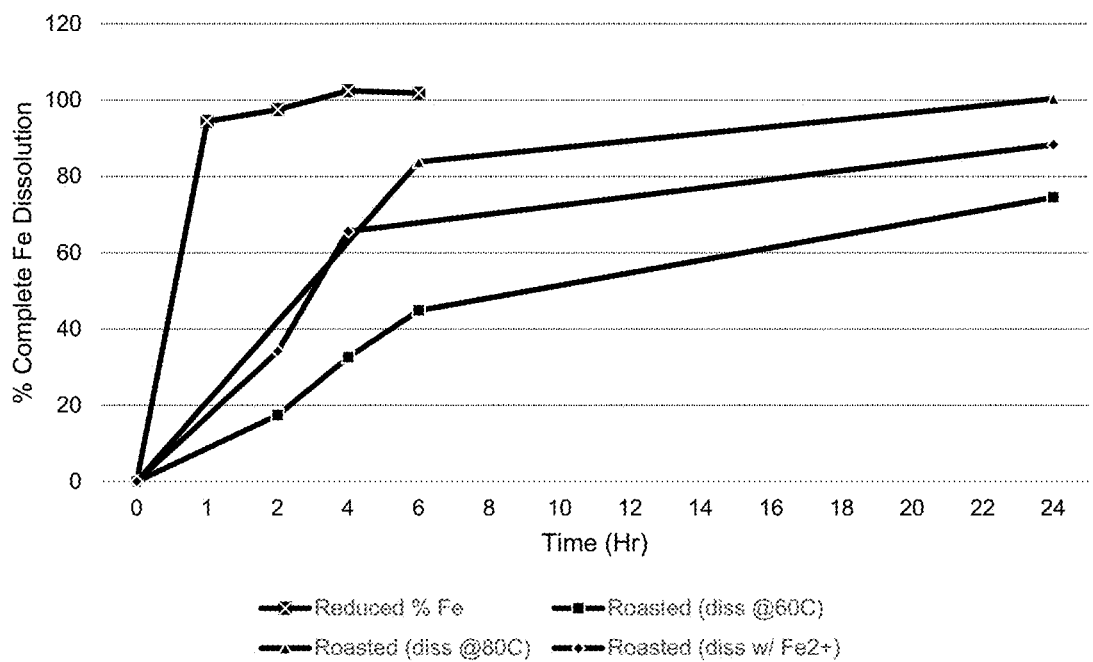
FIG. 7C. Graph illustrating experimental data showing the rate of dissolution of ores in sulfuric acid.

Relatedly, in FIG. 7B trace 708 illustrates dissolution of magnetite in 0.1 M sulfuric acid compared with dissolution of hematite in 0.1 M sulfuric acid 706, hematite in 0.3 M sulfuric acid 704 and hematite in 0.5 M sulfuric acid 702.

The system of FIG. 10 illustrates several possible processes that may be applied to selectively direct an acid-enhanced dissolution solution from an acid regenerator 104 to one or more of the dissolution tanks 1010, 1012, 1014. For the purposes of explanation, a process will be described during which the acid solution will be recirculated for one ten (10) cycles between the acid regenerator 104 and one or more of the tanks 1010, 1012, 1014, where each cycle begins at the exit of the acid regenerator 104. While 10 cycles are described in this example, any number of cycles may be used, depending on various details of a particular implementation. In other cases, "cycles" may simply represent relative time periods during which the solution is contacted with each of the ore types, and different arrangements of tanks, fluid conduits, valves, etc. may be used. For example, instead of changing where fluid is directed, the solid contents of a single dissolution tank may be changed for various amounts of time approximately corresponding to the number of cycles described in the example below.

During a first group of the 10 cycles, the acid solution may be directed to the raw ore tank 1010 by opening the valve 1030. The acid solution exiting the raw ore tank 1010 may be returned to the acid regeneration cell 104 by opening the valve 1022. During a second group of the 10 cycles, the acid solution may be directed to the roasted ore tank 1012 by opening the valve 1032. The acid solution exiting the roasted ore tank 1012 may be returned to the acid regeneration cell 104 by opening the valve 1024. In some embodiments, during a third group of the 10 cycles, the acid solution may be directed to the reduced ore tank 1014 by opening the valve 1034. The acid solution exiting the roasted ore tank 1014 may be returned to the acid regeneration cell 104 by opening the valve 1026, or may instead (or in addition) be directed to down-stream processes 1016 (e.g., impurity removal, accessory iron treatment, plating, etc) by opening the valve 1028.

Therefore, by changing the number of "cycles" through each dissolution tank, the acid solution may be contacted with the differently-treated ores for different amounts of time. In various examples, the acid solution may be contacted with the raw ore 1010 for 0 to 9 of the cycles, with the roasted ore 1012 for 0 to 9 of the cycles, and with the reduced ore 1014 for 1 to 10 of the cycles. It is generally desirable to contact the acid solution with the reduced ore 1014 for at least the final cycle before directing the solution to downstream process steps 1016. Because dissolution of reduced ore proceeds relatively quickly, finishing the dissolution process with the reduced ore serves to consume some of the remaining acid, further simplifying downstream steps as described elsewhere herein.

Any of the combination of cycles (or proportional residence time) in Table 1 below may be used:

TABLE 1

Options for Dissolution of Differently-Treated Iron Ores
Number of Acid "Cycles" on Each Ore Treatment Type

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| Raw | 0 | 0 | 0 | 0 | 0 | 0 | 0 | 0 | 0 | 0 | 0 | 1 | 2 | 3 | 4 | 5 | 6 | 7 | 8 | 1 | 2 | 3 | 4 | 5 | 6 | 7 | 8 | 9 |
| Roasted | 9 | 8 | 7 | 6 | 5 | 4 | 3 | 2 | 1 | 0 | 9 | 8 | 7 | 6 | 5 | 4 | 3 | 2 | 1 | 0 | 0 | 0 | 0 | 0 | 0 | 0 | 0 | 0 |
| Reduced | 1 | 2 | 3 | 4 | 5 | 6 | 7 | 8 | 9 | 10 | 1 | 1 | 1 | 1 | 1 | 1 | 1 | 1 | 1 | 9 | 8 | 7 | 6 | 5 | 4 | 3 | 2 | 1 |

In some aspects, a method may comprise dissolving an iron feedstock in an acid; producing metallic iron by evolving oxygen gas from water at an anode of an electrochemical cell while electroplating metallic iron from a ferric iron solution at a cathode of an electrochemical cell or during a treatment step, and evolving hydrogen in a side-reaction at the cathode of the electrochemical cell, collecting the hydrogen, transferring the hydrogen to a reaction chamber, and thermally reducing the iron feedstock in the reaction chamber with the hydrogen.

In some aspects, a method may comprise dissolving an iron feedstock in an aqueous acid solution in a dissolution tank; circulating the solution from the dissolution tank to an acid regeneration cell; converting ferric ions in the solution to ferrous ions at a cathode of the acid regeneration cell while evolving oxygen from water at the anode of the acid regeneration cell; transferring a first portion (anolyte) of the solution to an anolyte tank of an iron plating system; transferring a second portion (catholyte) of the solution to a catholyte tank of the iron plating system, optionally including a treatment step to remove impurities and to create $H_2$; circulating the anolyte and catholyte between their respective tanks and an iron plating cell; oxidizing ferrous iron to ferric iron in the anolyte at the anode of the plating cell while electroplating metallic iron from ferrous iron in the catholyte at the cathode of the plating cell and while evolving parasitic hydrogen at the cathode during electroplating and/or optionally using H2 generated from the treatment step to remove impurities and to create H2; collecting the hydrogen and transferring the hydrogen to a reaction chamber, and thermally reducing the iron feedstock in the reaction chamber with the hydrogen.

In some aspects, a method may comprise producing hydrogen by mixing an aqueous acidic solution with metallic iron, collecting the hydrogen, transferring the hydrogen to a reaction chamber, and thermally reducing iron feedstock in the reaction chamber with the hydrogen.

In some aspects, a method may comprise mixing an aqueous acidic ferrous iron solution with metallic iron, converting the residual ferric ions in the aqueous acidic ferrous iron solution to ferrous ions while producing hydrogen from the reaction of the residual acid with metallic iron, collecting the hydrogen, transferring the hydrogen to a reaction chamber, and thermally reducing iron feedstock in the reaction chamber with the hydrogen.

In some aspects, embodiments disclosed herein include: a method for dissolving iron oxide materials in acidic solution, the method comprising: providing a feedstock comprising iron oxide materials; providing a dissolution tank; providing an electrochemical cell having a cathode, a membrane and an anode; dissolving the feedstock in the dissolution tank using in an acid solution, wherein the dissolution liberates $Fe^{3+}$ into the acid solution; and circulating the acid solution between the dissolution tank and the cathode of the electrochemical cell to electrochemically reduce $Fe^{3+}$ to $Fe^{2+}$, and simultaneously generating protons, wherein the step of circulating comprises returning the reduced and acidified solution comprising the acid and $Fe^{2+}$ ions to the dissolution tank to dissolve more iron oxide materials.

Example: Ore Pre-Treatment and Dissolution

This example provides certain exemplary and optional embodiments of a method of processing ore, to increase content of magnetite in an iron-containing ore. Processing feedstock ore to convert certain iron oxides to magnetite is an optional aspect that may be advantageous for some applications, but is not necessary for the operation of the methods disclosed herein for producing high-purity iron.

In an aspect, a method for processing an iron-containing ore having one or more non-magnetite iron oxide materials comprises: processing the iron-containing ore to form a processed ore, the step of processing comprising: exposing the one or more non-magnetite iron oxide materials of the iron-containing ore to a reductant at a temperature selected from the range of 200° C. to 600° C. to convert at least a portion of the one or more non-magnetite iron oxide materials to magnetite thereby forming the processed ore; and dissolving at least a portion of the magnetite using an acidic solution to form an iron-salt solution; wherein the reductant is at least partially a product of: an electrochemical process, a process for making iron, a chemical reaction involving iron as a reagent, and/or a chemical reaction between a metal and an acid.

Optionally in the method for processing an iron-containing ore, at least a portion of the reductant is a product of an electrochemical and/or chemical reaction of the process of making iron. Optionally in the method for processing an iron-containing ore, at least a portion of the reductant is a product of an iron electroplating process. Optionally in the method for processing an iron-containing ore, at least a portion of the reductant is electrochemically-generated $H_2$. Optionally in the method for processing an iron-containing ore, at least a portion of the reductant is chemically-generated $H_2$. Optionally in the method for processing an iron-containing ore, at least a portion of the reductant is $H_2$ generated via water electrolysis. Optionally in the method for processing an iron-containing ore, at least a portion of the reductant is $H_2$ generated from a reaction between a metal, such as iron, and an acid. Optionally in the method for processing an iron-containing ore, at least a portion of the reductant is $H_2$ a combination of an electrochemically-generated $H_2$ and a product of a chemical reaction between a metal and an acid.

The reductant may be sourced from a process that is a part of the method for processing an iron-containing ore and/or from a separate method. Optionally in the method for processing an iron-containing ore, the method comprises the process for making iron. Optionally in the method for processing an iron-containing ore, the method comprises electroplating iron metal, collecting the reductant produced during the step of electroplating, and providing the reductant to the step of processing. Optionally in the method for processing an iron-containing ore, the method comprises the electrochemical process, the process for making iron, the chemical reaction involving iron as a reagent, and/or the chemical reaction between a metal and an acid. Optionally in the method for processing an iron-containing ore, the method comprises the process for making electrochemically-generated $H_2$. Optionally in the method for processing an iron-containing ore, the method comprises the process for making $H_2$ via a reaction between a metal, such as iron, and an acid.

Optionally in the method for processing an iron-containing ore, the reductant comprises $H_2$, CO, natural gas, syngas, or any combination thereof.

Optionally in the method for processing an iron-containing ore, the method comprises extracting the at least a portion of the magnetite from the processed ore between the steps of processing and dissolving.

In some embodiments, the conversion of the non-magnetite iron oxides to magnetite may be incomplete after first performing the step of exposing, resulting in some amount of unconverted non-magnetite iron oxide, which may then be processed further. Optionally in the method for processing an iron-containing ore, the processed ore comprises unconverted non-magnetite iron oxide material; and wherein the method further comprises: separating at least a portion of the unconverted non-magnetite iron oxide materials from the magnetite of the processed ore; and recycling the separated unconverted non-magnetite iron oxide material back to the step of processing to convert the unconverted non-magnetite iron oxide material to magnetite. Optionally in the method for processing an iron-containing ore, the step of dissolving comprises exposing the processed ore to the acidic solution; wherein at least a portion of the exposed processed ore is undissolved in the acidic solution; wherein the undissolved portion of the processed ore comprises unconverted non-magnetite iron oxide material; and wherein the method further comprises: recycling the unconverted non-magnetite iron oxide material back to the step of processing to convert the unconverted non-magnetite iron oxide material to magnetite.

Optionally in the method for processing an iron-containing ore, the one or more non-magnetite iron oxide materials comprise hematite and/or goethite.

Optionally in the method for processing an iron-containing ore, the acidic solution (for dissolving the at least a portion of the magnetite) comprises hydrochloric acid, sulfuric acid, nitric acid, phosphoric acid, acetic acid, citric acid, oxalic acid, boric acid, or any combination thereof.

Optionally in the method for processing an iron-containing ore, the iron-salt solution comprises aqueous $Fe^{2+}$ and/or $Fe^{3+}$ ions.

In another aspect, a method for processing an iron-containing ore having one or more non-magnetite iron oxide materials comprises: processing the iron-containing ore to form a processed ore, the step of processing comprising: exposing the one or more non-magnetite iron oxide materials of the iron-containing ore to a reductant at a temperature selected from the range of 200° C. to 600° C. to convert at least a portion of the one or more non-magnetite iron oxide materials to magnetite thereby forming the processed ore; and dissolving at least a portion of the magnetite using an acidic solution to form an iron-salt solution.

Dissolution-Enhancing Additive Materials

A mixed solution of sulfate and chloride can be used, such as by using a mixture of sulfuric acid and hydrochloric acid. In some embodiments, such a mixture may be produced by mixing a chloride salt into a sulfuric acid solution, or by mixing a sulfate salt into a hydrochloric acid solution. In other embodiments, other acid mixtures may be used to dissolve iron ore materials.

Acid Chemistry Selection

In various embodiments, the systems and methods described herein may be used with any acid for dissolution of iron feedstock materials and/or as the basis of the ferrous solution used for iron plating. Suitable acids may include but are not limited to hydrochloric acid, sulfuric acid, phosphoric acid, nitric acid, acetic acid, oxalic acid, citric acid, boric acid, methanesulfonic acid, or any combination thereof. As will be understood with reference to this description and accompanying figures, selection of acid chemistry may offer various advantages and trade-offs. Selection of a particular acid chemistry may be based on these or other technical and/or economic factors, among others. Various selection considerations are set forth in Table 2.

TABLE 2

| Acid Chemistry Selection Rationale | | |
|---|---|---|
| Metric | Preferred Choice | Reasons |
| Safety | Sulfuric Acid | Sulfuric acid is less corrosive. Often used in classical electrowinning. |
| Dissolution | Hydrochloric Acid | Dissolution rate in hydrochloric acid >> sulfuric acid. Some ores have minimal dissolution in sulfuric acid at 6M and 60 C, whereas ore dissolves readily in hydrochloric acid up to 1M and 60 C. |
| Anode Stability | Sulfuric Acid | Acid leaks across the PEM in the acid regenerator resulting in a pH~2 at the anode. Under these condition the oxygen evolution anode lifetime and stability is significantly better in sulfuric acid than in hydrochloric acid. Also, note that classical electrowinning is done in sulfuric acid at pH <0 using lead anodes with >5-year lifetime. |
| Impurity Management | Sulfuric Acid | Similar to the ore dissolution, the impurities also have much lower solubility in sulfuric acid than hydrochloric acid. |
| Capex | Sulfuric Acid | Vapor pressure of hydrochloric acid >> sulfuric acid. This requires a fully-sealed stack when using hydrochloric acid. |

In some embodiments, an electrolyte or acid solution used in either an acid regeneration cell (anolyte and/or catholyte) or a plating cell (anolyte and/or catholyte) may include supporting salts or other additives in addition to the acid and dissolved species described herein. For example, supporting salts in any of the above electrolyte solutions may include sodium sulfate, potassium sulfate, ammonium sulfate, sodium chloride, potassium chloride, ammonium chloride or others, or any combination thereof.

In some embodiments, a plating cell catholyte may include one or more additives configured to improve plating efficiency, such as a weak acid for pH buffering, including citric acid, boric acid, and/or a surfactant, including low-foaming nonionic surfactants such as Hopax EN 16-80, EA 15-90 and typical additives used in the electroplating industry.

Overall Process Examples

FIG. 4, FIG. 6, and FIG. 9 provide various schematic illustrations of examples of iron conversion processes as described herein.

Figure 11:
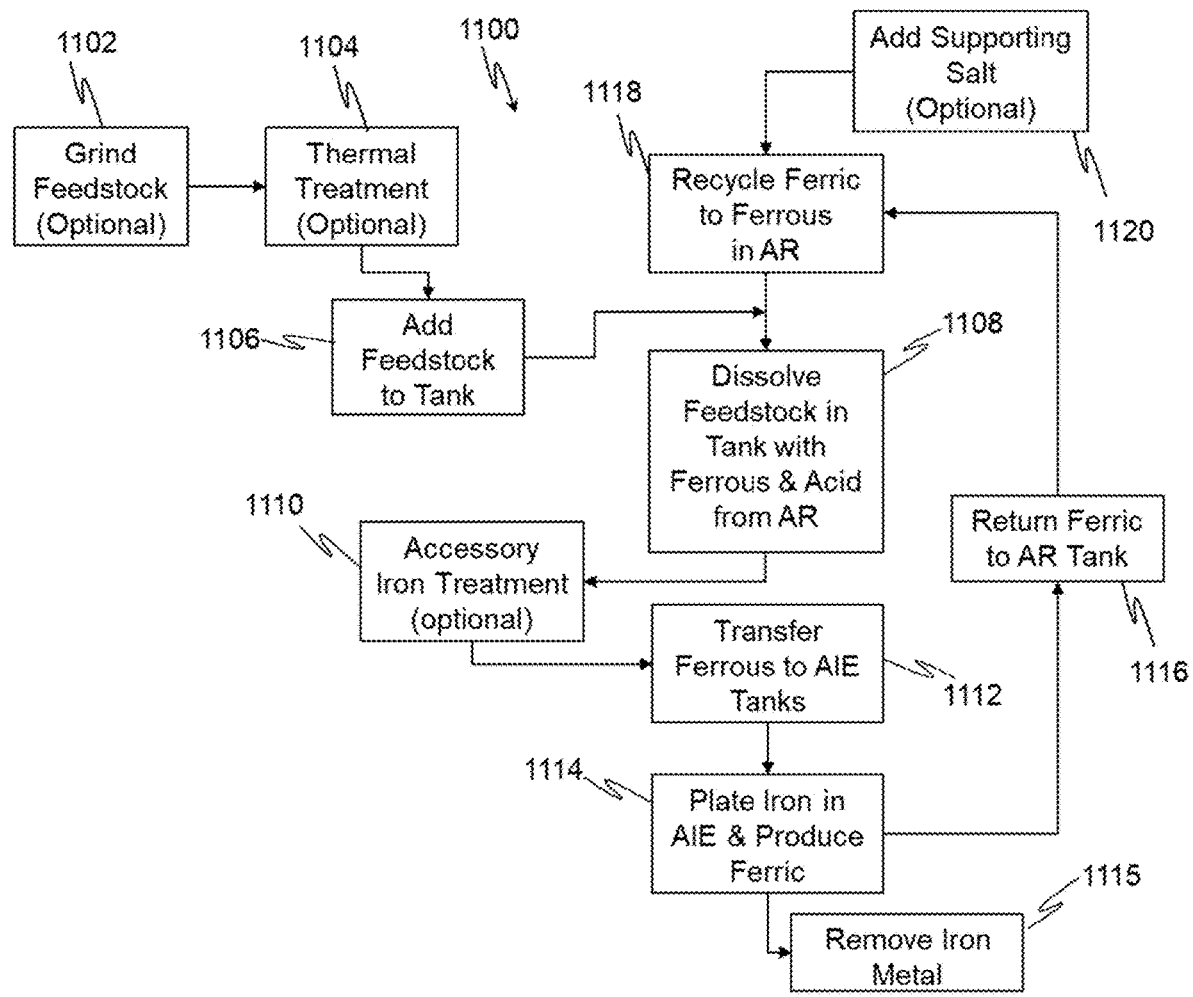
FIG. 11. A process flow diagram schematically illustrating a process of converting solid iron feedstock into pure plated iron, including optional intermediate treatment steps.
Figure 12:
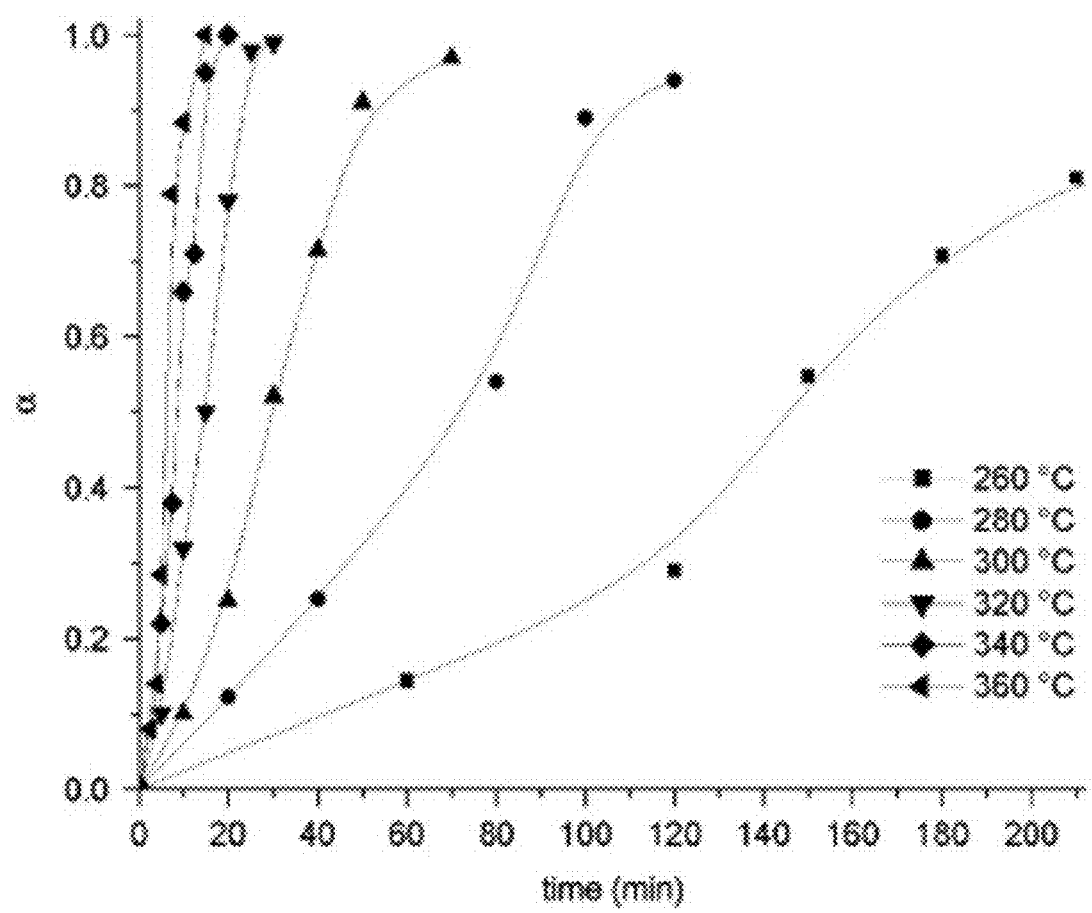
FIG. 12. Plot of alpha (a) vs. time for the reduction of hematite to magnetite with 5% $H_2$-95% Ar gas.

FIG. 11 illustrates on example of a complete process 1100 for converting an iron feedstock into pure iron while recycling a process solution, including various optional intermediate steps. At 1102, the process 1100 may optionally comprise grinding a feedstock material to a desired particle size. At 1104, the process may comprise a thermal treatment, which may include air roasting and/or thermally reducing the iron feedstock material in the presence of hydrogen (e.g., including hydrogen produced in one or more process steps in the process 1100). The thermal treatment step 1104 may be optionally omitted if the feedstock is suitable for direct dissolution without such processing. At 1106, the feedstock may be added to a dissolution tank connected to an acid regenerator. At 1108, the feedstock may be dissolved in the dissolution tank with the acid and the ferrous iron solution produced by the acid regenerator. After the iron concentration reaches a desired value, the now-ferrous iron solution in the dissolution tank may be treated with iron (e.g., an "accessory iron" treatment as described elsewhere herein) to increase the pH and to further convert any remaining ferric iron to ferrous iron at 1110. At 1112, the ferrous iron solution may be transferred to the catholyte and anolyte tanks associated with an plating cell. At 1114, the plating cell may be operated to plate metallic iron while producing ferric iron in the anolyte. At 1115, the deposited metallic iron may be removed from the cell, such as by removing the cathode electrode. At 1116, the ferric plating anolyte solution may be returned from the plating system to a dissolution tank of the acid regenerator system, where it may be recycled to produce at least some ferrous iron before feedstock is added to the dissolution tank in a subsequent cycle at 1106. In some embodiments, at 1120, a supporting salt may optionally be added to the electrolyte. Alternatively, a supporting salt may be added to an electrolyte at any other point in the process (e.g., into electrolyte or added with the feedstock). In some embodiments, supporting salt is not added at every cycle, for example, as it may not be consumed (or, significantly consumed) in the process.

In some aspects, embodiments disclosed herein include: a method for producing high purity iron from an iron oxide feedstock, the method comprising two subsystems including a dissolution subsystem configured for forming a solution containing ferrous salt ("ferrous transfer solution") by: providing a dissolution tank, providing a first electrochemical cell (e.g., an acid regeneration cell) having a cathode, a membrane and an anode; dissolving the feedstock in the dissolution tank in an acid solution, wherein the dissolution reaction liberates $Fe^{3+}$ into the solution while consuming protons; and circulating the solution to the cathode of the first electrochemical cell to convert $Fe^{3+}$ to $Fe^{2+}$, and simultaneously generating protons; wherein the step of circulating comprises returning the reduced and acidified solution comprising the acid and $Fe^{2+}$ ions to the dissolution tank to dissolve more iron oxide materials; and further comprising an iron plating subsystem configured for producing metallic iron from the ferrous solution produced in the dissolution subsystem by: dividing the ferrous solution from the dissolution tank of the dissolution subsystem into two streams to be stored in two separate tanks for plating anolyte and plating catholyte; providing a second electrochemical cell (e.g., an plating cell); circulating the solution from the catholyte tank to the cathode of the second electrochemical cell and circulating the anolyte of the anolyte tank to the anode of the second electrochemical cell, reducing $Fe^{2+}$ ions to solid iron metal plated at the cathode of the second electrochemical cell while simultaneously oxidizing $Fe^{2+}$ ions to $Fe^{3+}$ at the anode of the second electrochemical cell; removing the plated iron metal; and returning a ferric solution having $Fe^{3+}$ ions to the dissolution tank or the acid regeneration cell of the dissolution subsystem.

In some further aspects, the catholyte and anolyte solutions from the cathode and the anode sides of the plating cell may optionally be combined to form a returning ferric solution that is returned back to the dissolution subsystem. In some embodiments, the acid regeneration cell may be operated for one or more cycles before adding solid feedstock to the dissolution tank, thereby allowing the generation of sufficient acid and ferrous ($Fe^{2+}$) solution to begin dissolution of solid feedstock materials.

Figure 18:
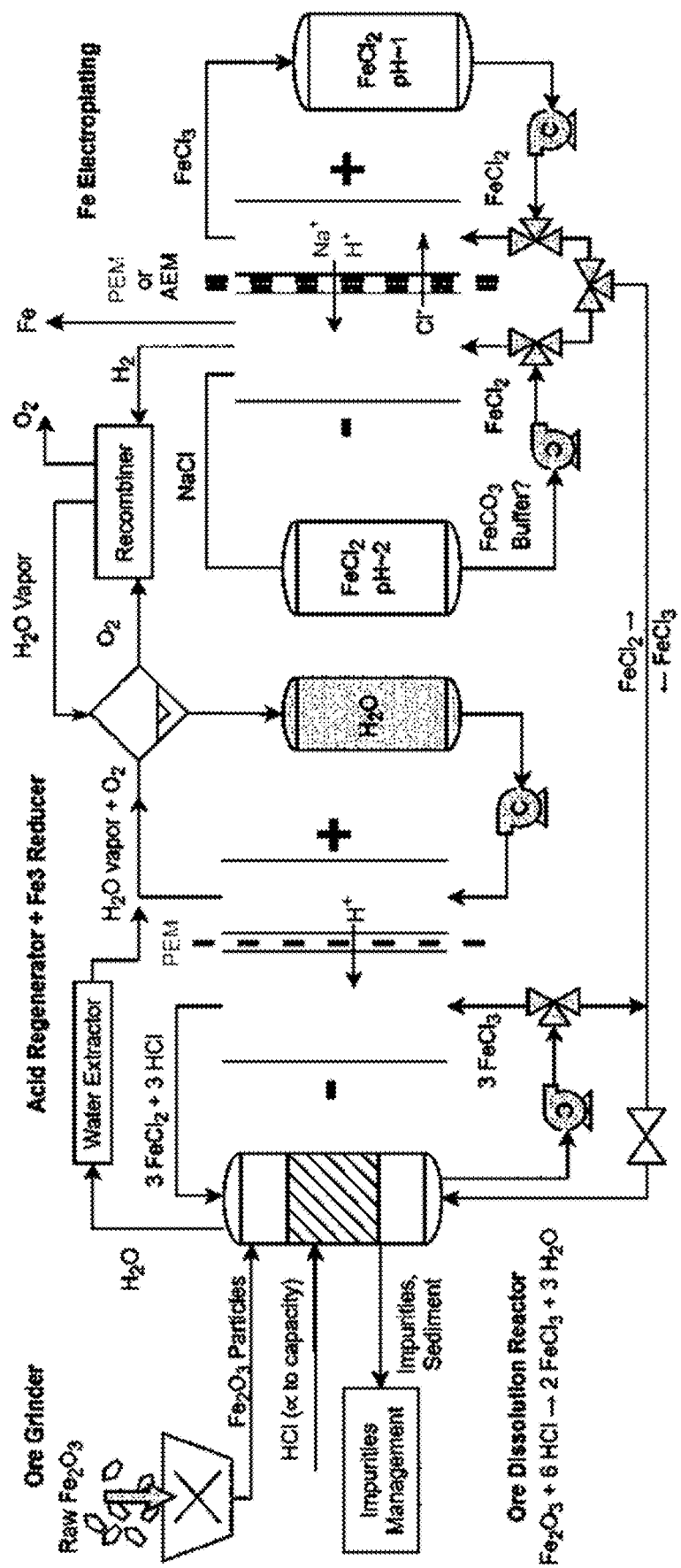
FIG. 18. Schematic diagram illustrating a chemical plant configured to perform iron conversion processes described herein.

FIG. 18 schematically illustrates certain embodiments of a chemical process and chemical plant configured to perform aspects of the methods and systems for producing iron described herein. For example, the "Acid Regenerator+Fe3 Reducer" corresponds to certain aspects of dissolution subsystems described herein. For example, the "Fe Electroplating" corresponds to certain aspects of iron-plating subsystems described herein. The schematic shows various embodiments of inputs, outputs, and communications between the dissolution subsystem and the iron-plating subsystem. FIG. 18 also illustrates an example water management system for transferring water to the acid regenerator anolyte from the acid regenerator catholyte, including an alternative use for collected hydrogen in the system (recombining with collected oxygen to form water). The system of FIG. 18 also illustrates one example of using a sodium chloride supporting salt in the plating system.

Industrial and Market Uses of Aqueous Electroformed Iron

In various embodiments, iron produced electrolytically by the systems, methods and processes described herein may be used for many commercial purposes that are not generally economically viable for other sources of iron.

The various embodiments described herein are particularly compatible with intermittent (e.g., renewable) energy sources that may fluctuate in available power over time, because the acid regeneration cell, the plating cell, and other supporting systems are generally capable of being driven an higher or lower power in response to varying power availability. Therefore, in some embodiments, current supplied to an acid regeneration cell, to a plating cell, or to other system components may be varied in response to a measured or communicated (e.g., via any smart grid or demand response communication system or protocol) decrease or increase in available or usable power.

Such current (or power) increases or decreases may generally be made within the range of current densities described herein, but may be made outside of those ranges in some embodiments, including selectively shutting off all power to one or more cells, stacks, subsystems, or the entire system.

Figure 22:
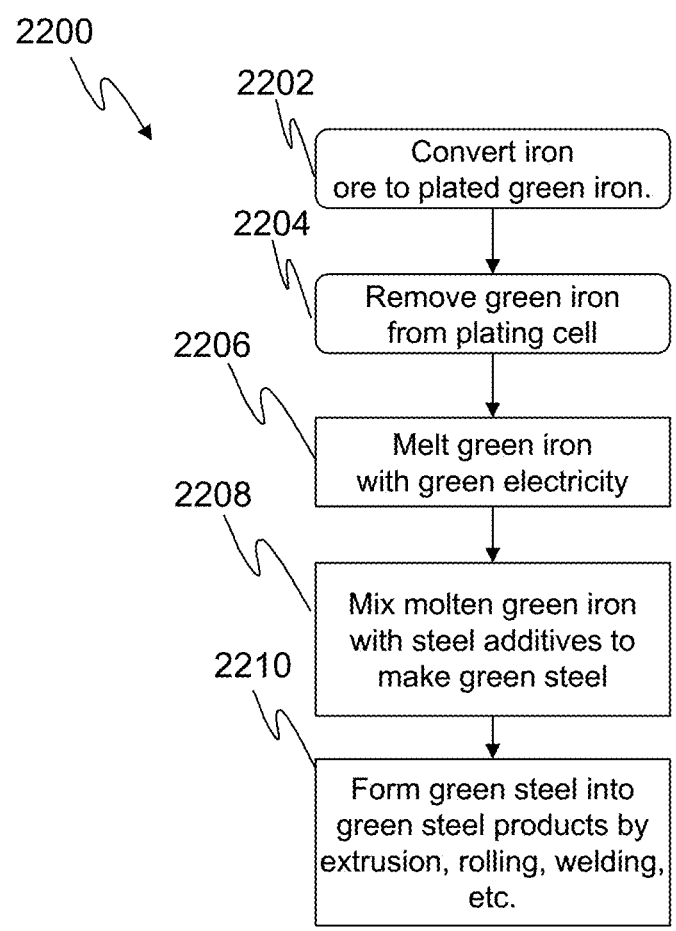
FIG. 22. Process flow diagram illustrating a process for making green steel and green steel products from iron produced by one or more of the processes described herein.

FIG. 22 illustrates a process 2200 for producing green steel and green steel products using the iron produced by any embodiment of a system or process for making pure iron as described herein. According to the process 2200, iron ore may be converted at 2202 to "green iron" using substantially only renewable or zero-carbon-emitting energy (e.g., wind, solar, tidal, geothermal, or nuclear electrical energy). At 2204, the green iron may be removed from a plating cell as described herein.

At 2206, the green iron may be melted, preferably using substantially only renewable or zero-carbon-emitting energy (e.g., wind, solar, tidal, geothermal, or nuclear electrical energy). In various embodiments, the iron may be melted with only electrical energy using an induction furnace, microwaves, an electric-arc furnace, or other systems. In some embodiments, a conventional basic oxygen furnace may be used to melt the iron.

At 2208, the molten iron may be mixed with various additives and alloying materials in order to make a desired grade of molten steel. Examples of such additive and/or alloying elements may include carbon, chromium, molybdenum, vanadium, manganese, nickel, cobalt, silicon, lead, boron, aluminum, copper, cerium, niobium, titanium, tungsten, tin, zinc, zirconium, or any combination thereof.

At 2210, the molten steel may be formed into a steel product or a product precursor by extruding, molding, casting, or other molten-to-solid steel forming step. Additional fabrication steps may also be used to make steel products, including rolling, forging, welding, stamping, machining, etc., or any combination thereof.

Pure iron produced by the systems, methods and processes described herein fundamentally represent an energy carrier (e.g., a form of "metallic electricity") that may be deployed for various market purposes such as to make dispatchable hydrogen, seasonal storage, and metal fuels to enable a circular iron economy.

Dispatchable hydrogen refers to the delivery of hydrogen on-location and on demand. In some embodiments, iron produced by the systems and methods herein may be delivered to a location at which hydrogen gas is desired and reacted with water (e.g., at an elevated temperature) or an acid (which may be produced on-site by an acid generator, or otherwise obtained). The reaction of iron with the acid will spontaneously produce hydrogen gas while oxidizing the iron. The oxidized iron can then be returned and used as a feedstock in one of the iron conversion processes described herein.

Iron produced by a conversion processes described herein may be used to make primary (single-discharge) or secondary (rechargeable) iron-electrode batteries (e.g., nickel-iron batteries, iron-air batteries, all-iron flow batteries or others) that may be used for seasonal storage (i.e., time-shifting renewable energy by weeks or months from a high-generation season to a lower-generation season, such as summer to winter for solar) or daily storage (i.e., time-shifting renewable energy by hours from high-generation times of day to low-generation times, such as mid-day to evening, night, or morning for solar).

Iron made by a conversion processes described herein may be made into sufficiently small particles and combusted as a solid fuel in a furnace (e.g. a coal furnace). Combustion of iron consumes oxygen to form iron oxide (typically hematite) but does not release greenhouse gases.

In any of the above applications, "spent" iron that has reached its useful life in those processes (typically after having been oxidized to one or more oxide forms) may be returned to an iron conversion process such as those described herein and converted back into metallic iron.

"Redox Mediator" Framework for Decoupling Iron Reduction Steps

The decoupling of ferric-ferrous reduction from ferrous-iron reduction in various embodiments and examples herein may be theoretically understood as the use of a "redox mediator" couple that mediates between iron reduction and oxygen evolution as shown by the following equations:

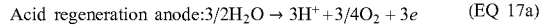
Acid regeneration anode: $3/2H_2O \rightarrow 3H^+ + 3/4O_2 + 3e$ (EQ 17a)

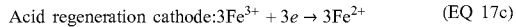
Acid regeneration cathode: $3Fe^{3+} + 3e \rightarrow 3Fe^{2+}$ (EQ 17c)

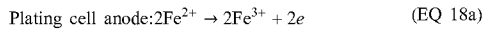
Plating cell anode: $2Fe^{2+} \rightarrow 2Fe^{3+} + 2e$ (EQ 18a)

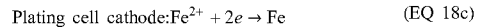
Plating cell cathode: $Fe^{2+} + 2e \rightarrow Fe$ (EQ 18c)

The half reaction at the plating cell anode (22a) is exactly the reverse reaction of the half reaction of the acid regeneration cathode (21c). In essence the redox couple $Fe^{3+}/Fe^{2+}$ plays a role of a redox mediator that enables decoupling of the water oxidation reaction and the reduction of $Fe^{3+}$ to $Fe^0$ into two separate electrochemical cells, the first cell performing only reduction of ferric to ferrous, while the second cell reduces ferrous to iron metal by plating. In this way, the action of a $Fe^{3+}/Fe^{2+}$ "shuttle" is harnessed and used advantageously to create substantial practical and cost savings benefits in addition to improving overall efficiency and control over the total system reaction. Among many advantages, the decoupling may allow for operating the acid regeneration cell and the plating cell at substantially different current densities, which may be particularly advantageous in view of the different economic and operational characteristics of the two cells.

Figure 23:
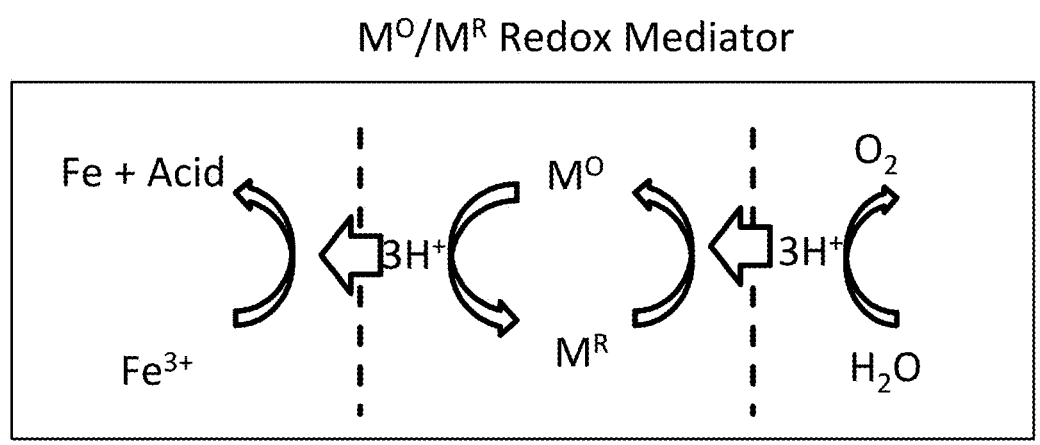
FIG. 23. Schematic diagram illustrating use of a redox mediator couple to decouple oxygen evolution from reduction of ferric iron to metallic iron.

While $Fe^{3+}/Fe^{2+}$ couple serves a role as a "redox mediator" in the embodiments and examples above, a generic redox mediator couple, illustrated for example in FIG. 23, may be described as between an oxidized mediator ($M^O$) and a reduced mediator ($M^R$): $M^O/M^R$ with 1 electron for which the half reaction is:

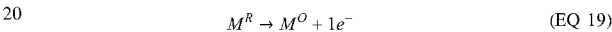
$$M^R \rightarrow M^O + 1e^- \quad \text{(EQ 19)}$$

A redox mediator couple can be used to decouple the iron plating and water oxidation reactions into two cells as follows:

Cell 1:

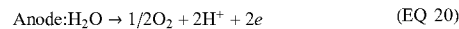
$$\text{Anode}: H_2O \rightarrow 1/2 O_2 + 2H^+ + 2e \quad \text{(EQ 20)}$$

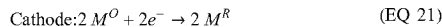
$$\text{Cathode}: 2 M^O + 2e^- \rightarrow 2 M^R \quad \text{(EQ 21)}$$

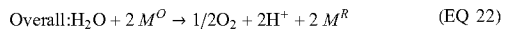
$$\text{Overall}: H_2O + 2 M^O \rightarrow 1/2 O_2 + 2H^+ + 2 M^R \quad \text{(EQ 22)}$$

Cell 2:

Using the reduced mediator $M^R$ that was generated in the first cell:

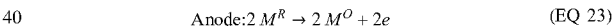
$$\text{Anode}: 2 M^R \rightarrow 2 M^O + 2e \quad \text{(EQ 23)}$$

$$\text{Cathode}: Fe^{2+} + 2e^- \rightarrow Fe \quad \text{(EQ 24)}$$

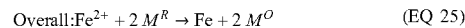
$$\text{Overall}: Fe^{2+} + 2 M^R \rightarrow Fe + 2 M^O \quad \text{(EQ 25)}$$

In this way, a $M^O/M^R$ couple may serve a role as a "redox mediator" to de-couple the iron feedstock dissolution process from the iron plating process as illustrated in FIG. 23. In various embodiments, other redox couples may be used to achieve similar functional decoupling by different electrochemical reactions. Various example alternative redox mediator couples may include, but are not limited to: $Cu^{2+}/Cu^0$, $V^{5+}/V^{4+}$, $V^{3+}/V^{2+}$, $Zn^{2+}/Zn^0$, any other salt, any organic redox couple such as quinone/hydroquinone, a gas such as $H^+/H^2$, and others. In some embodiments, a metallic redox mediator may be provided to a solution by dissolution and may be separately extracted from solution by plating, solvent extraction, or other methods.

Various aspects are contemplated herein, several of which are set forth in the paragraphs below. It is explicitly contemplated that any aspect or portion thereof can be combined to form an aspect. In addition, it is explicitly contemplated that: any reference to aspect A1 includes reference to aspects A1a, A1b, A1c, and/or A1d; any reference to aspect B1 includes reference to aspects B1a, B1b, B1c, and/or B1d; any reference to aspect C1 includes reference to aspects C1a and/or C1b; and any reference to aspect D1 includes reference to aspects D1a and/or D1b. Furthermore, although the aspects below are subdivided into aspects A, B, C, and D, it is explicitly contemplated that aspects in each of subdivisions A, B, C, and D can be combined in any manner.

Moreover, the term "any preceding aspect" means any aspect that appears prior to the aspect that contains such phrase (in other words, the sentence "Aspect B13: The method or system of aspect B8, or any preceding aspect, . . ." means that any aspect prior to aspect B13 is referenced, including aspects B1-12 and all of the "A" aspects, such as aspects A1-A97). For example, it is contemplated that, optionally, any system or method of any the below aspects may be useful with or combined with any other aspect provided below. Further, for example, it is contemplated that any embodiment described above may, optionally, be combined with any of the below listed aspects.

Aspect A1a: A method of processing and dissolving an iron-containing ore, the method comprising:
  thermally reducing one or more non-magnetite iron oxide materials in the iron-containing ore to form magnetite in the presence of a reductant, thereby forming thermally-reduced ore; and
  dissolving at least a portion of the thermally-reduced ore using an acid to form an acidic iron-salt solution;
    wherein the acidic iron-salt solution comprises protons electrochemically generated in an electrochemical cell.

Aspect A1b: A method of processing and dissolving an iron-containing ore, the method comprising:
  in a dissolution tank, contacting the iron-containing ore with an acid to dissolve at least a portion of the iron-containing ore thereby forming an acidic iron-salt solution having dissolved $Fe^{3+}$ ions;
  recirculating at least a portion of the acidic iron-salt solution between the dissolution tank and a cathode chamber of an electrochemical cell, the electrochemical cell comprising a cathode in the presence of at least a portion of the acidic iron-salt solution serving as a catholyte in the cathode chamber, an anode in the presence of an anolyte, and a separator separating the catholyte from the anolyte;
  electrochemically reducing at least a portion of the dissolved $Fe^{3+}$ ions from the catholyte at the cathode to form $Fe^{2+}$ ions in the catholyte; and
  electrochemically generating protons in the electrochemical cell and providing the electrochemically generated protons to the catholyte; wherein the acidic iron-salt solution in the dissolution tank, in the presence of the iron-containing ore, is characterized by a steady state concentration of free protons being at least 0.2 M (optionally, e.g., at least 0.2, 0.3, 0.4, 0.5, 0.8, 1, 1.2, 1.5, 2, 3, 4, or 5 M, optionally wherein the steady state free proton concentration is less than 0.3, 0.4, 0.5, 0.8, 1, 1.2, 1.5, 2, 3, 4, 5, or 6 M and such values can be combined in any manner to form a range, such as 0.2-6 M).

Aspect A1c: A method of processing and dissolving an iron-containing ore, the method comprising:
  thermally reducing one or more non-magnetite iron oxide materials in the iron-containing ore to form magnetite in the presence of a reductant, thereby forming thermally-reduced ore;
    wherein the reductant comprises $H_2$ gas; and
    wherein at least a portion of the $H_2$ gas is generated chemically via a reaction of iron metal with an acid and/or at least a portion of the $H_2$ gas is generated electrochemically via a parasitic hydrogen evolution reaction of an iron electroplating process; and
  dissolving at least the thermally-reduced ore using an acidic solution to form an iron-salt solution;
    wherein the step of dissolving comprises dissolving the formed magnetite in said acidic solution.

Aspect A1d: A system for processing and dissolving an iron-containing ore, the system comprising:
  a first dissolution tank for dissolving a first iron-containing ore using a first acid; wherein:
    dissolution of the first ore in the first acid forms a first acidic iron-salt solution comprising dissolved $Fe^{3+}$ ions in the first dissolution tank;
  an electrochemical cell fluidically connected to the first dissolution tank; wherein:
    the electrochemical cell comprises a cathode chamber having a catholyte in the presence of a cathode, an anode chamber having an anolyte in the presence of an anode, and a separator separating the catholyte and the anolyte; and
  a first circulation subsystem that circulates at least a portion of the first acidic iron-salt solution from the first dissolution tank to the cathode chamber and at least a portion of the catholyte from the electrochemical cell to the first dissolution tank;
  wherein at least a portion of the $Fe^{3+}$ ions from the first acidic iron-salt solution are electrochemically reduced at the cathode to $Fe^{2+}$ ions in the catholyte, thereby consuming the $Fe^{3+}$ ions from the first acidic iron-salt solution.

Aspect A2: The method or system of any preceding aspect comprising providing at least a portion of a catholyte having said electrochemically generated protons from the electrochemical cell to the acidic iron-salt solution during the step of dissolving, thereby providing the electrochemically generated protons to the acidic iron-salt solution in the presence of the thermally-reduced ore.

Aspect A3: The method or system of aspect A2, or any preceding aspect, wherein the step of dissolving is performed in a dissolution tank; wherein the dissolution tank and the electrochemical cell are fluidically connected; and wherein the acidic iron-salt solution is circulated between the dissolution tank and the electrochemical cell.

Aspect A4: The method or system of aspect A3, or any preceding aspect, wherein during at least a part of the step of dissolving, all of the acidic iron-salt solution is circulated between the dissolution tanks and the electrochemical cell.

Aspect A5: The method or system of any one of aspects A2-A4, or any preceding aspect, wherein reaction between the thermally-reduced ore and the acidic iron-salt solution during dissolution generates water thereby consuming protons of the acidic iron-salt solution; and wherein the provided electrochemically-generated protons replace at least a portion of the consumed protons in the acidic iron-salt solution.

Aspect A6: The method or system of any one of aspects A2-A5, or any preceding aspect, wherein the electrochemically-generated protons are provided continuously to the acidic iron-salt solution during at least a portion of the step of dissolving.

Aspect A7: The method or system of any one of aspects A2-A6, or any preceding aspect, wherein the acidic iron-salt solution is characterized by a steady state concentration of free protons of at least 0.2 M (e.g., at least 0.2, 0.3, 0.4, 0.5, 0.8, 1, 1.2, 1.5, 2, 3, 4, or 5 M, optionally wherein the steady state free proton concentration is less than 0.3, 0.4, 0.5, 0.8, 1, 1.2, 1.5, 2, 3, 4, 5, or 6 M and such values can be combined in any manner to form a range, such as 0.2-6 M) during the dissolution of thermally-reduced ore.

Aspect A8: The method or system of aspect A7, or any preceding aspect, wherein the acidic iron-salt solution is characterized by a steady state concentration of free protons is selected from the range of 0.2 M to 3 M (e.g., 0.4-2.8 M, 0.6-2.6 M, 0.8-2.2 M, 1-2 M, 1.2-1.8 M, 0.2-0.8 M, 0.8-1.4 M, 1.4-2 M, 2-2.5 M, or 2.5-3 M).

Aspect A9: The method or system of aspect A7 or A8, or any preceding aspect, wherein the acidic iron-salt solution is characterized by a steady state pH being less than 0.7 (e.g., less than: 0.7, 0.6, 0.5, 0.4, 0.3, 0.2, 0.1, 0, −0.1, −0.5, or −1, optionally wherein the steady state pH is at least 0.6, 0.5, 0.4, 0.3, 0.2, 0.1, 0, −0.1, −0.5, or −1 and such values can be combined in any manner to form a range, such as −1 to 0.7).

Aspect A10: The method or system of any one of the preceding aspects comprising electrochemically generating $Fe^{2+}$ ions by electrochemically reducing, in the same or a different electrochemical cell, $Fe^{3+}$ ions from the acidic iron-salt solution to the electrochemically-generated $Fe^{2+}$ ions.

Aspect A11: The method or system of aspect A10, or any preceding aspect, comprising providing the electrochemically-generated $Fe^{2+}$ ions to the acidic iron-salt solution, in the presence of the thermally-reduced ore, during the step of dissolving.

Aspect A12: The method or system of aspect A10 or A11, or any preceding aspect, wherein the electrochemical cell generates both the electrochemically-generated protons and the electrochemically-generated $Fe^{2+}$ ions; wherein the step of dissolving is performed in a dissolution tank; and wherein the dissolution tank and the electrochemical cell are fluidically connected and the acidic iron-salt solution is circulated between the dissolution tank and the electrochemical cell.

Aspect A13: The method or system of aspect A8, or any preceding aspect, wherein the electrochemical cell comprises a cathode in the presence of a catholyte, an anode in the presence of an anolyte, and a separator separating the catholyte from the anolyte;
wherein the catholyte comprises the acidic iron-salt solution;
wherein electrochemically reducing the $Fe^{3+}$ ions from the acidic iron-salt solution is performed at the cathode to form the electrochemically-generated $Fe^{2+}$ ions in the catholyte; and
wherein the method further comprises:
electrochemically generating the electrochemically-generated protons in the electrochemical cell;
providing electrochemically-generated protons to the catholyte.

Aspect A14: The method or system of aspect A13, or any preceding aspect, wherein the step of electrochemically generating the electrochemically-generated protons comprises electrochemically oxidizing water at the anode.

Aspect A15: The method or system of aspect A13, or any preceding aspect, wherein the step of electrochemically generating the electrochemically-generated protons comprises electrochemically oxidizing $H_2$ gas at the anode.

Aspect A16: The method or system of aspect A14 or A15, or any preceding aspect, wherein the step of providing electrochemically-generated protons comprises transporting the electrochemically-generated protons through the separator from the anolyte to the catholyte.

Aspect A17: The method or system of any one of aspects A13-A16, or any preceding aspect, wherein the electrochemical cell is characterized by a Coulombic efficiency of greater than 80% (e.g., greater than: 80%, 85%, 90%, 95%, or 99%, optionally wherein the Coulombic efficiency is less than: 80%, 85%, 90%, 95%, 99%, or 100% and such values can be combined in any manner to form a range, such as 80-100%).

Aspect A18: The method or system of any one of aspects A13-A17, or any preceding aspect, wherein the electrochemically-generated protons at least partially form the acid in the catholyte.

Aspect A19: The method or system of any one of aspects A13-A18, or any preceding aspect, comprising providing water from the catholyte to the anolyte.

Aspect A20: The method or system of aspect 14 or 16, or any preceding aspect, wherein the water oxidized at the anode comprises the water generated by dissolution of the iron-containing ore during the step of dissolving.

Aspect A21: The method or system of aspect A19 or A20, or any preceding aspect, wherein water is provided from the catholyte to the anolyte through the separator via osmosis.

Aspect A22: The method or system of any one of aspects A13-A21, or any preceding aspect, wherein the anolyte is characterized by a total salt concentration being greater than that of the catholyte.

Aspect A23: The method or system of any one of aspects A13-A22, or any preceding aspect, comprising separating water from the catholyte via membrane distillation and providing said separated water to the anolyte.

Aspect A24: The method or system of any one of aspects A13-A23, or any preceding aspect, comprising separating water from the catholyte via flash distillation and providing said separated water to the anolyte.

Aspect A25: The method or system of any one of aspects A13-A24, or any preceding aspect, comprising separating water from the catholyte via reverse osmosis and providing said separated water to the anolyte.

Aspect A26: The method or system of any one of aspects A13-A25, or any preceding aspect, wherein the anolyte has a different composition than the catholyte.

Aspect A27: The method or system of any one of aspects A13-A26, or any preceding aspect, wherein first anolyte has a different pH than the first catholyte.

Aspect A28: The method or system of any one of aspects A13-A27, or any preceding aspect, wherein the first catholyte has a lower pH than the first anolyte.

Aspect A29: The method or system of any one of aspects A13-A28, or any preceding aspect, wherein the first anolyte comprises a different composition of dissolved salts that in the first catholyte.

Aspect A30: The method or system of any one of aspects A13-A29, or any preceding aspect, wherein the first anolyte contains one or more dissolved ferric iron salts, and wherein the first analyte is characterized by a total concentration of the one or more dissolved ferric iron salts being equal to or greater than a total iron ion concentration in the first catholyte.

Aspect A31: The method or system of any one of aspects A13-A30, or any preceding aspect, wherein the first catholyte comprises one or more supporting salts.

Aspect A32: The method or system of aspect A31, or any preceding aspect, wherein the first catholyte comprises a concentration of one or more supporting salts being selected from the range of 0.1 to 1M (e.g., 0.2 to 0.8 M, 0.4 to 0.6 M, 0.1 to 0.4 M, 0.4 to 0.8 M, or 0.8 to 1 M).

Aspect A33: The method or system of aspect A31 or A32, or any preceding aspect, wherein the one or more supporting salts comprise one or more metal sulfate compounds and/or one or more metal chloride compounds.

Aspect A34: The method or system of aspect A33, or any preceding aspect, wherein the one or more metal sulfate compounds comprise potassium sulfate, sodium sulfate, ammonium sulfate, lithium sulfate, potassium chloride, sodium chloride, ammonium chloride, lithium chloride, or a combination of these.

Aspect A35: The method or system of any one of aspects A13-A34, or any preceding aspect, wherein the first anolyte is characterized by at least one redox couple being different than in the first catholyte.

Aspect A36: The method or system of any one of aspects A13-A35, or any preceding aspect, wherein the first anolyte comprises a higher total concentration of dissolved salts than the first catholyte.

Aspect A37: The method or system of any one of aspects A1-A21, A23-A29, or A31-35, or any preceding aspect, wherein the first anolyte comprises a lower total concentration of dissolved salts than the first catholyte.

Aspect A38: The method or system of any one of aspects A1-A29 or A31-A35, or any preceding aspect, wherein the anolyte is essentially free of $Fe^{2+}$ and $Fe^{3+}$ ions.

Aspect A39: The method or system of any one of aspects A13-A38, or any preceding aspect, wherein the catholyte is characterized by a maximum salt concentration being selected from the range of 1 to 8 M (e.g., 1-5 M, 2-5 M, 1-8 M, 2-7 M, 3-6 M, 4-5 M, 1-3 M, 3-5 M, 5-8 M, 1-4 M, 3-5 M, or 3-8 M).

Aspect A40: The method or system of any one of aspects A13-A39, or any preceding aspect, wherein the catholyte is characterized by a maximum iron ion concentration being selected from the range of 0.5 to 5 M (e.g., 1-5 M, 1-4 M, 1-3 M, 0.5-5 M, 0.5-4 M, 2-4 M, 2-5 M, 1-2 M).

Aspect A41: The method or system of any one of aspects A13-A40, or any preceding aspect, comprising electrochemically generating oxygen ($O_2$) at the anode.

Aspect A42: The method or system of any one of aspects A13-A41, or any preceding aspect, wherein electrochemical reactions at the anode are characterized by one or more redox couples selected from the group consisting of: $O_2/H_2O$, $H_2O/H_2$, $H_2/H^+$, $H^+/H_2O$, and any combination of these.

Aspect A43: The method or system of any one aspects A13-A42, or any preceding aspect, wherein the first anolyte is ionically connected to the first catholyte through the first separator.

Aspect A44: The method or system of aspect A43, or any preceding aspect, wherein the first anolyte is fluidically disconnected from the first catholyte.

Aspect A45: The method or system of any one of aspects A13-A44, or any preceding aspect, wherein the separator is an ion exchange membrane.

Aspect A46: The method or system of aspect A45, or any preceding aspect, wherein the separator is a proton exchange membrane (PEM).

Aspect A47: The method or system of any one of the preceding aspects comprising producing an iron-rich solution having $Fe^{2+}$ ions.

Aspect A48: The method or system of aspect A47, or any preceding aspect, wherein the produced iron-rich solution is characterized by a total iron ion concentration selected from the range of 0.5 to 5 M (e.g., 1-4 M, 1-5 M, 0.5-4 M, 1-4 M, 1-3 M, 0.5-4 M, 2-4 M, 2-5 M, or 1-2 M).

Aspect A49: The method or system of aspect A47 or A48, or any preceding aspect, comprising removing the produced iron-rich solution from the electrochemical cell and/or from a vessel in which the step of dissolving is performed.

Aspect A50: The method or system of any one of aspects A3-A49, or any preceding aspect, comprising raising a pH of the acidic iron-salt solution by fluidically disconnecting the dissolution tank from the electrochemical cell and/or turning off the electrochemical cell during and prior to completion of the step of dissolving.

Aspect A51: The method or system of any one of aspects A47-A50, or any preceding aspect, comprising raising a pH of the produced iron-rich solution to being selected from the range of 2 to 7 (e.g., 2-6.5, 2-6, 2-5, 3-7, 3-6, 3-5, 3-4, 4-7, 4-6, 4-5, 5-7, 5-6, or 6-7) thereby producing a pH-adjusted iron-rich solution.

Aspect A52: The method or system of any one of aspects A47-A51, or any preceding aspect, comprising raising a pH of the produced iron-rich solution to being selected from the range of 2 to less than 7 (e.g., 2-6.5, 2-6, 2-5, 3 to less than 7, 3-6, 3-5, 3-4, 4 to less than 7, 4-6, 4-5, 5 to less than 7, 5-6, or 6 to less than 7) thereby producing a pH-adjusted iron-rich solution.

Aspect A53: The method or system of aspect A51 or A52, or any preceding aspect, wherein the step of raising the pH comprises providing metallic iron and/or one or more iron oxide materials in the presence of the produced iron-rich solution.

Aspect A54: The method or system of aspect A53, or any preceding aspect, wherein the step of raising the pH comprises providing magnetite, metallic iron, or magnetite and metallic iron together in the presence of the produced iron-rich solution.

Aspect A55: The method or system of aspect A54, or any preceding aspect, wherein the step of raising the pH comprises providing magnetite or magnetite and metallic iron together in the presence of the produced iron-rich solution.

Aspect A56: The method or system of any one of aspects A51-A55, or any preceding aspect, wherein the step of raising the pH comprises providing a sufficient amount of metallic iron to raise the pH of the produced iron-rich solution to being selected from the range of 2 to 7 (e.g., 2-6.5, 2-6, 2-5, 3-7, 3 to less than 7, 3-6, 3-5, 3-4, 4-7, 4 to less than 7, 4-6, 4-5, 5-7, 5 to less than 7, 5-6, 6-7, or 6 to less than 7); in some aspects, the metallic iron is a material comprising metallic iron.

Aspect A57: The method or system of any one of aspects A47-A56, or any preceding aspect, comprising precipitating or crystallizing one or more ferrous salts from the produced iron-rich solution.

Aspect A58: The method or system of any one of aspects A47-A57, or any preceding aspect, comprising removing one or more ferrous salts from the produced iron-rich solution by one or more processes other than electroplating.

Aspect A59: The method or system of any one of the preceding aspects, wherein the step of thermally reducing comprises exposing the one or more non-magnetite iron oxide materials of the iron-containing ore to a reductant at an elevated temperature selected from the range of 200° C. to 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600), thereby converting at least a portion of the one or more non-magnetite iron oxide materials to the magnetite.

Aspect A60: The method or system of any one of the preceding aspects, wherein the reductant comprises $H_2$ gas; and wherein at least a portion of the $H_2$ gas is generated chemically via a reaction of iron metal with an acid and/or at least a portion of the $H_2$ gas is generated electrochemically via a parasitic hydrogen evolution reaction of an iron electroplating process.

Aspect A61: The method or system of aspect A59, or any preceding aspect, wherein the iron-containing ore is exposed to the elevated temperature for a thermal-treatment time during the step of thermally reducing, and wherein the iron-containing ore is exposed to the reductant during the entirety of the thermal-treatment time.

Aspect A62: The method or system of aspect A59, or any preceding aspect, wherein the iron-containing ore is exposed to the elevated temperature for a thermal-treatment time during the step of thermally reducing, and wherein the iron-containing ore is exposed to the reductant during a portion of the thermal-treatment time.

Aspect A63: The method or system of aspect A62, or any preceding aspect, comprising air-roasting the iron-containing ore by exposing the iron-containing ore to air during an initial portion of the thermal-treatment time.

Aspect A64: The method or system of any one of the preceding aspects further comprising air-roasting at least a portion of the iron-containing ore in the presence of air at a temperature selected from the range 200° C. and 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600) to form an air-roasted ore.

Aspect A65: The method or system of aspect A64, or any preceding aspect, wherein the step of air roasting is performed prior to or separately from the step of thermally reducing, wherein air-roasted ore has not been thermally reduced prior to air roasting.

Aspect A66: The method or system of aspect A64 or A65, or any preceding aspect, wherein the step of thermally reducing comprises thermally reducing the air-roasted ore to form at least a portion of the thermally-reduced ore; wherein the air-roasted comprises the one or more non-magnetite iron oxide materials.

Aspect A67: The method or system of aspect A64, A65, or A66, or any preceding aspect, wherein the step of dissolving comprises dissolving at least a portion of the air-roasted ore and at least a portion of the thermally-reduced ore concurrently and/or sequentially.

Aspect A68: The method or system of aspect A67, or any preceding aspect, wherein the step of dissolving comprises dissolving at least a portion of the air-roasted ore in a separate dissolution tank than the thermally-reduced ore for at least a portion of the step of dissolving.

Aspect A69: The method or system of any one of aspects A64-A68, or any preceding aspect, wherein the step of dissolving comprises dissolving an ore-mixture; wherein the ore-mixture comprises 0 wt. % to 100 wt. % (e.g., a wt. % of 0-100, 1-100, 1-90, 1-80, 1-70, 1-60, 1-50, 1-40, 1-30, 1-20, 1-10, 5-100, 5-90, 5-80, 5-70, 5-60, 5-50, 5-40, 5-30, 5-20, 5-10, 10-100, 10-90, 10-80, 10-70, 10-60, 10-50, 10-40, 10-30, 10-20, 20-100, 20-90, 20-80, 20-70, 20-60, 20-50, 20-40, 20-30, 40-100, 40-80, 40-60, 50-100, 50-80, 50-60, 60-100, 60-80, 70-100, 70-80, 80-100) of the thermally-reduced ore, 5 wt. % to 100 wt. % (e.g., at wt. % of 5-100, 5-90, 5-80, 5-70, 5-60, 5-50, 5-40, 5-30, 5-20, 5-10, 10-100, 10-90, 10-80, 10-70, 10-60, 10-50, 10-40, 10-30, 10-20, 20-100, 20-90, 20-80, 20-70, 20-60, 20-50, 20-40, 20-30, 40-100, 40-80, 40-60, 50-100, 50-80, 50-60, 60-100, 60-80, 70-100, 70-80, 80-100) of the roasted ore, and 0 wt. % to 90 wt. % (e.g., a wt. % of 0-90, 1-90, 1-80, 1-70, 1-60, 1-50, 1-40, 1-30, 1-20, 1-10, 5-90, 5-80, 5-70, 5-60, 5-50, 5-40, 5-30, 5-20, 5-10, 10-90, 10-80, 10-70, 10-60, 10-50, 10-40, 10-30, 10-20, 20-90, 20-80, 20-70, 20-60, 20-50, 20-40, 20-30, 40-90, 40-80, 40-60, 50-90, 50-80, 50-60, 60-90, 60-80, 70-90, 70-80, 80-90) of the roasted magnetite-containing ore.

Aspect A70: The method or system of any one of aspects A64-A69, or any preceding aspect, wherein the step of dissolving comprises circulating a dissolution solution between the electrochemical cell and at least one of a first dissolution tank, a second dissolution tank, and a third dissolution tank; wherein the first dissolution tank comprises at least a portion of the thermally-reduced ore, the second dissolution tank comprises the air-roasted ore, and third dissolution tank comprises a raw iron-containing ore; wherein the raw ore is an iron-containing ore which has not been thermally reduced nor air-roasted.

Aspect A71: The method or system of aspect A70, or any preceding aspect, wherein the step of circulating comprises circulating the dissolution solution for a total circulation time or a total number of circulation cycles; wherein the dissolution solution is circulated between the electrochemical cell and the third dissolution tank for 0 to 99% (e.g., a % of 0-95, 1-99, 1-95, 5-90, 10-85, 15-80, 20-75, 25-70, 30-65, 35-60, 40-55, 1-90, 1-80, 1-70, 1-60, 1-50, 1-20, 5-99, 5-80, 5-70, 5-60, 5-40, 5-20, 10-95, 10-80, 10-60, 20-95, 20-80, 20-60, 40-99, 40-80, 60-99, 60-80, 70-95, or 80-95) of the total circulation time or the total number of circulation cycles; wherein the dissolution solution is circulated between the electrochemical cell and the second dissolution tank for 0 to 99% (e.g., a % of 0-95, 1-99, 1-95, 5-90, 10-85, 15-80, 20-75, 25-70, 30-65, 35-60, 40-55, 1-90, 1-80, 1-70, 1-60, 1-50, 1-20, 5-99, 5-80, 5-70, 5-60, 5-40, 5-20, 10-95, 10-80, 10-60, 20-95, 20-80, 20-60, 40-99, 40-80, 60-99, 60-80, 70-95, or 80-95) of the total circulation time or the total number of circulation cycles; and wherein the dissolution solution is circulated between the electrochemical cell and the first dissolution tank for 1 to 100% (e.g., a % of 1-99, 5-100, 1-95, 5-90, 10-100, 10-85, 15-80, 20-100, 20-75, 25-70, 30-65, 35-60, 40-100, 40-55, 1-90, 1-80, 1-70, 1-60, 1-50, 1-20, 5-99, 5-80, 5-70, 5-60, 5-40, 5-20, 10-95, 10-80, 10-60, 20-95, 20-80, 50-100, 20-60, 40-99, 70-100, 40-80, 60-99, 60-80, 70-95, 80-100, or 80-95) of the total circulation time or the total number of circulation cycles.

Aspect A72: The method or system of aspect A70 or A71, or any preceding aspect, wherein during the step of circulating, the dissolution solution is circulated sequentially in any order and/or concurrently between the electrochemical cell and any two or among any three of the first, second, and third dissolution tanks.

Aspect A73: The method or system of aspect A72, or any preceding aspect, wherein the step of circulating comprises first circulating the dissolution solution first between electrochemical cell and the third dissolution tank having the raw ore, then second circulating the dissolution solution between electrochemical cell and the second dissolution tank having the air-roasted ore, then third circulating the dissolution solution between electrochemical cell and the first dissolution tank having the thermally-reduced ore.

Aspect A74: The method or system of any one of aspects A70-A73, or any preceding aspect, wherein the dissolution solution is or comprises the acidic iron-salt solution.

Aspect A75: The method or system of any one of aspects A64-A74, or any preceding aspect, wherein the first dissolution tank further comprises air-roasted ore, raw ore, or both during any part of the step of dissolving.

Aspect A76: The method or system of any one of aspects A64-A75, or any preceding aspect, wherein the second dissolution tank further comprises thermally-reduced ore, raw ore, or both during any part of the step of dissolving.

Aspect A77: The method or system of any one of aspects A64-A76, or any preceding aspect, wherein the third dissolution tank further comprises air-roasted ore, thermally-reduced ore, or both during any part of the step of dissolving.

Aspect A78: The method or system of any one of the preceding aspects, wherein the step of dissolving is performed in at least one dissolution tank, and wherein the step of dissolving comprises further introducing an air-roasted ore, a raw ore, or both to the acidic iron-salt solution in the at least one dissolution tank in the presence of the thermally reduced ore.

Aspect A79: The method or system of any one of the preceding aspects, wherein the one or more non-magnetite iron oxide materials comprise hematite and/or goethite.

Aspect A80: The method or system of any one of the preceding aspects, wherein the acid comprises hydrochloric acid, sulfuric acid, nitric acid, phosphoric acid, acetic acid, citric acid, oxalic acid, boric acid, methanesulfonic acid, or any combination thereof.

Aspect A81: A method of processing and dissolving an iron-containing ore, the method comprising:
in a dissolution tank, contacting the iron-containing ore with an acid to dissolve at least a portion of the iron-containing ore thereby forming an acidic iron-salt solution having dissolved $Fe^{3+}$ ions;
recirculating at least a portion of the acidic iron-salt solution between the dissolution tank and a cathode chamber of an electrochemical cell, the electrochemical cell comprising a cathode in the presence of at least a portion of the acidic iron-salt solution serving as a catholyte in the cathode chamber, an anode in the presence of an anolyte, and a separator separating the catholyte from the anolyte;

electrochemically reducing at least a portion of the dissolved $Fe^{3+}$ ions from the catholyte at the cathode to form $Fe^{2+}$ ions in the catholyte; and
electrochemically generating protons in the electrochemical cell and providing the electrochemically generated protons to the catholyte; wherein the acidic iron-salt solution in the dissolution tank, in the presence of the iron-containing ore, is characterized by a steady state concentration of free protons being at least 0.2 M (optionally, e.g., at least 0.2, 0.3, 0.4, 0.5, 0.8, 1, 1.2, 1.5, 2, 3, 4, or 5 M, optionally wherein the steady state free proton concentration is less than 0.3, 0.4, 0.5, 0.8, 1, 1.2, 1.5, 2, 3, 4, 5, or 6 M and such values can be combined in any manner to form a range, such as 0.2-6 M).

Aspect A82: A method of processing and dissolving an iron-containing ore, the method comprising:
thermally reducing one or more non-magnetite iron oxide materials in the iron-containing ore to form magnetite in the presence of a reductant, thereby forming thermally-reduced ore;
wherein the reductant comprises $H_2$ gas; and
wherein at least a portion of the $H_2$ gas is generated chemically via a reaction of iron metal with an acid and/or at least a portion of the $H_2$ gas is generated electrochemically via a parasitic hydrogen evolution reaction of an iron electroplating process; and
dissolving at least the thermally-reduced ore using an acidic solution to form an iron-salt solution;
wherein the step of dissolving comprises dissolving the formed magnetite in said acidic solution.

Aspect A83: A system for processing and dissolving an iron-containing ore, the system comprising:
a first dissolution tank for dissolving a first iron-containing ore using a first acid; wherein:
dissolution of the first ore in the first acid forms a first acidic iron-salt solution comprising dissolved $Fe^{3+}$ ions in the first dissolution tank;
an electrochemical cell fluidically connected to the first dissolution tank; wherein:
the electrochemical cell comprises a cathode chamber having a catholyte in the presence of a cathode, an anode chamber having an anolyte in the presence of an anode, and a separator separating the catholyte and the anolyte; and
a first circulation subsystem that circulates at least a portion of the first acidic iron-salt solution from the first dissolution tank to the cathode chamber and at least a portion of the catholyte from the electrochemical cell to the first dissolution tank;
wherein at least a portion of the $Fe^{3+}$ ions from the first acidic iron-salt solution are electrochemically reduced at the cathode to $Fe^{2+}$ ions in the catholyte, thereby consuming the $Fe^{3+}$ ions from the first acidic iron-salt solution.

Aspect A84: The method or system of aspect A83, or any preceding aspect, wherein protons are electrochemically generated in the electrochemical cell and provided to the catholyte, thereby at least partially replenishing acid consumed during dissolution.

Aspect A85: The method or system of aspect A84, or any preceding aspect, wherein protons are electrochemically generated in the anolyte and pass through the separator to the catholyte.

Aspect A86: The method or system of aspect A83, A84, or A85, or any preceding aspect, wherein the acidic iron-salt solution in the dissolution tank, in the presence of the iron-containing ore, is characterized by a steady state concentration of free protons being at least 0.2 M (optionally, e.g., at least 0.2, 0.3, 0.4, 0.5, 0.8, 1, 1.2, 1.5, 2, 3, 4, or 5 M, optionally wherein the steady state free proton concentration is less than 0.3, 0.4, 0.5, 0.8, 1, 1.2, 1.5, 2, 3, 4, 5, or 6 M and such values can be combined in any manner to form a range, such as 0.2-6 M) and/or is characterized by a steady state pH being equal to or less than 0.7 (e.g., equal to or less than 0.6, 0.5, 0.4, 0.3, 0.2, 0.1, 0, −0.1, −0.5, or −1, optionally wherein the steady state pH is at least 0.5, 0.4, 0.3, 0.2, 0.1, 0, −0.1, −0.5, or −1 and such values can be combined in any manner to form a range, such as −1 to 0.7).

Aspect A87: The method or system of any one of the preceding aspects, wherein the anolyte comprises water or an aqueous salt solution; and wherein water is electrochemically oxidized at the anode to generate protons in the anolyte; and wherein the generated protons transport to the catholyte through the separator.

Aspect A88: The method or system of any one of the preceding aspects, wherein the anolyte has a different composition than the catholyte.

Aspect A89: The method or system of any one of the preceding aspects, wherein the first iron-containing ore comprises a thermally-reduced ore having magnetite.

Aspect A90: The method or system of aspect A69, or any preceding aspect, further comprising a thermal reduction subsystem configured to form the thermally-reduced ore by converting non-magnetite materials to magnetite in the presence of a reductant and at an elevated temperature selected from the range of 200° C. to 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600); wherein the thermally-reduced ore is provided to the first dissolution tank from the thermal reduction subsystem.

Aspect A91: The method or system of aspect A90, or any preceding aspect, comprising an air-roasting subsystem configured to form an air-roasted ore by air roasting an iron-containing ore in the presence of air and at an elevated temperature selected from the range 200° C. and 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600).

Aspect A92: The method or system of aspect A91, or any preceding aspect, wherein the air-roasting subsystem and the thermal reduction subsystem are the same.

Aspect A93: The method or system of any one of the preceding aspects comprising a second dissolution tank having an air-roasted ore; wherein the air-roasted ore is an iron-containing ore that has not been thermally reduced and which has been exposed to air at an elevated temperature selected from the range of 200° C. to 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600);

wherein dissolution of the air-roasted ore occurs in the presence of a second acidic iron-salt solution comprising dissolved $Fe^{3+}$ ions in the second dissolution tank;

wherein the system further comprises a second circulation subsystem that circulates at least a portion of the second acidic iron-salt solution from the second dissolution tank to the cathode chamber and at least a portion of the catholyte from the electrochemical cell to the second dissolution tank; and wherein at least a portion of the $Fe^{3+}$ ions from the second acidic iron-salt solution are electrochemically reduced at the cathode to $Fe^{2+}$ ions in the catholyte, thereby consuming the $Fe^{3+}$ ions from the second acidic iron-salt solution.

Aspect A94: The method or system of any one of the preceding aspects comprising a third dissolution tank having a raw ore; wherein the raw ore is an iron-containing ore which has not been thermally reduced nor air-roasted;

wherein dissolution of the air-roasted ore occurs in the presence of a third acidic iron-salt solution comprising dissolved $Fe^{3+}$ ions in the third dissolution tank;

wherein the system further comprises a third circulation subsystem that circulates at least a portion of the third acidic iron-salt solution from the third dissolution tank to the cathode chamber and at least a portion of the catholyte from the electrochemical cell to the third dissolution tank; and wherein at least a portion of the $Fe^{3+}$ ions from the third acidic iron-salt solution are electrochemically reduced at the cathode to $Fe^{2+}$ ions in the catholyte, thereby consuming the $Fe^{3+}$ ions from the third acidic iron-salt solution.

Aspect A95: The method or system of any one of the preceding aspects configured to produce an iron-rich solution having an iron ion concentration selected from the range of 1 M to 4 M (e.g., 1-3.5, 1-3, 1-2.5, 1-2, 1-1.5, 1.5-4, 1.5-3.5, 1.5-3, 1.5-2.5, 1.5-2, 2-4, 2-3.5, 2-3, 2-2.5, 2.5-4, 2.5-3.5, 2.5-3, 3-4, or 3-3.5).

Aspect A96: The method or system of any of the above or below aspects, wherein the step of dissolving is terminated when a proton concentration (optionally, a steady state proton concentration) in the acidic iron-salt solution is equal to or less than 0.4 M (optionally 0.3 M, optionally 0.2 M, optionally 0.1 M) (optionally after being above this threshold for a majority of the time the step of dissolving is performed).

Aspect A97: The method or system of any of the above or below aspects, wherein the step of dissolving is terminated when a total iron ion concentration in the first catholyte, in the acidic iron-salt solution, and/or the produced iron-rich solution reaches a desired maximum value (optionally, a steady state value) being 1 M, optionally 2 M, optionally 3 M, optionally 4 M, optionally any value or range between 1 M and 4M inclusively.

Aspect B1a: A method for producing iron, the method comprising:

providing a feedstock having an iron-containing ore to a dissolution subsystem comprising a first electrochemical cell;

wherein the first electrochemical cell comprises a first anodic chamber having a first anolyte in the presence of a first anode, a first cathodic chamber having a first catholyte in the presence of a first cathode, and a first separator separating the first anolyte from the first catholyte; and wherein the first anolyte has a different composition than the first catholyte;

dissolving at least a portion of the iron-containing ore using an acid to form an acidic iron-salt solution having dissolved first $Fe^{3+}$ ions;

providing at least a portion of the acidic iron-salt solution, having at least a portion of the first $Fe^{3+}$ ions, to the first cathodic chamber;

first electrochemically reducing said first $Fe^{3+}$ ions in the first catholyte to form $Fe^{2+}$ ions;

transferring the formed $Fe^{2+}$ ions from the dissolution subsystem to an iron-plating subsystem having a second electrochemical cell;

second electrochemically reducing a first portion of the transferred formed $Fe^{2+}$ ions to Fe metal at a second cathode of the second electrochemical cell; and removing the Fe metal from the second electrochemical cell thereby producing iron.

Aspect B1b: A method for producing iron, the method comprising:

providing a feedstock having an iron-containing ore to a dissolution subsystem comprising a first electrochemical cell;

wherein the first electrochemical cell comprises a first anodic chamber having $H_2$ gas in the presence of a first anode, a first cathodic chamber having a first catholyte in the presence of a first cathode, and a first separator separating the first anodic chamber from the first catholyte; and dissolving at least a portion of the iron-containing ore using an acid to form an acidic iron-salt solution having dissolved first $Fe^{3+}$ ions;

providing at least a portion of the acidic iron-salt solution, having at least a portion of the first $Fe^{3+}$ ions, to the first cathodic chamber;

first electrochemically reducing said first $Fe^{3+}$ ions in the first catholyte to form $Fe^{2+}$ ions;

transferring the formed $Fe^{2+}$ ions from the dissolution subsystem to an iron-plating subsystem having a second electrochemical cell;

second electrochemically reducing a first portion of the transferred formed $Fe^{2+}$ ions to Fe metal at a second cathode of the second electrochemical cell; and removing the Fe metal from the second electrochemical cell thereby producing iron.

Aspect B1c: A system for producing iron, the system comprising:

a dissolution subsystem having a dissolution tank and a first electrochemical cell fluidically connected to the dissolution tank;

wherein the first electrochemical cell comprises a first anodic chamber having a first anolyte in the presence of a first anode, a first cathodic chamber having a first catholyte in the presence of a first cathode, and a first separator separating the first anolyte from the first catholyte; and wherein the first anolyte has a different composition than the first catholyte; and a iron-plating subsystem fluidically connected to the dissolution subsystem and having a second electrochemical cell; and a first inter-subsystem fluidic connection between the dissolution subsystem and the iron-plating subsystem;

wherein:

the dissolution tank receives a feedstock having an iron-containing ore;

the dissolution tank comprises an acidic iron-salt solution for dissolving at least a portion of the iron-containing ore to generate dissolved first $Fe^{3+}$ ions;

the first $Fe^{3+}$ ions are electrochemically reduced at the first cathode to form $Fe^{2+}$ ions in the first catholyte;

the formed $Fe^{2+}$ ions are transferred from the dissolution subsystem to the iron-plating subsystem via the first inter-subsystem fluidic connection;

the second electrochemical cell comprises a second cathode for reducing at least a first portion of the transferred formed $Fe^{2+}$ ions to Fe metal; and the Fe metal is removed from the second electrochemical cell.

Aspect B1d: A system for producing iron, the system comprising:

a dissolution subsystem having a dissolution tank and a first electrochemical cell fluidically connected to the dissolution tank;

wherein the first electrochemical cell comprises a first anodic chamber having $H_2$ gas in the presence of a first anode, a first cathodic chamber having a first catholyte in the presence of a first cathode, and a first separator separating the first anodic chamber from the first catholyte; and a iron-plating subsystem fluidically connected to the dissolution subsystem and having a second electrochemical cell; and a first inter-subsystem fluidic connection between the dissolution subsystem and the iron-plating subsystem;

wherein:

the dissolution tank receives a feedstock having an iron-containing ore;

the dissolution tank comprises an acidic iron-salt solution for dissolving at least a portion of the iron-containing ore to generate dissolved first $Fe^{3+}$ ions;

the first $Fe^{3+}$ ions are electrochemically reduced at the first cathode to form $Fe^{2+}$ ions in the first catholyte;

the formed $Fe^{2+}$ ions are transferred from the dissolution subsystem to the iron-plating subsystem via the first inter-subsystem fluidic connection;

the second electrochemical cell comprises a second cathode for reducing at least a first portion of the transferred formed $Fe^{2+}$ ions to Fe metal; and the Fe metal is removed from the second electrochemical cell.

Aspect B2: The method or system of any preceding aspect, comprising electrochemically generating protons in the first electrochemical cell and providing the electrochemically generated protons to the acidic iron-salt solution during the step of dissolving.

Aspect B3: The method or system of aspect B2, or any preceding aspect, wherein the electrochemically generated protons being generated and provided to the acidic iron-salt solution facilitates the acidic iron-salt solution being characterized by a steady state pH being equal to or less than 0.7 (e.g., equal to or less than 0.6, 0.5, 0.4, 0.3, 0.2, 0.1, 0, −0.1, −0.5, or −1, optionally wherein the steady state pH is at least 0.5, 0.4, 0.3, 0.2, 0.1, 0, −0.1, −0.5, or −1 and such values can be combined in any manner to form a range, such as −1 to 0.7) during the step of dissolving.

Aspect B4: The method or system of aspect B2 or aspect B3, or any preceding aspect, wherein the electrochemically generated protons being generated and provided to the acidic iron-salt solution facilitates the acidic iron-salt solution being characterized by a steady state free proton concentration being greater than or equal to 0.2 M (e.g., greater than or equal to 0.3, 0.4, 0.5, 0.8, 1, 1.2, 1.5, 2, 3, 4, or 5 M, optionally wherein the steady state free proton concentration is less than 0.4, 0.5, 0.8, 1, 1.2, 1.5, 2, 3, 4, 5, or 6 M and such values can be combined in any manner to form a range, such as 0.2-6 M) during the step of dissolving.

Aspect B5: The method or system of any one of the preceding aspects comprising continuously removing $Fe^{3+}$ ions from the acidic iron-salt solution during the step of dissolving, to facilitate dissolution of said iron-containing ore, via the step of first electrochemically reducing said first $Fe^{3+}$ ions in the first catholyte.

Aspect B6: The method or system of any one of the preceding aspects, wherein first anolyte has a different pH than the first catholyte.

Aspect B7: The method or system of any one of the preceding aspects, wherein the first catholyte has a lower pH than the first anolyte.

Aspect B8: The method or system of any one of the preceding aspects, wherein the first anolyte comprises a different composition of dissolved salts that in the first catholyte.

Aspect B9: The method or system of any one of the preceding aspects, wherein the first anolyte contains one or more dissolved ferric iron salts, and wherein the first analyte is characterized by a total concentration of the one or more dissolved ferric iron salts being equal to or greater than a total iron ion concentration in the first catholyte.

Aspect B10: The method or system of any one of the preceding aspects, wherein the first catholyte comprises one or more supporting salts.

Aspect B11: The method or system of aspect B10, or any preceding aspect, wherein the first catholyte comprises a concentration of one or more supporting salts being selected from the range of 0.1 to 1M (e.g., 0.2 to 0.8 M, 0.4 to 0.6 M, 0.1 to 0.4 M, 0.4 to 0.8 M, or 0.8 to 1 M).

Aspect B12: The method or system of aspect B10 or B111, or any preceding aspect, wherein the one or more supporting salts comprise one or more metal sulfate compounds and/or one or more metal chloride compounds.

Aspect B13: The method or system of aspect B12, or any preceding aspect, wherein the one or more metal sulfate compounds comprise potassium sulfate, sodium sulfate, ammonium sulfate, lithium sulfate, potassium chloride, sodium chloride, ammonium chloride, lithium chloride, or a combination of these.

Aspect B14: The method or system of any one of the preceding aspects, wherein the first anolyte is characterized by at least one redox couple being different than in the first catholyte.

Aspect B15: The method or system of any one of the preceding aspects, wherein the first anolyte comprises a higher total concentration of dissolved salts than the first catholyte.

Aspect B16: The method or system of any one of aspects B1-B8 and B10-B14, or any preceding aspect, wherein the first anolyte comprises a lower total concentration of dissolved salts than the first catholyte.

Aspect B17: The method or system of any one of the preceding aspects, wherein the first anolyte is ionically connected to the first catholyte through the first separator.

Aspect B18: The method or system of aspect B17, or any preceding aspect, wherein the first anolyte is fluidically disconnected from the first catholyte.

Aspect B19: The method or system of any one of the preceding aspects, wherein the first separator is an ion exchange membrane.

Aspect B20: The method or system of aspect B19, or any preceding aspect, wherein the first separator is a proton exchange membrane (PEM).

Aspect B21: The method or system of any one of the preceding aspects, wherein:
the dissolution subsystem comprises a first dissolution tank fluidically connected with the first electrochemical cell;
the step of dissolving is performed in the dissolution tank such that the dissolved first $Fe^{3+}$ ions are generated in the dissolution tank;
the method comprises first circulating the at least a portion of the acidic iron-salt solution between the dissolution tank and the first electrochemical cell;
the step of first circulating comprises the step of providing at least a portion of the acidic iron-salt solution, having at least a portion of the first $Fe^{3+}$ ions, from the dissolution tank to the first cathodic chamber and the step of first circulating further comprises providing the formed $Fe^{2+}$ ions from the first catholyte to the first dissolution tank.

Aspect B22: The method or system of aspect B21, or any preceding aspect, wherein the portion of the acidic iron-salt solution provided to the first cathodic chamber serves as at least a portion of the first catholyte, such that the first catholyte comprises at least a portion of the acidic-iron salt solution.

Aspect B23: The method or system of aspect B21 or B22, or any preceding aspect, wherein all of the acidic iron-salt solution is circulated between the first dissolution tank and the first electrochemical cell.

Aspect B24: The method or system of aspect B21, B22, or B23, or any preceding aspect, comprising oxidizing water in the first anolyte to electrochemically generate aqueous protons and providing the electrochemically-generated protons to the first catholyte; wherein the step of circulating comprises providing the electrochemically-generated aqueous protons from the first catholyte to the dissolution tank such that the acidic iron-salt solution in the first dissolution tank comprises the electrochemically-generated protons during the step of dissolving.

Aspect B25: The method or system of aspect B24, or any preceding aspect, wherein the water oxidized in the first electrochemical cell is generated in the dissolution tank via the dissolution of the iron-containing ore; and wherein the step of circulating comprises providing the generated water from the first dissolution tank to the first catholyte.

Aspect B26: The method or system of any one of the preceding aspects, comprising providing water to the first anolyte from the first catholyte.

Aspect B27: The method or system of any one of the preceding aspects comprising producing an iron-rich solution having the formed $Fe^{2+}$ ions in the dissolution subsystem; wherein the step of transferring the formed $Fe^{2+}$ ions comprises removing at least a portion of the iron-rich solution from the dissolution subsystem and delivering a delivered iron-rich solution to the iron-plating subsystem; wherein the delivered iron-rich solution comprises at least a portion of the removed iron-rich solution.

Aspect B28: The method or system of aspect B27, or any preceding aspect, wherein the delivered iron-rich solution, having the formed $Fe^{2+}$ ions, is characterized by a pH greater than 0.5 (e.g., greater than: 0.5, 0.6, 0.7, 0.8, 1, 1.5, 2, 2.5, 3, 3.5, 4, 4.5, 5, 5.5, or 6, optionally wherein the pH is less than: 0.6, 0.7, 0.8, 1, 1.5, 2, 2.5, 3, 3.5, 4, 4.5, 5, 5.5, or 6 and such pHs can be combined in any manner to form a range, such as 0.5-6).

Aspect B29: The method or system of aspect B28, or any preceding aspect, wherein the delivered iron-rich solution is characterized by a pH greater than or equal to 1 (e.g., greater than: 1.5, 2, 2.5, 3, 3.5, 4, 4.5, 5, 5.5, or 6, optionally wherein the pH is less than: 2, 2.5, 3, 3.5, 4, 4.5, 5, 5.5, or 6 and such pHs can be combined in any manner to form a range, such as 1-6).

Aspect B30: The method or system of aspect B29, or any preceding aspect, wherein the delivered iron-rich solution is characterized by a pH selected from the range of 2 to 6 (e.g., greater than: 2, 2.5, 3, 3.5, 4, 4.5, 5, 5.5, or 6, optionally wherein the pH is less than: 2, 2.5, 3, 3.5, 4, 4.5, 5, 5.5, or 6 and such pHs can be combined in any manner to form a range).

Aspect B31: The method or system of any one of aspects B27-B30, or any preceding aspect, wherein the delivered iron-rich solution comprises a higher concentration of $Fe^{2+}$ ions than of $Fe^{3+}$ ions.

Aspect B32: The method or system of any one of aspects B27-B31, or any preceding aspect, wherein the delivered iron-rich solution is characterized by a ratio of concentrations of $Fe^{3+}$ ions to $Fe^{2+}$ ions being less than or equal to 0.01 (e.g., less than or equal to 0.01, 0.0075, 0.005, 0.0025, or 0.001, optionally wherein the ratio can be greater than or equal to 0.0075, 0.005, 0.0025, or 0.001 and such values can be combined in any manner to form a range, such as 0.001-0.01).

Aspect B33: The method or system of any one of aspects B27-B32, or any preceding aspect, wherein the delivered iron-rich solution is delivered directly or indirectly to a second cathodic chamber; wherein the second electrochemical cell comprises the second cathodic chamber having a second catholyte in the presence of the second cathode.

Aspect B34: The method or system of aspect B33, or any preceding aspect, wherein at least 70% of the delivered iron-rich solution is delivered directly or indirectly to a second cathodic chamber (e.g., at least: 70%, 75%, 80%, 85%, 90%, 95%, 99%, or 100%, optionally wherein such value is less than 75%, 80%, 85%, 90%, 95%, 99%, or 100% and can be combined in any manner to form a range, such as 70-99%).

Aspect B35: The method or system of aspect B34, or any preceding aspect, wherein at least 90% of the delivered iron-rich solution is delivered directly or indirectly to a second cathodic chamber.

Aspect B36: The method or system of any one of aspects B33-B35, or any preceding aspect, wherein the step of second electrochemically reducing forms a spent second catholyte, the spent second catholyte having a lower concentration of iron ions than that of the delivered iron-rich solution; wherein at least a portion of the spent second catholyte is provided to a second anodic chamber; wherein the second electrochemical cell comprises the second anodic chamber having a second anolyte in the presence of a second anode.

Aspect B37: The method or system of aspect B36, or any preceding aspect, wherein the spent second catholyte is formed when the step of second electrochemically reducing is complete or turned off.

Aspect B38: The method or system of aspect B36 or B37, or any preceding aspect, wherein the spent second catholyte is characterized by a concentration of iron ions being 60% to 70% (e.g., 62-68%, 64-66%, 60-65%, or 65-70%) of a concentration of iron ions in the delivered iron-rich solution.

Aspect B39: The method or system of aspect B37, or any preceding aspect, wherein the step of second electrochemically reducing is complete or turned off when a concentration of iron ions in the second catholyte decreases to 60% to 70% (e.g., 62-68%, 64-66%, 60-65%, or 65-70%) of a concentration of iron ions in the delivered iron-rich solution.

Aspect B40: The method or system of any one of aspects B27-B33, or any preceding aspect, wherein a first portion of the delivered iron-rich solution is delivered directly or indirectly to a second cathodic chamber; wherein a second portion of the delivered iron-rich solution is delivered directly or indirectly to a second anodic chamber; and wherein the second electrochemical cell comprises the second cathodic chamber having a second catholyte in the presence of the second cathode and the second electrochemical cell comprises a second anodic chamber having a second anolyte in the presence of a second anode.

Aspect B41: The method or system of aspect B40, or any preceding aspect, wherein the first portion is 25 vol. % to 45 vol. % (e.g., 30-40 vol. %, 32-38 vol. %, 25-35 vol. %, or 35-45 vol. %) of the delivered iron-rich solution and the second portion is 55 vol. % to 75 vol. % (e.g., 60-70 vol. %, 62-68 vol. %, 55-65 vol. %, or 65-75 vol. %) of the delivered iron-rich solution.

Aspect B42: The method or system of aspect B40 or B41, or any preceding aspect, wherein the first portion comprises 25 mol. % to 45 mol. % (e.g., 30-40 mol. %, 32-38 mol. %, 25-35 mol. %, or 35-45 mol. %) of the $Fe^{2+}$ of the delivered iron-rich solution and the second portion comprises 55 mol. % to 75 mol. % (e.g., 60-70 mol. %, 62-68 mol. %, 55-65 mol. %, or 65-75 mol. %) of the $Fe^{2+}$ of the delivered iron-rich solution.

Aspect B43: The method or system of any one of aspects B27-B42, or any preceding aspect, wherein the step of transferring further comprises treating the removed portion of the iron-rich solution, thereby forming a treated iron-rich solution, prior to the step of delivering; and wherein the delivered iron-rich solution comprises at least a portion of the treated iron-rich solution.

Aspect B44: The method or system of aspect B43, or any preceding aspect, wherein the step of treating comprises: raising a pH of the removed portion of the iron-rich solution.

Aspect B45: The method or system of aspect B43 or B44, or any preceding aspect, wherein the step of treating comprises raising the pH of the removed portion of the iron-rich solution by providing metallic iron in the presence of the removed portion of the iron-rich solution; and wherein a reaction between the removed portion of the iron-rich solution and the provided metallic iron consumes protons in the removed portion of the iron-rich solution.

Aspect B46: The method or system of aspect B45, or any preceding aspect, wherein raising the pH of the removed portion of the iron-rich solution further comprises providing magnetite in the presence of the removed portion of the iron-rich solution prior to and/or concurrently with providing the metallic iron in the presence of the removed portion of the iron-rich solution.

Aspect B47: The method or system of aspect B45 or B46, or any preceding aspect, wherein a reaction between the removed portion of the iron-rich solution and the provided metallic iron chemically-generates $H_2$ gas; and wherein the method further comprises collecting the chemically-generated $H_2$ gas.

Aspect B48: The method or system of any one of aspects B43-B47, or any preceding aspect, wherein the treated ferrous solution has a pH selected from the range of 2 to less than 7 (e.g., 2-4, 4-6, 6 to less than 7, 3 to less than 7, 3-6, or 4-5).

Aspect B49: The method or system of any one of the preceding aspects comprising electrochemically oxidizing $Fe^{2+}$ ions to form second $Fe^{3+}$ ions in a second anolyte; wherein the second electrochemical cell comprises the second cathodic chamber having a second catholyte in the presence of the second cathode and the second electrochemical cell comprises a second anodic chamber having a second anolyte in the presence of a second anode.

Aspect B50: The method or system of aspect B49, or any preceding aspect, comprising recycling a first recycle solution from the iron-plating subsystem to the dissolution subsystem; wherein the recycle solution comprises the second $Fe^{3+}$ ions formed in the second anolyte.

Aspect B51: The method or system of aspect B50, or any preceding aspect, wherein the step of recycling is performed after the step of second electrochemically reducing is complete or turned off.

Aspect B52: The method or system of aspect B50 or B51, or any preceding aspect, wherein the first recycle solution is provided to a first dissolution tank; wherein the step of dissolving is performed in the first dissolution tank comprising the iron-containing ore and the acidic iron-salt solution.

Aspect B53: The method or system of aspect B50, B51, or B52, or any preceding aspect, wherein the first recycle solution comprises at least a portion of the second catholyte and the second anolyte from the second electrochemical cell.

Aspect B54: The method or system of any one of aspects B27-B53, or any preceding aspect, wherein the step of second electrochemically reducing is complete or turned off when the second catholyte of the second electrochemical cell is characterized by a total concentration of iron ions being 60% to 70% (optionally 50 to 80%; optionally, 62-68%, 64-66%, 60-65%, or 65-70%) of a concentration of iron ions in (i) the delivered iron-rich solution or (ii) the produced iron-rich solution.

Aspect B55: Any preceding aspect.

Aspect B56: Any preceding aspect.

Aspect B57: The method or system of any one of the preceding aspects, wherein the step of second electrochemically reducing is complete or turned off when an average thickness of the formed Fe metal on a second cathode of the second electrochemical cell is selected from the range of 1 mm to 10 mm (e.g., an average thickness (mm) of 1-10, 1-8, 1-6, 1-4, 1-2, 2-10, 2-8, 2-6, 2-4, 4-10, 4-8, 4-6, 6-10, 6-8, or 8-10).

Aspect B58: Any preceding aspect.

Aspect B59: The method or system of any one of the preceding aspects, wherein the iron-plating subsystem comprises a first circulation tank configured circulate a second catholyte between a second cathodic chamber of the second electrochemical cell and the first circulation tank, and wherein the iron-plating subsystem comprises a second circulation tank configured circulate a second anolyte between a second anodic chamber of the second electrochemical cell and the second circulation tank.

Aspect B60: The method or system of aspect B59, or any preceding aspect, wherein iron-rich solution indirectly delivered to the second cathodic chamber is delivered to the first circulation tank.

Aspect B61: The method or system of any one of the preceding aspects, wherein the second electrochemical cell comprises a second catholyte and a second anolyte separated by a second separator.

Aspect B62: The method or system of aspect B61, wherein the second separator is a PEM or an anion exchange membrane (AEM) or a microporous separator.

Aspect B63: The method or system of any one of the preceding aspects, wherein the first electrochemical cell is operated at a different current density than the second electrochemical cell.

Aspect B64: The method or system of any one of the preceding aspects, wherein the first electrochemical cell is concurrently operated at a different current density than the second electrochemical cell.

Aspect B65: The method or system of aspect B63 or B64, or any preceding aspect, wherein the first electrochemical cell is operated at a higher current density than the second electrochemical cell.

Aspect B66: The method or system of aspect B63, B64, or B65, or any preceding aspect, wherein the first electrochemical cell is operated at a current density selected from the range of 0.1 to 2 A/cm$^2$ (e.g., a current density (A/cm$^2$) of 0.1-2, 0.1-1.5, 0.1-1, 0.1-0.5, 0.5-2, 0.5-1.5, 0.5-1, 1-2, 1-1.5, or 1.5-2) and the second electrochemical cell is operated at a current density selected from the range of 20 to 300 mA/cm$^2$ (e.g., a current density (mA/cm$^2$) of 20-300, 20-250, 20-200, 20-150, 20-100, 20-50, 50-300, 50-250, 50-200, 50-150, 50-100, 100-300, 100-250, 100-200, 100-150, 150-300, 150-250, 150-200, 200-300, 200-250, or 250-300).

Aspect B67: The method or system of any one of the preceding aspects comprising repeating the method for at least 5 cycles (e.g., at least: 5, 6, 7, 8, 9, 10, 15, 20, 30, 50, or 100 cycles, optionally wherein the cycles is less than: 6, 7, 8, 9, 10, 15, 20, 30, 50, 100, or 150 and each such value can be combined in any manner to form a range, such as 5-150).

Aspect B68: The method or system of any one of the preceding aspects, wherein the iron-containing ore comprises one or more iron oxide materials.

Aspect B69: The method or system of any of the preceding aspects, wherein the one or more iron oxide materials comprise hematite, maghemite, ferrihydrite, magnetite, geothite, akaganite, lepidocrocite, ferroxyhite, or any combination of these.

Aspect B70: The method or system of any one of the preceding aspects, wherein the step of dissolving comprises dissolving magnetite in the iron-containing ore.

Aspect B71: The method or system of any one of the preceding aspects comprising generating $H_2$ gas and collecting the generated $H_2$ gas.

Aspect B72: The method or system of aspect B47 or B71, or any preceding aspect, at least a portion of the collected $H_2$ gas is oxidized is used as a reductant in a process for thermally reducing iron-containing ore.

Aspect B73: The method or system of any one of the preceding aspects comprising electrically controlling the first electrochemical cell to prevent Fe metal electroplating at the first cathode.

Aspect B74: The method or system of any one of the preceding aspects, wherein the second electrochemical cell is operating at a temperature selected from the range of 40° C. to 80° C. (e.g., 45-75° C., 50-70° C., 55-65° C., 40-55° C., 55-70° C., 40-70° C., or 50-80° C.).

Aspect B75: The method or system of any one of the preceding aspects, wherein the second electrochemical cell comprises a second catholyte and a second anolyte; and wherein the second anolyte has a lower pH than the second catholyte.

Aspect B76: The method or system of aspect B75, or any preceding aspect, wherein the pH of the second anolyte is less than that of a solubility limit of $Fe(III)(OH)_2$.

Aspect B77: The method or system of aspect B75 or B76, or any preceding aspect, wherein the second catholyte has a pH less than 6 (e.g., less than: 6, 5.5, 5, 4.5, 4, 3.5, 3, 2.5, 2, 1.5, 1, 0.5, 0, −0.5, or −1, optionally wherein the pH is at least 5.5, 5, 4.5, 4, 3.5, 3, 2.5, 2, 1.5, 1, 0.5, 0, −0.5, or −1 and any of such values can be combined in any manner to form a range, such as −1 to 6) during the step of second electrochemically reducing.

Aspect B78: The method or system of any one of the preceding aspects, wherein the removed Fe metal comprises at least 99 wt. % Fe (e.g., at least: 99 wt. %, at least 99.5 wt. %, at least 99.9 wt. %, or 100 wt. %).

Aspect B79: The method or system of any one of the preceding aspects, wherein the first anode has a composition comprising lead, lead oxide, manganese oxide, a mixed metal oxide, iridium oxide, ruthenium oxide, or any combination of these.

Aspect B80: The method or system of any one of the preceding aspects, wherein the first cathode has a composition comprising, carbon, graphite, titanium, or any combination of these.

Aspect B81: The method or system of any one of the preceding aspects, wherein the second anode has a composition comprising carbon, graphite, lead, lead oxide, a mixed metal oxide, or any combination of these.

Aspect B82: The method or system of any one of the preceding aspects, wherein the second cathode has a composition comprising, steel, low carbon steel, stainless steel, copper, copper alloy, or any combination of these.

Aspect B83: A system for producing iron, the system comprising:
a dissolution subsystem having a dissolution tank and a first electrochemical cell fluidically connected to the dissolution tank;
  wherein the first electrochemical cell comprises a first anodic chamber having a first anolyte in the presence of a first anode, a first cathodic chamber having a first catholyte in the presence of a first cathode, and a first separator separating the first anolyte from the first catholyte; and
  wherein the first anolyte has a different composition than the first catholyte; and
a iron-plating subsystem fluidically connected to the dissolution subsystem and having a second electrochemical cell; and
a first inter-subsystem fluidic connection between the dissolution subsystem and the iron-plating subsystem;
wherein:
the dissolution tank receives a feedstock having an iron-containing ore;
the dissolution tank comprises an acidic iron-salt solution for dissolving at least a portion of the iron-containing ore to generate dissolved first $Fe^{3+}$ ions;
the first $Fe^{3+}$ ions are electrochemically reduced at the first cathode to form $Fe^{2+}$ ions in the first catholyte;
the formed $Fe^{2+}$ ions are transferred from the dissolution subsystem to the iron-plating subsystem via the first inter-subsystem fluidic connection;
the second electrochemical cell comprises a second cathode for reducing at least a first portion of the transferred formed $Fe^{2+}$ ions to Fe metal; and
the Fe metal is removed from the second electrochemical cell.

Aspect B84: The method or system of aspect B83, or any preceding aspect, wherein the second electrochemical cell comprises a second cathodic chamber having a second catholyte in the presence of the second cathode and the second electrochemical cell comprises a second anodic chamber having a second anolyte in the presence of a second anode.

Aspect B85: The method or system of aspect B84, or any preceding aspect, wherein $Fe^{2+}$ ions are oxidized to $Fe^{3+}$ ions in the second anolyte.

Aspect B86: The method or system of any one of aspects B83-B85, or any preceding aspect, wherein the dissolution subsystem produces an iron-rich solution having the formed $Fe^{2+}$ ions; wherein system comprises a transition subsystem for removing at least a portion of the produced iron-rich solution and treating the removed portion of the iron-rich solution, thereby forming a treated iron-rich solution.

Aspect B87: The method or system of any one of aspects B84-B87, or any preceding aspect, comprising a spent electrolyte recycling system configured to recycle a first recycle solution from the second electrochemical cell to the dissolution subsystem.

Aspect B88: The method or system of aspect B87, or any preceding aspect, wherein the first recycle solution comprises at least a portion of the second anolyte and at least a portion of the second catholyte.

Aspect B89: The method or system of aspect B87, or any preceding aspect, wherein the first recycle solution is formed by mixing at least a portion of the second anolyte and at least a portion of the second catholyte after the reduction of the formed $Fe^{2+}$ ions to Fe metal is complete or turned off.

Aspect B90: A method for producing iron, the method comprising:
providing a feedstock having an iron-containing ore to a dissolution subsystem comprising a first electrochemical cell;
  wherein the first electrochemical cell comprises a first anodic chamber having $H_2$ gas in the presence of a first anode, a first cathodic chamber having a first catholyte in the presence of a first cathode, and a first separator separating the first anodic chamber from the first catholyte; and dissolving at least a portion of the iron-containing ore using an acid to form an acidic iron-salt solution having dissolved first $Fe^{3+}$ ions;

providing at least a portion of the acidic iron-salt solution, having at least a portion of the first $Fe^{3+}$ ions, to the first cathodic chamber;

first electrochemically reducing said first $Fe^{3+}$ ions in the first catholyte to form $Fe^{2+}$ ions;

transferring the formed $Fe^{2+}$ ions from the dissolution subsystem to an iron-plating subsystem having a second electrochemical cell;

second electrochemically reducing a first portion of the transferred formed $Fe^{2+}$ ions to Fe metal at a second cathode of the second electrochemical cell; and removing the Fe metal from the second electrochemical cell thereby producing iron.

Aspect B91: The method or system of aspect B90, or any preceding aspect, comprising oxidizing the $H_2$ gas at the first anode to electrochemically generate protons.

Aspect B92: The method or system of any of the above or below aspects, wherein the step of dissolving is terminated when a proton concentration (optionally, a steady state proton concentration) in the acidic iron-salt solution is equal to or less than 0.4 M (optionally 0.3 M, optionally 0.2 M, optionally 0.1 M) (optionally after being above this threshold for a majority of the time the step of dissolving is performed).

Aspect B93: The method or system of any of the above or below aspects, wherein the step of dissolving is terminated when a total iron ion concentration in the first catholyte, in the acidic iron-salt solution, and/or the produced iron-rich solution reaches a desired maximum value (optionally, a steady state value) being 1 M, optionally 2 M, optionally 3 M, optionally 4 M, optionally any value or range between 1 M and 4M inclusively.

Aspect C1a: A method for producing iron, the method comprising:

providing a feedstock having an iron-containing ore and one or more impurities to a dissolution subsystem comprising a first electrochemical cell;

wherein the first electrochemical cell comprises a first anodic chamber having a first anolyte in the presence of a first anode, a first cathodic chamber having a first catholyte in the presence of a first cathode, and a first separator separating the first anolyte from the first catholyte;

dissolving at least a portion of the iron-containing ore using an acid to form an acidic iron-salt solution having dissolved first $Fe^{3+}$ ions;

providing at least a portion of the acidic iron-salt solution, having at least a portion of the first $Fe^{3+}$ ions, to the first cathodic chamber;

first electrochemically reducing said first $Fe^{3+}$ ions in the first catholyte to form $Fe^{2+}$ ions;

producing an iron-rich solution in the dissolution subsystem, the iron-rich solution having at least a portion of the formed $Fe^{2+}$ ions and at least a portion of the one or more impurities;

treating at least a first portion of the iron-rich solution to remove at least a portion of the one or more impurities from the iron-rich solution, thereby forming a treated iron-rich solution having at least a portion of the formed $Fe^{2+}$ ions;

wherein the step of treating comprises raising a pH of the iron-rich solution from an initial pH to an adjusted pH thereby precipitating at least a portion of the one or more impurities in the treated iron-rich solution;

delivering at least a first portion of the treated iron-rich solution to an iron-plating subsystem having a second electrochemical cell;

second electrochemically reducing at least a first portion of the transferred formed $Fe^{2+}$ ions to Fe metal at a second cathode of the second electrochemical cell; and removing the Fe metal from the second electrochemical cell thereby producing iron.

Aspect C1b: A system for producing iron, the system comprising:

a dissolution subsystem having a first dissolution tank and a first electrochemical cell fluidically connected to the first dissolution tank;

wherein the first electrochemical cell comprises a first cathodic chamber having a first anolyte in the presence of a first anode, a second anodic chamber having a first catholyte in the presence of a first cathode, and a first separator separating the first anolyte from the first catholyte; and an iron-plating subsystem fluidically connected to the dissolution subsystem and having a second electrochemical cell; and a first impurity-removal subsystem;

wherein:

the first dissolution tank receives a feedstock having one or more iron-containing ores and one or more impurities;

the first dissolution tank comprises an acidic iron-salt solution for dissolving at least a portion of the one or more iron-containing ores to generate dissolved first $Fe^{3+}$ ions in the acidic iron-salt solution;

at least a portion of the acidic iron-salt solution, having at least a portion of the first $Fe^{3+}$ ions, is provided to the first cathodic chamber;

the first $Fe^{3+}$ ions are electrochemically reduced at the first cathode to form $Fe^{2+}$ ions in the first catholyte;

an iron-rich solution is formed in the dissolution subsystem, the iron-rich solution having at least a portion of the formed $Fe^{2+}$ ions and at least a portion of the one or more impurities;

at least a portion of the iron-rich solution is provided to the first impurity removal subsystem to remove at least a portion of the one or more impurities from the iron-rich solution, thereby forming a treated iron-rich solution having at least a portion of the formed $Fe^{2+}$ ions;

wherein a pH of the iron-rich solution is raised, in the first impurity removal subsystem, from an initial pH to an adjusted pH to precipitate the removed portion one or more impurities;

at least a first portion of the treated iron-rich solution is delivered from the first impurity-removal subsystem to the iron-plating subsystem;

the second electrochemical cell comprises a second cathode for reducing at least a portion of the transferred delivered $Fe^{2+}$ ions to Fe metal; and the Fe metal is removed from the second electrochemical cell.

Aspect C2: The method or system of aspect C1a or C1b, or any preceding aspect, wherein dissolving at least a portion of the iron-containing ore generates insoluble impurities; and wherein the method further comprises separating and removing at least a portion of the insoluble impurities.

Aspect C3: The method or system of aspect C2, or any preceding aspect, wherein the removal of at least a portion of the insoluble impurities is by filtering and/or separating out the insoluble impurities.

Aspect C4: The method or system of aspect C2 or C3, or any preceding aspect, wherein the insoluble impurities comprise quartz, gypsum, and any combination of these.

Aspect C5a: The method or system of any one of the preceding aspects, wherein the adjusted pH is at or greater than a precipitation pH of the one or more impurities and below a precipitation pH of $Fe^{2+}$ ions, thereby precipitating at least a portion of the one or more impurities.

Aspect C5b: The method or system of any one of the preceding aspects, wherein the adjusted pH is at or beyond a solubility limit of the one or more impurities and below a solubility limit of $Fe^{2+}$ ions, thereby precipitating at least a portion of the one or more impurities.

Aspect C6a: The method or system of aspect C5a or C5b, or any preceding aspect, wherein the adjusted pH is at or greater than a precipitation pH of aluminum, titanium, and phosphate ions and below the precipitation pH of $Fe^{2+}$ ions, thereby precipitating at least a portion of aluminum, titanium, and phosphorous-containing ions.

Aspect C6b: The method or system of aspect C5a or C5b, or any preceding aspect, wherein the adjusted pH is at or beyond a solubility limit of aluminum, titanium, and phosphate ions and below a solubility limit of $Fe^{2+}$ ions, thereby precipitating at least a portion of aluminum, titanium, and phosphorous-containing ions.

Aspect C7: The method or system of any one of aspects C3-C6, or any preceding aspect, comprising precipitating titanium hydroxide, aluminum hydroxide, aluminum phosphate, and/or iron phosphate.

Aspect C8: The method or system of any one of aspects C3-C7, or any preceding aspect, comprising removing at least a portion of precipitated impurities.

Aspect C9: The method or system of any one of aspects C1-C8, or any preceding aspect, wherein the adjusted pH is selected from the range of 3 to 7 (e.g., 3-6.5, 3-6, 3-5.5, 3-5, 3 to less than 7, 3-6, 3-5, 3-4, 4-7, 4 to less than 7, 4-6, 4-5, 5-7, 5 to less than 7, 5-6, 6-7, or 6 to less than 7).

Aspect C10: The method or system of aspect C9, or any preceding aspect, wherein the adjusted pH is selected from the range of 4 to less than 7 (e.g., 4-6.5, 4-5.5, 4 to less than 7, 4-6, 4-5, 5 to less than 7, 5-6, or 6 to less than 7).

Aspect C11: The method or system of any one of aspects C1-C10, or any preceding aspect, wherein the adjusted pH also results in coagulation of colloidal silica caused by the precipitation of other impurities; the method further comprising removal of at least a portion of the colloidal silica.

Aspect C12: The method or system of any one of aspects C1-C11, or any preceding aspect, wherein the step of raising the pH comprises providing metallic iron and/or an iron oxide material in the presence of the iron-rich solution; and wherein a reaction between the removed portion of the iron-rich solution and the provided metallic iron and/or iron oxide material consumes protons in the iron-rich solution thereby raising its pH.

Aspect C13: The method or system of aspect C12, or any preceding aspect, wherein the step of raising the pH comprises first providing the iron oxide material in the presence of the iron-rich solution and subsequently providing metallic iron in the presence of the iron-rich solution.

Aspect C14: The method or system of aspect C12, or any preceding aspect, wherein raising the pH of the removed portion of the iron-rich solution further comprises providing the iron oxide material in the presence of the removed portion of the iron-rich solution prior to and/or concurrently with providing the metallic iron in the presence of the removed portion of the iron-rich solution.

Aspect C15: The method or system of any one of aspects C12-C14, or any preceding aspect, wherein the iron oxide material comprises magnetite.

Aspect C16: The method or system of any one of aspects C12-C15, or any preceding aspect, wherein the provided iron oxide material comprises a thermally reduced iron-containing ore.

Aspect C17: The method or system of any one of aspects C12-C16, or any preceding aspect, wherein the metallic iron is a portion of the Fe metal formed during the step of second electrochemically reducing.

Aspect C18: The method or system of any one of the preceding aspects, wherein the treated ferrous product solution is characterized by:

a concentration of aluminum ions being less than 1 mM or 0.2 M (e.g., less than: 0.2 M, 0.15 M, 0.12 M, 0.1 M, 80 mM, 60 mM, 50 mM, 20 mM, 10 mM, 5 mM, 1 mM, optionally wherein the concentration of aluminum ions is 0 mM or at least: 0.15 M, 0.12 M, 0.1 M, 80 mM, 60 mM, 50 mM, 20 mM, 10 mM, 5 mM, 1 mM, and each of such values can be combined in any manner to form a range, such as 0-0.2 M or 1 mM to 0.1 M); and/or a concentration of phosphorous-containing ions being less than 1 mM or 0.2 M (e.g., less than: 0.2 M, 0.15 M, 0.12 M, 0.1 M, 80 mM, 60 mM, 50 mM, 20 mM, 10 mM, 5 mM, 1 mM, optionally wherein the concentration of phosphorous-containing ions is 0 mM or at least: 0.15 M, 0.12 M, 0.1 M, 80 mM, 60 mM, 50 mM, 20 mM, 10 mM, 5 mM, 1 mM, and each of such values can be combined in any manner to form a range, such as 0-0.2 M or 1 mM to 0.1 M).

Aspect C19: The method or system of any one of the preceding aspects, wherein the second electrochemical cell comprises a second cathodic chamber having a second catholyte in the presence of the second cathode, a second anodic chamber having a second anolyte in the presence of a second anode, and a second separator separating the second catholyte from the second anolyte.

Aspect C20: The method or system of aspect C19, or any preceding aspect, wherein the treated iron-rich solution is directly or indirectly delivered to the second cathodic chamber.

Aspect C21: The method or system of aspect C20, or any preceding aspect, wherein the treated iron-rich solution is not delivered to the second anodic chamber.

Aspect C22: The method or system of aspect C20 or C21, or any preceding aspect, comprising delivering a second portion of the produced iron-rich solution directly or indirectly to the second anodic chamber; wherein the second portion of the iron-rich solution is either untreated or subjected to a different treatment than the first portion of the iron-rich solution.

Aspect C23: The method or system of any one of the preceding aspects, wherein the iron-rich solution comprises colloidal silica; and wherein the step of treating comprises removing at least a portion of the colloidal silica.

Aspect C24: The method or system of aspect C23, or any preceding aspect, wherein removing colloidal silica comprises flocculation of at least a portion of the colloidal silica to generate flocculated colloidal silica.

Aspect C25: The method or system of aspect C23 or C24, or any preceding aspect, wherein the step of removing colloidal silica comprises adding polyethylene oxide to the iron-rich solution to facilitate flocculation of the colloidal silica, thereby generating flocculated colloidal silica.

Aspect C26: The method or system of any one of aspects C23-C25, or any preceding aspect, wherein removing colloidal silica is by filtering, settling, and/or any solid-liquid separation process.

Aspect C27: The method or system of any one of the preceding aspects, wherein the treated iron-rich solution has a colloidal silica content being less than or equal to 10 mM (e.g., less than or equal to: 10 mM, 8 mM, 6 mM, 5 mM, 4 mM, 2 mM, or 1 mM, optionally wherein the colloidal silica content is 0 mM or at least 8 mM, 6 mM, 5 mM, 4 mM, 2 mM, or 1 mM and each of such values can be combined in any manner to form a range, such as 0-10 mM, or 1-8 mM).

Aspect C28: The method or system of any one of the preceding aspects, wherein the initial pH is within the range of 0.5 to 1.5 (e.g., 0.5-1, 1-1.5, 0.8-1.3, or 0.7-1.4).

Aspect C29: The method or system of any one of the preceding aspects, wherein the iron-rich solution is characterized by the initial pH and further has a higher concentration of $Fe^{2+}$ ions than $Fe^{3+}$ ions.

Aspect C30: The method or system of any one of the preceding aspects, wherein the iron-rich solution is characterized by a ratio of concentrations of $Fe^{3+}$ ions to $Fe^{2+}$ ions being less than or equal to 0.1 (e.g., less than or equal to: 0.1, 0.09, 0.08, 0.07, 0.06, 0.05, 0.04, 0.03, 0.02, 0.01, or 0.005, optionally wherein the ratio is at least 0.09, 0.08, 0.07, 0.06, 0.05, 0.04, 0.03, 0.02, 0.01, or 0.005 and each of such values can be combined in any manner to form a range, such as 0.005-0.1, or 0.02 to 0.08).

Aspect C31: The method or system of any one of the preceding aspects wherein the pH of the treated iron-rich solution decreases during plating.

Aspect C32: The method or system of aspect C31, wherein the pH during plating is within the range of 2 to 6 (e.g., 2-6, 2-5, 2-4, 2-3, 3-6, 3-5, 3-4, 4-6, or 4-5).

Aspect C33: The method or system of any one of the preceding aspects, wherein the feedstock comprises magnetite, hematite, goethite, or any combination thereof.

Aspect C34: The method or system of any one of the preceding aspects, wherein the one or more impurities comprise aluminum compounds, titanium compounds, phosphate compounds, silicon compounds, or any combination of these.

Aspect C35: The method or system of any one of the preceding aspects, wherein the feedstock comprises the one or more impurities at a concentration selected from the range of 1 to 50 wt. % (e.g., a wt. % of 1-50, 1-45, 1-40, 1-35, 1-30, 1-25, 1-20, 1-15, 1-10, 1-5, 5-50, 5-45, 5-40, 5-35, 5-30, 5-25, 5-20, 5-15, 5-10, 10-50, 10-45, 10-40, 10-35, 10-30, 10-25, 20-50, 20-40, 20-30, 30-50, 30-40, or 40-50).

Aspect C36: The method or system of any one of the preceding aspects comprising a step of second treating the second anolyte and/or the second catholyte from the second electrochemical cell to adjusting pH, change composition and/or remove impurities.

Aspect C37: The method or system of any one of the preceding aspects, wherein the step of second treating is performed after the step of second electrochemically reducing is complete or turned off.

Aspect C38a: The method or system of any one of the preceding aspects, wherein the removed Fe metal is characterized by:

a concentration of aluminum being less than 0.1 wt. % or less than 0.5 wt. % (e.g., a wt. % of aluminum of less than 0.5, 0.2, 0.1, 0.08, 0.06, 0.05, 0.02, 0.01, or 0.005, optionally wherein the wt. % is at least 0.2, 0.1, 0.08, 0.06, 0.05, 0.02, 0.01, or 0.005 and such values can be combined in any manner to form a range, such as 0.005-0.5 or 0.01 to 0.1); and/or a concentration of phosphorous ions being less than 0.01 wt. % or less than 0.5 wt. % (optionally, a wt. % of phosphorous of less than 0.5, 0.2, 0.1, 0.08, 0.06, 0.05, 0.02, 0.01, 0.008, 0.006, 0.005, 0.002, or 0.001; optionally wherein the wt. % is at least 0.2, 0.1, 0.08, 0.06, 0.05, 0.02, 0.01, 0.008, 0.006, 0.005, 0.002, 0.001, or 0.0005 and such values can be combined in any manner to form a range, such as 0.0005-0.5 or 0.001-0.01).

Aspect C38b: The method or system of any one of the preceding aspects, wherein the removed Fe metal is characterized by:

a concentration of aluminum being less than 0.1 wt. % or less than 0.5 wt. % (e.g., a wt. % of aluminum of less than 0.5, 0.2, 0.1, 0.08, 0.06, 0.05, 0.02, 0.01, or 0.005, optionally wherein the wt. % is at least 0.2, 0.1, 0.08, 0.06, 0.05, 0.02, 0.01, or 0.005 and such values can be combined in any manner to form a range, such as 0.005-0.5 or 0.01 to 0.1); and/or a concentration of phosphorous ions being less than 0.01 wt. % or less than 0.5 wt. % (optionally, a wt. % of phosphorous of less than 0.5, 0.2, 0.1, 0.08, 0.06, 0.05, 0.02, 0.01, 0.008, 0.006, 0.005, 0.002, or 0.001; optionally wherein the wt. % is at least 0.2, 0.1, 0.08, 0.06, 0.05, 0.02, 0.01, 0.008, 0.006, 0.005, 0.002, 0.001, or 0.0005 and such values can be combined in any manner to form a range, such as 0.0005-0.5 or 0.001-0.01); and/or a concentration of manganese ions being less than 1 wt. % or less than 0.5 wt. % (optionally, a wt. % of manganese of less than 0.9, 0.8, 0.7, 0.6, 0.5, 0.2, 0.1, 0.08, 0.06, 0.05, 0.02, 0.01, 0.008, 0.006, 0.005, 0.002, or 0.001; optionally wherein the wt. % is at least 0.2, 0.1, 0.08, 0.06, 0.05, 0.02, 0.01, 0.008, 0.006, 0.005, 0.002, 0.001, or 0.0005 and such values can be combined in any manner to form a range, such as 0.0005-0.5 or 0.001-0.01).

Aspect C39: The method or system of any one of the preceding aspects, wherein the first anolyte has a different composition than the first catholyte.

Aspect C40: A system for producing iron, the system comprising:

a dissolution subsystem having a first dissolution tank and a first electrochemical cell fluidically connected to the first dissolution tank;

wherein the first electrochemical cell comprises a first cathodic chamber having a first anolyte in the presence of a first anode, a second anodic chamber having a first catholyte in the presence of a first cathode, and a first separator separating the first anolyte from the first catholyte; and
an iron-plating subsystem fluidically connected to the dissolution subsystem and having a second electrochemical cell; and
a first impurity-removal subsystem;
wherein:
the first dissolution tank receives a feedstock having one or more iron-containing ores and one or more impurities;
the first dissolution tank comprises an acidic iron-salt solution for dissolving at least a portion of the one or more iron-containing ores to generate dissolved first $Fe^{3+}$ ions in the acidic iron-salt solution;
at least a portion of the acidic iron-salt solution, having at least a portion of the first $Fe^{3+}$ ions, is provided to the first cathodic chamber;
the first $Fe^{3+}$ ions are electrochemically reduced at the first cathode to form $Fe^{2+}$ ions in the first catholyte;
an iron-rich solution is formed in the dissolution subsystem, the iron-rich solution having at least a portion of the formed $Fe^{2+}$ ions and at least a portion of the one or more impurities;
at least a portion of the iron-rich solution is provided to the first impurity removal subsystem to remove at least a portion of the one or more impurities from the iron-rich solution, thereby forming a treated iron-rich solution having at least a portion of the formed $Fe^{2+}$ ions;
wherein a pH of the iron-rich solution is raised, in the first impurity removal subsystem, from an initial pH to an adjusted pH to precipitate the removed portion one or more impurities;
at least a first portion of the treated iron-rich solution is delivered from the first impurity-removal subsystem to the iron-plating subsystem;
the second electrochemical cell comprises a second cathode for reducing at least a portion of the transferred delivered $Fe^{2+}$ ions to Fe metal; and
the Fe metal is removed from the second electrochemical cell.

Aspect D1a: A method for producing iron, the method comprising:
in a first dissolution tank, contacting a first iron-containing ore with an acid to dissolve at least a portion of the first iron-containing ore thereby forming an acidic iron-salt solution having dissolved first $Fe^{3+}$ ions;
circulating at least a portion of the acidic iron-salt solution between the first dissolution tank and a first cathodic chamber of a first electrochemical cell, thereby providing at least a portion of the first $Fe^{3+}$ ions to a first catholyte of the first cathodic chamber;
wherein the first electrochemical cell comprises a first anodic chamber having a first anolyte in the presence of a first anode, the first cathodic chamber having the first catholyte in the presence of a first cathode, and a first separator separating the first anolyte from the first catholyte;
first electrochemically reducing at least a portion of the first $Fe^{3+}$ ions at the first cathode to form $Fe^{2+}$ ions in the first catholyte;
electrochemically generating protons in the first electrochemical cell;
wherein the step of circulating comprises providing at least a portion of the electrochemically generated protons and at least a portion of the formed $Fe^{2+}$ ions from the first catholyte to the acidic iron-salt solution;
producing a first iron-rich solution having the formed $Fe^{2+}$ ions in a dissolution subsystem, the dissolution subsystem comprising the first dissolution tank and the first electrochemical cell;
transferring at least a portion of the first iron-rich solution to an iron-plating subsystem, the iron-plating subsystem comprising a second electrochemical cell;
second electrochemically reducing a first portion of the formed $Fe^{2+}$ ions to Fe metal at a second cathode of the second electrochemical cell;
wherein the second electrochemical cell comprises a second cathodic chamber having a second catholyte in the presence of the second cathode; a second anodic chamber having a second anolyte in the presence of a second anode, and a second separator separating the first anolyte from the first catholyte; and
removing the Fe metal from the second electrochemical cell thereby producing the iron.

Aspect D1b: A system for producing iron, the system comprising:
a dissolution subsystem for producing an iron-rich solution, wherein the dissolution subsystem comprises a first dissolution tank, a first electrochemical cell, and a first circulation subsystem; wherein:
in the first dissolution tank, an iron-containing ore is contacted with an acid to dissolve at least a portion of the iron-containing ore to thereby form an acidic iron-salt solution having dissolved $Fe^{3+}$ ions;
the first circulation subsystem circulates at least a portion of the acidic iron-salt solution between the first dissolution tank and a first cathodic chamber of the first electrochemical cell, thereby providing at least a portion of the first $Fe^{3+}$ ions to a first catholyte of the first cathodic chamber;
wherein the first electrochemical cell comprises a first anodic chamber having a first anolyte in the presence of a first anode, the first cathodic chamber having the first catholyte in the presence of a first cathode, and a first separator separating the first anolyte from the first catholyte;
the first electrochemical cell electrochemically reduces at least a portion of the first $Fe^{3+}$ ions at the first cathode to form $Fe^{2+}$ ions in the first catholyte;
the first electrochemical cell electrochemically generates protons and provides the electrochemically generated protons to the catholyte; wherein the first circulation system provides the electrochemically generated protons from the first catholyte to the acidic iron-salt solution; and
the iron-rich solution produced in the first subsystem comprises the formed $Fe^{2+}$ ions;
a transition subsystem comprising a first inter-subsystem fluidic connection for transferring at least a portion of the iron-rich solution to an iron-plating subsystem;
the iron-plating subsystem comprising a second electrochemical cell;
wherein the second electrochemical cell comprises a second cathodic chamber having a second catholyte in the presence of the second cathode; a second anodic chamber having a second anolyte in the presence of a second anode, and a second separator separating the first anolyte from the first catholyte having a second catholyte in the presence of a second cathode;

wherein at least a first portion of the transferred formed $Fe^{2+}$ ions are electrochemically reduced to Fe metal at the second cathode; and an iron-removal subsystem for removing the Fe metal from the second electrochemical cell thereby producing the iron.

Aspect D2: The method or system of aspect D1a or D1b, or any preceding aspect, comprising thermally reducing one or more non-magnetite iron oxide materials in the iron-containing ore to form magnetite in the presence of a reductant, thereby forming a thermally-reduced ore; wherein the first iron-containing ore in the first dissolution tank comprises the thermally-reduced ore; and wherein the step of dissolving comprises dissolving at least a portion of the thermally-reduced ore using an acid to form an acidic iron-salt solution.

Aspect D3: The method or system of aspect D2, or any preceding aspect, comprising providing at least a portion of a catholyte having said electrochemically generated protons from the electrochemical cell to the acidic iron-salt solution during the step of dissolving, thereby providing the electrochemically generated protons to the acidic iron-salt solution in the presence of the thermally-reduced ore.

Aspect D4: The method or system of aspect D3, or any preceding aspect, wherein the step of dissolving is performed in a dissolution tank; wherein the dissolution tank and the electrochemical cell are fluidically connected; and wherein the acidic iron-salt solution is circulated between the dissolution tank and the electrochemical cell.

Aspect D5: The method or system of aspect D4, or any preceding aspect, wherein during at least a part of the step of dissolving, all of the acidic iron-salt solution is circulated between the dissolution tanks and the electrochemical cell.

Aspect D6: The method or system of any one of aspects D2-D5, or any preceding aspect, wherein reaction between the thermally-reduced ore and the acidic iron-salt solution during dissolution generates water thereby consuming protons of the acidic iron-salt solution; and wherein the provided electrochemically-generated protons replace at least a portion of the consumed protons in the acidic iron-salt solution.

Aspect D7: The method or system of any one of aspects D2-D6, or any preceding aspect, wherein the electrochemically-generated protons are provided continuously to the acidic iron-salt solution during at least a portion of the step of dissolving.

Aspect D8: The method or system of any one of aspects D2-D7, or any preceding aspect, wherein the acidic iron-salt solution is characterized by a steady state concentration of free protons of at least 0.2 M (e.g., at least 0.2, 0.3, 0.4, 0.5, 0.8, 1, 1.2, 1.5, 2, 3, 4, or 5 M, optionally wherein the steady state free proton concentration is less than 0.3, 0.4, 0.5, 0.8, 1, 1.2, 1.5, 2, 3, 4, 5, or 6 M and such values can be combined in any manner to form a range, such as 0.2-6 M) during the dissolution of thermally-reduced ore.

Aspect D9: The method or system of aspect D8, or any preceding aspect, wherein the acidic iron-salt solution is characterized by a steady state concentration of free protons is selected from the range of 0.2 M to 3 M.

Aspect D10: The method or system of aspect D8 or D9, or any preceding aspect, wherein the acidic iron-salt solution is characterized by a steady state pH being less than 0.7 (e.g., equal to or less than 0.7, 0.6, 0.5, 0.4, 0.3, 0.2, 0.1, 0, −0.1, −0.5, or −1, optionally wherein the steady state pH is at least 0.6, 0.5, 0.4, 0.3, 0.2, 0.1, 0, −0.1, −0.5, or −1 and such values can be combined in any manner to form a range, such as −1 to 0.7 or 0.1 to less than 0.7).

Aspect D11: The method or system of any one of the preceding aspects, wherein the step of electrochemically generating the electrochemically-generated protons comprises electrochemically oxidizing water at the first anode.

Aspect D12: The method or system of any one of the preceding aspects, wherein the step of providing electrochemically-generated protons comprises transporting the electrochemically-generated protons through the separator from the anolyte to the catholyte.

Aspect D13: The method or system of any one of the preceding aspects, wherein the electrochemical cell is characterized by a Coulombic efficiency of greater than 80% (e.g., greater than: 80%, 85%, 90%, 95%, or 99%, optionally wherein the Coulombic efficiency is less than: 85%, 90%, 95%, 99%, or 100% and such values can be combined in any manner to form a range, such as 80-100%).

Aspect D14: The method or system of any one of the preceding aspects, wherein the electrochemically-generated protons at least partially form acid in the first catholyte.

Aspect D15: The method or system of any one of the preceding aspects, comprising providing water from the first catholyte to the first anolyte.

Aspect D16: The method or system of any one of aspects D11-D15, or any preceding aspect, wherein the water oxidized at the first anode comprises the water generated by dissolution of the iron-containing ore during the step of dissolving.

Aspect D17: The method or system of any one of the preceding aspects, comprising providing water from the catholyte to the anolyte via osmosis through the first separator, membrane distillation, and/or flash distillation.

Aspect D18: The method or system of any one of the preceding aspects, wherein the anolyte has a different composition than the catholyte.

Aspect D19: The method or system of any one of the preceding aspects, wherein first anolyte has a different pH than the first catholyte.

Aspect D20: The method or system of any one of the preceding aspects, wherein the first catholyte has a lower pH than the first anolyte.

Aspect D21: The method or system of any one of the preceding aspects, wherein the first anolyte comprises a different composition of dissolved salts that in the first catholyte.

Aspect D22: The method or system of any one of the preceding aspects, wherein the first anolyte contains one or more dissolved ferric iron salts, and wherein the first anolyte is characterized by a total concentration of the one or more dissolved ferric iron salts being equal to or greater than a total iron ion concentration in the first catholyte.

Aspect D23: The method or system of any one of the preceding aspects, wherein the first catholyte comprises one or more supporting salts.

Aspect D24: The method or system of aspect D23, or any preceding aspect, wherein the first catholyte comprises a concentration of one or more supporting salts being selected from the range of 0.1 to 1M (e.g., 0.2 to 0.8 M, 0.4 to 0.6 M, 0.1 to 0.4 M, 0.4 to 0.8 M, or 0.8 to 1 M).

Aspect D25: The method or system of aspect D23 or D24, or any preceding aspect, wherein the one or more supporting salts comprise one or more metal sulfate compounds and/or one or more metal chloride compounds.

Aspect D26: The method or system of aspect D25, or any preceding aspect, wherein the one or more metal sulfate compounds comprise potassium sulfate, sodium sulfate, ammonium sulfate, lithium sulfate, potassium chloride, sodium chloride, ammonium chloride, lithium chloride, or a combination of these.

Aspect D27: The method or system of any one of the preceding aspects, wherein the first anolyte is characterized by at least one redox couple being different than in the first catholyte.

Aspect D28: The method or system of any one of the preceding aspects, wherein the first anolyte comprises a higher total concentration of dissolved salts than the first catholyte.

Aspect D29: The method or system of any one of aspects D1-D21 and D23-D27, or any preceding aspect, wherein the first anolyte comprises a lower total concentration of dissolved salts than the first catholyte.

Aspect D30: The method or system of any one of aspects D1-D21 and D23-D28, or any preceding aspect, wherein the anolyte is essentially free of $Fe^{2+}$ and $Fe^{3+}$ ions.

Aspect D31: The method or system of any one of the preceding aspects, wherein the catholyte is characterized by a maximum iron ion concentration being selected from the range of 0.5 to 5 M or 1 to 5 M (e.g., 1-5 M, 1-4 M, 1-3 M, 0.5-5 M, 0.5-4 M, 2-4 M, 2-5 M, 1-2 M).

Aspect D32: The method or system of any one of the preceding aspects comprising electrochemically generating oxygen ($O_2$) at the anode.

Aspect D33: The method or system of any one of the preceding aspects, wherein the first anolyte is ionically connected to the first catholyte through the first separator.

Aspect D34: The method or system of aspect D33, or any preceding aspect, wherein the first anolyte is fluidically disconnected from the first catholyte.

Aspect D35: The method or system of any one of the preceding aspects, wherein the separator is an ion exchange membrane.

Aspect D36: The method or system of aspect D35, or any preceding aspect, wherein the separator is a proton exchange membrane (PEM).

Aspect D37: The method or system of any one of the preceding aspects, wherein the produced iron-rich solution is characterized by a total iron ion concentration selected from the range of 0.5 to 5 M or 1 to 5 M (e.g., 1-5 M, 1-4 M, 1-3 M, 0.5-5 M, 0.5-4 M, 2-4 M, 2-5 M, 1-2 M).

Aspect D38: The method or system of any one of aspects D2-D37, or any preceding aspect, wherein the step of thermally reducing comprises exposing the one or more non-magnetite iron oxide materials of the iron-containing ore to a reductant at an elevated temperature selected from the range of 200° C. to 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600), thereby converting at least a portion of the one or more non-magnetite iron oxide materials to the magnetite.

Aspect D39: The method or system of any one of aspects D2-D38, or any preceding aspect, wherein the reductant comprises $H_2$ gas; and wherein at least a portion of the $H_2$ gas is generated chemically via a reaction of iron metal with an acid and/or at least a portion of the $H_2$ gas is generated electrochemically via a parasitic hydrogen evolution reaction of an iron electroplating process.

Aspect D40: The method or system of aspect D38, or any preceding aspect, wherein the iron-containing ore is exposed to the elevated temperature for a thermal-treatment time during the step of thermally reducing, and wherein the iron-containing ore is exposed to the reductant during the entirety of the thermal-treatment time.

Aspect D41: The method or system of aspect D38, or any preceding aspect, wherein the iron-containing ore is exposed to the elevated temperature for a thermal-treatment time during the step of thermally reducing, and wherein the iron-containing ore is exposed to the reductant during a portion of the thermal-treatment time (for example, air-roasting may be performed during a temperature ramp-up or an initial portion of the time during which the iron-containing ore is exposed to the elevated temperature of 200° C. to 600° C. (e.g., or any temperature range specified elsewhere herein for this 200-600° C. range), followed by introduction of $H_2$ gas to switch from air roasting to thermal reduction).

Aspect D42: The method or system of aspect D41, or any preceding aspect, comprising air-roasting the iron-containing ore by exposing the iron-containing ore to air during an initial portion of the thermal-treatment time.

Aspect D43: The method or system of any one of the preceding aspects further comprising air-roasting at least a portion of the iron-containing ore in the presence of air at a temperature selected from the range 200° C. and 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600) to form an air-roasted ore.

Aspect D44: The method or system of aspect D43, or any preceding aspect, wherein the step of air roasting is performed prior to or separately from the step of thermally reducing, wherein air-roasted ore has not been thermally reduced prior to air roasting.

Aspect D45: The method or system of aspect D43 or D44, or any preceding aspect, wherein the step of thermally reducing comprises thermally reducing the air-roasted ore to form at least a portion of the thermally-reduced ore; wherein the air-roasted comprises the one or more non-magnetite iron oxide materials.

Aspect D46: The method or system of aspect D43, D44, or D45, or any preceding aspect, wherein the step of dissolving comprises dissolving at least a portion of the air-roasted ore and at least a portion of the thermally-reduced ore concurrently and/or sequentially.

Aspect D47: The method or system of aspect D46, or any preceding aspect, wherein the step of dissolving comprises dissolving at least a portion of the air-roasted ore in a separate dissolution tank than the thermally-reduced ore for at least a portion of the step of dissolving.

Aspect D48: The method or system of any one of aspects D43-D47, or any preceding aspect, wherein the step of dissolving comprises dissolving an ore-mixture; wherein the ore-mixture comprises 0 wt. % to 100 wt. % of the thermally-reduced ore, 5 wt. % to 100 wt. % of the roasted ore, and 0 wt. % to 90 wt. % of the roasted magnetite-containing ore (the wt. % ranges for each of the ranges set forth in aspect A69 are equally applicable here to the corresponding wt. % ranges in this aspect D48).

Aspect D49: The method or system of any one of aspects D43-D48, or any preceding aspect, wherein the step of dissolving comprises circulating a dissolution solution between the first electrochemical cell and at least one of a first dissolution tank, a second dissolution tank, and a third dissolution tank; wherein the first dissolution tank comprises at least a portion of the thermally-reduced ore, the second dissolution tank comprises the air-roasted ore, and third dissolution tank comprises a raw iron-containing ore; wherein the raw ore is an iron-containing ore which has not been thermally reduced nor air-roasted.

Aspect D50: The method or system of aspect D49, or any preceding aspect, wherein the step of circulating comprises circulating the dissolution solution for a total circulation time or a total number of circulation cycles; wherein the dissolution solution is circulated between the electrochemical cell and the third dissolution tank for 0 to 99% of the total circulation time or the total number of circulation cycles; wherein the dissolution solution is circulated between the electrochemical cell and the second dissolution tank for 0 to 99% of the total circulation time or the total number of circulation cycles; and wherein the dissolution solution is circulated between the electrochemical cell and the first dissolution tank for 1 to 100% of the total circulation time or the total number of circulation cycles (the % circulation ranges for each of the ranges set forth in aspect A71 are equally applicable here to the corresponding % circulation ranges in this aspect D50).

Aspect D51: The method or system of aspect D49 or D50, or any preceding aspect, wherein during the step of circulating, the dissolution solution is circulated sequentially in any order and/or concurrently between the electrochemical cell and any two or among any three of the first, second, and third dissolution tanks.

Aspect D52: The method or system of aspect D51, or any preceding aspect, wherein the step of circulating comprises first circulating the dissolution solution first between electrochemical cell and the third dissolution tank having the raw ore, then second circulating the dissolution solution between electrochemical cell and the second dissolution tank having the air-roasted ore, then third circulating the dissolution solution between electrochemical cell and the first dissolution tank having the thermally-reduced ore.

Aspect D53: The method or system of any one of aspects D49-D52, or any preceding aspect, wherein the dissolution solution is or comprises the acidic iron-salt solution.

Aspect D54: The method or system of any one of aspects D43-D53, or any preceding aspect, wherein the first dissolution tank further comprises air-roasted ore, raw ore, or both during any part of the step of dissolving.

Aspect D55: The method or system of any one of aspects D49-D54, or any preceding aspect, wherein the second dissolution tank further comprises thermally-reduced ore, raw ore, or both during any part of the step of dissolving.

Aspect D56: The method or system of any one of aspects D49-D55, or any preceding aspect, wherein the third dissolution tank further comprises air-roasted ore, thermally-reduced ore, or both during any part of the step of dissolving.

Aspect D57: The method or system of any one of the preceding aspects, wherein the step of dissolving is performed in at least one dissolution tank, and wherein the step of dissolving comprises further introducing an air-roasted ore, a raw ore, or both to the acidic iron-salt solution in the at least one dissolution tank in the presence of the thermally reduced ore.

Aspect D58: The method or system of any one of aspects D2-D57, or any preceding aspect, wherein the one or more non-magnetite iron oxide materials comprise hematite and/or goethite.

Aspect D59: The method or system of any one of the preceding aspects, wherein the acidic iron-salt solution comprises an acid selected from the group consisting of: hydrochloric acid, sulfuric acid, nitric acid, phosphoric acid, acetic acid, citric acid, oxalic acid, boric acid, methanesulfonic acid, and any combination thereof.

Aspect D60: The method or system of any one of the preceding aspects, wherein the step of transferring the formed $Fe^{2+}$ ions comprises removing at least a portion of the iron-rich solution from the dissolution subsystem and delivering a delivered iron-rich solution to the iron-plating subsystem, wherein the delivered iron-rich solution comprises at least a portion of the removed iron-rich solution.

Aspect D61: The method or system of aspect D60, or any preceding aspect, wherein the delivered iron-rich solution, having the formed $Fe^{2+}$ ions, is characterized by a pH greater than 0.5 (e.g., greater than: 0.5, 0.6, 0.7, 0.8, 1, 1.5, 2, 2.5, 3, 3.5, 4, 4.5, 5, 5.5, or 6, optionally wherein the pH is less than: 0.6, 0.7, 0.8, 1, 1.5, 2, 2.5, 3, 3.5, 4, 4.5, 5, 5.5, or 6 and such pHs can be combined in any manner to form a range, such as 0.5-6).

Aspect D62: The method or system of aspect D61, or any preceding aspect, wherein the delivered iron-rich solution is characterized by a pH greater than or equal to 1.

Aspect D63: The method or system of aspect D62, or any preceding aspect, wherein the delivered iron-rich solution is characterized by a pH selected from the range of 2 to 6.

Aspect D64: The method or system of any one of aspects D60-D63, or any preceding aspect, wherein the delivered iron-rich solution comprises a higher concentration of $Fe^{2+}$ ions than of $Fe^{3+}$ ions.

Aspect D65: The method or system of any one of aspects D60-D64, or any preceding aspect, wherein the delivered iron-rich solution is characterized by a ratio of concentrations of $Fe^{3+}$ ions to $Fe^{2+}$ ions being less than or equal to 0.01 (e.g., less than or equal to 0.01, 0.0075, 0.005, 0.0025, or 0.001, optionally wherein the ratio can be greater than or equal to 0.0075, 0.005, 0.0025, or 0.001 and such values can be combined in any manner to form a range, such as 0.001-0.01).

Aspect D66: The method or system of any one of aspects D60-D65, or any preceding aspect, wherein the delivered iron-rich solution is delivered directly or indirectly to a second cathodic chamber; wherein the second electrochemical cell comprises the second cathodic chamber having a second catholyte in the presence of the second cathode.

Aspect D67: The method or system of aspect D66, or any preceding aspect, wherein at least 70% (e.g., at least: 70%, 75%, 80%, 85%, 90%, 95%, 99%, or 100%, optionally wherein such value is less than 75%, 80%, 85%, 90%, 95%, 99%, or 100% and can be combined in any manner to form a range, such as 70-99%) of the delivered iron-rich solution is delivered directly or indirectly to a second cathodic chamber.

Aspect D68: The method or system of aspect D67, or any preceding aspect, wherein at least 90% of the delivered iron-rich solution is delivered directly or indirectly to a second cathodic chamber.

Aspect D69: The method or system of any one of aspects D60-D68, or any preceding aspect, wherein the step of second electrochemically reducing forms a spent second catholyte, the spent second catholyte having a lower concentration of iron ions than that of the delivered iron-rich solution; wherein at least a portion of the spent second catholyte is provided to a second anodic chamber; wherein the second electrochemical cell comprises the second anodic chamber having a second anolyte in the presence of a second anode.

Aspect D70: The method or system of aspect D69, or any preceding aspect, wherein the spent second catholyte is formed when the step of second electrochemically reducing is complete or turned off.

Aspect D71: The method or system of aspect D68 or D69, or any preceding aspect, wherein the spent second catholyte is characterized by a concentration of iron ions being 60% to 70% (e.g., 62-68%, 64-66%, 60-65%, or 65-70%) of a concentration of iron ions in the delivered iron-rich solution.

Aspect D72: The method or system of aspect D69, or any preceding aspect, wherein the step of second electrochemically reducing is complete or turned off when a concentration of iron ions in the second catholyte decreases to 60% to 70% (e.g., 62-68%, 64-66%, 60-65%, or 65-70%) of a concentration of iron ions in the delivered iron-rich solution.

Aspect D73: The method or system of any one of aspects D60-D72, or any preceding aspect, wherein a first portion of the delivered iron-rich solution is delivered directly or indirectly to a second cathodic chamber; wherein a second portion of the delivered iron-rich solution is delivered directly or indirectly to a second anodic chamber; and wherein the second electrochemical cell comprises the second cathodic chamber having a second catholyte in the presence of the second cathode and the second electrochemical cell comprises a second anodic chamber having a second anolyte in the presence of a second anode.

Aspect D74: The method or system of aspect D73, or any preceding aspect, wherein the first portion is 25 vol. % to 45 vol. % (e.g., 30-40 vol. %, 32-38 vol. %, 25-35 vol. %, or 35-45 vol. %) of the delivered iron-rich solution and the second portion is 55 vol. % to 75 vol. % (e.g., 60-70 vol. %, 62-68 vol. %, 55-65 vol. %, or 65-75 vol. %) of the delivered iron-rich solution.

Aspect D75: The method or system of aspect D73 or D74, or any preceding aspect, wherein the first portion comprises 25 mol. % to 45 mol. % (e.g., 30-40 mol. %, 32-38 mol. %, 25-35 mol. %, or 35-45 mol. %) of the $Fe^{2+}$ of the delivered iron-rich solution and the second portion comprises 55 mol. % to 75 mol. % (e.g., 60-70 mol. %, 62-68 mol. %, 55-65 mol. %, or 65-75 mol. %) of the $Fe^{2+}$ of the delivered iron-rich solution.

Aspect D76: The method or system of any one of aspects D60-D75, or any preceding aspect, wherein the step of transferring further comprises treating the removed portion of the iron-rich solution, thereby forming a treated iron-rich solution, prior to the step of delivering; and wherein the delivered iron-rich solution comprises at least a portion of the treated iron-rich solution.

Aspect D77: The method or system of aspect D76, or any preceding aspect, wherein the step of treating comprises: raising a pH of the removed portion of the iron-rich solution.

Aspect D78: The method or system of aspect D76 or D77, or any preceding aspect, wherein the step of treating comprises raising the pH of the removed portion of the iron-rich solution by providing metallic iron in the presence of the removed portion of the iron-rich solution; and wherein a reaction between the removed portion of the iron-rich solution and the provided metallic iron consumes protons in the removed portion of the iron-rich solution.

Aspect D79: The method or system of aspect D78, or any preceding aspect, wherein raising the pH of the removed portion of the iron-rich solution further comprises providing magnetite in the presence of the removed portion of the iron-rich solution prior to and/or concurrently with providing the metallic iron in the presence of the removed portion of the iron-rich solution.

Aspect D80: The method or system of aspect D78 or D79, or any preceding aspect, wherein a reaction between the removed portion of the iron-rich solution and the provided metallic iron chemically-generates $H_2$ gas; and wherein the method further comprises collecting the chemically-generated $H_2$ gas.

Aspect D81: The method or system of any one of aspects D76-D80, or any preceding aspect, wherein the treated ferrous solution has a pH selected from the range of 2 to less than 7 (e.g., 2-4, 4-6, 6 to less than 7, 3 to less than 7, 3-6, or 4-5).

Aspect D82: The method or system of aspect D76, or any preceding aspect, wherein the feedstock comprises one or more impurities; wherein the produced iron-rich solution comprises at least a portion of the one or more impurities; wherein raising the pH comprises raising the pH of the removed portion of the iron-rich solution from an initial pH to an adjusted pH thereby precipitating at least a portion of the one or more impurities in the iron-rich solution to form the treated iron-rich solution; wherein the treated iron-rich dissolution has a reduced concentration of the one or more impurities compared to the produced iron-rich solution.

Aspect D83: The method or system of aspect D82, or any preceding aspect, wherein dissolving at least a portion of the iron-containing ore generates insoluble impurities; and wherein the method further comprises separating and removing at least a portion of the insoluble impurities.

Aspect D84: The method or system of aspect D83, or any preceding aspect, wherein the removal of at least a portion of the insoluble impurities is by filtering and/or separating out the insoluble impurities.

Aspect D85: The method or system of aspect D83 or D84, or any preceding aspect, wherein the insoluble impurities comprise quartz, gypsum, and any combination of these.

Aspect D86: The method or system of any one of aspects D82-D85, or any preceding aspect, wherein the adjusted pH is at or beyond a solubility limit of the one or more impurities and below a solubility limit of $Fe^{2+}$ ions, thereby precipitating at least a portion of the one or more impurities.

Aspect D87: The method or system of aspect D86, or any preceding aspect, wherein the adjusted pH is at or beyond a solubility limit of aluminum, titanium, and phosphate ions and below a solubility limit of $Fe^{2+}$ ions, thereby precipitating at least a portion of aluminum, titanium, and phosphorous-containing ions.

Aspect D88: The method or system of any one of aspects D82-D87, or any preceding aspect, wherein the adjusted pH is at or greater than a precipitation pH of the one or more impurities and below a precipitation pH of $Fe^{2+}$ ions, thereby precipitating at least a portion of the one or more impurities.

Aspect D89: The method or system of aspect D88, or any preceding aspect, wherein the adjusted pH is at or greater than a precipitation pH of aluminum, titanium, and phosphate ions and below the precipitation pH of $Fe^{2+}$ ions, thereby precipitating at least a portion of aluminum, titanium, and phosphorous-containing ions.

Aspect D90: The method or system of any one of aspects D86-D89, or any preceding aspect, comprising precipitating titanium hydroxide, aluminum hydroxide, aluminum phosphate, and/or iron phosphate.

Aspect D91: The method or system of any one of aspects D86-D90, or any preceding aspect, comprising removing at least a portion of precipitated impurities.

Aspect D92: The method or system of any one of aspects D82-D91, or any preceding aspect, wherein the adjusted pH is selected from the range of 3 to 7 or 3 to less than 7 (e.g., 3-6.5, 3-6, 3-5, 3-4, 3-7, 3 to less than 7, 4-7, 4 to less than 7, 4-6, 4-5, 5-7, 5 to less than 7, 5-6, 6-7, or 6 to less than 7).

Aspect D93: The method or system of aspect D92, or any preceding aspect, wherein the adjusted pH is selected from the range of 4 to less than 7.

Aspect D94: The method or system of any one of aspects D82-D93, or any preceding aspect, wherein the adjusted pH also results in coagulation of colloidal silica caused by the precipitation of other impurities; the method further comprising removal of at least a portion of the colloidal silica Aspect D95: The method or system of any one of aspects D82-D94, or any preceding aspect, wherein the step of raising the pH comprises providing metallic iron and/or an iron oxide material in the presence of the iron-rich solution; and wherein a reaction between the removed portion of the iron-rich solution and the provided metallic iron and/or iron oxide material consumes protons in the iron-rich solution thereby raising its pH.

Aspect D96: The method or system of aspect D95, or any preceding aspect, wherein the step of raising the pH comprises first providing the iron oxide material in the presence of the iron-rich solution and subsequently providing metallic iron in the presence of the iron-rich solution.

Aspect D97: The method or system of aspect D95, or any preceding aspect, wherein raising the pH of the removed portion of the iron-rich solution further comprises providing the iron oxide material in the presence of the removed portion of the iron-rich solution prior to and/or concurrently with providing the metallic iron in the presence of the removed portion of the iron-rich solution.

Aspect D98: The method or system of any one of aspects D95-D97, or any preceding aspect, wherein the iron oxide material comprises magnetite.

Aspect D99: The method or system of any one of aspects D95-D98, or any preceding aspect, wherein the provided iron oxide material comprises a thermally reduced iron-containing ore.

Aspect D100: The method or system of any one of aspects D95-D99, or any preceding aspect, wherein the metallic iron is a portion of the Fe metal formed during the step of second electrochemically reducing.

Aspect D101: The method or system of any one of aspects D82-D100, or any preceding aspect, wherein the treated ferrous product solution is characterized by:

a concentration of aluminum ions being less than 1 mM or 0.2 M (e.g., less than: 0.2 M, 0.15 M, 0.12 M, 0.1 M, 80 mM, 60 mM, 50 mM, 20 mM, 10 mM, 5 mM, 1 mM, optionally wherein the concentration of aluminum ions is 0 mM or at least: 0.15 M, 0.12 M, 0.1 M, 80 mM, 60 mM, 50 mM, 20 mM, 10 mM, 5 mM, 1 mM, and each of such values can be combined in any manner to form a range, such as 0-0.2 M or 1 mM to 0.1 M); and/or a concentration of phosphorous-containing ions being less than 1 mM or 0.2 M (e.g., less than: 0.2 M, 0.15 M, 0.12 M, 0.1 M, 80 mM, 60 mM, 50 mM, 20 mM, 10 mM, 5 mM, 1 mM, optionally wherein the concentration of phosphorous-containing ions is 0 mM or at least: 0.15 M, 0.12 M, 0.1 M, 80 mM, 60 mM, 50 mM, 20 mM, 10 mM, 5 mM, 1 mM, and each of such values can be combined in any manner to form a range, such as 0-0.2 M or 1 mM to 0.1 M).

Aspect D102: The method or system of any one of aspects D82-D101, or any preceding aspect, wherein the treated iron-rich solution is directly or indirectly delivered to the second cathodic chamber.

Aspect D103: The method or system of aspect D102, or any preceding aspect, wherein the treated iron-rich solution is not delivered to the second anodic chamber.

Aspect D104: The method or system of aspect D102 or D103, or any preceding aspect, comprising delivering a second portion of the produced iron-rich solution directly or indirectly to the second anodic chamber; wherein the second portion of the iron-rich solution is either untreated or subjected to a different treatment than the first portion of the iron-rich solution.

Aspect D105: The method or system of any one of aspects D82-D104, or any preceding aspect, wherein the iron-rich solution comprises colloidal silica; and wherein the step of treating comprises removing at least a portion of the colloidal silica.

Aspect D106: The method or system of aspect D105, or any preceding aspect, wherein removing colloidal silica comprises flocculation of at least a portion of the colloidal silica to generate flocculated colloidal silica.

Aspect D107: The method or system of aspect D105 or D106, or any preceding aspect, wherein the step of removing colloidal silica comprises adding polyethylene oxide to the iron-rich solution to facilitate flocculation of the colloidal silica, thereby generating flocculated colloidal silica.

Aspect D108: The method or system of any one of aspects D105-D107, or any preceding aspect, wherein removing colloidal silica is by filtering, settling, and/or any solid-liquid separation process.

Aspect D109: The method or system of any one of aspects D82-D108, or any preceding aspect, wherein the treated iron-rich solution has a colloidal silica content being less than or equal to 10 mM (e.g., less than or equal to: 10 mM, 8 mM, 6 mM, 5 mM, 4 mM, 2 mM, or 1 mM, optionally wherein the colloidal silica content is 0 mM or at least 8 mM, 6 mM, 5 mM, 4 mM, 2 mM, or 1 mM and each of such values can be combined in any manner to form a range, such as 0-10 mM, or 1-8 mM).

Aspect D110: The method or system of any one of aspects D82-D109, or any preceding aspect, wherein the initial pH is within the range of 0.5 to 1.5 (e.g., 0.5-1, 1-1.5, 0.8-1.3, or 0.7-1.4).

Aspect D111: The method or system of any one of aspects D82-D110, or any preceding aspect, wherein the iron-rich solution is characterized by the initial pH and further has a higher concentration of $Fe^{2+}$ ions than $Fe^{3+}$ ions.

Aspect D112: The method or system of any one of aspects D82-D111, or any preceding aspect, wherein the one or more impurities comprise aluminum compounds, titanium compounds, phosphate compounds, or any combination of these.

Aspect D113: The method or system of any one of aspects D82-D112, or any preceding aspect, wherein the feedstock comprises the one or more impurities at a concentration selected from the range of 1 to 50 wt. % (e.g., a wt. % of 1-50, 1-45, 1-40, 1-35, 1-30, 1-25, 1-20, 1-15, 1-10, 1-5, 5-50, 5-45, 5-40, 5-35, 5-30, 5-25, 5-20, 5-15, 5-10, 10-50, 10-45, 10-40, 10-35, 10-30, 10-25, 20-50, 20-40, 20-30, 30-50, 30-40, or 40-50).

Aspect D114: The method or system of any one of aspects D82-D113, or any preceding aspect, comprising a step of second treating the second anolyte and/or the second catholyte from the second electrochemical cell to adjusting pH, change composition and/or remove impurities.

Aspect D115: The method or system of any one of aspects D82-D114, or any preceding aspect, wherein the step of second treating is performed after the step of second electrochemically reducing is complete or turned off.

Aspect D116: The method or system of any one of the preceding aspects, wherein the removed Fe metal is characterized by:
a concentration of aluminum being less than 0.1 wt. % or less than 0.5 wt. % (e.g., a wt. % of aluminum of less than 0.5, 0.2, 0.1, 0.08, 0.06, 0.05, 0.02, 0.01, or 0.005, optionally wherein the wt. % is at least 0.2, 0.1, 0.08, 0.06, 0.05, 0.02, 0.01, or 0.005 and such values can be combined in any manner to form a range, such as 0.005-0.5 or 0.01 to 0.1); and/or
a concentration of phosphorous ions being less than 0.02 wt. % or less than 0.5 wt. % (e.g., a wt. % of phosphorous of less than 0.5, 0.2, 0.1, 0.08, 0.06, 0.05, 0.02, 0.01, 0.008, 0.006, 0.005, 0.002, or 0.001, optionally wherein the wt. % is at least 0.2, 0.1, 0.08, 0.06, 0.05, 0.02, 0.01, 0.008, 0.006, 0.005, 0.002, 0.001, or 0.0005 and such values can be combined in any manner to form a range, such as 0.0005-0.5 or 0.001-0.01).

Aspect D117: The method or system of any one of the preceding aspects comprising electrochemically oxidizing $Fe^{2+}$ ions to form second $Fe^{3+}$ ions in the second anolyte.

Aspect D118: The method or system of any one of the preceding aspects comprising recycling a first recycle solution from the iron-plating subsystem to the dissolution subsystem; wherein the recycle solution comprises the second $Fe^{3+}$ ions formed in the second anolyte.

Aspect D119: The method or system of aspect D118, or any preceding aspect, wherein the step of recycling is performed after the step of second electrochemically reducing is complete or turned off.

Aspect D120: The method or system of aspect D118 or D119, or any preceding aspect, wherein the first recycle solution is provided to a first dissolution tank; wherein the step of dissolving is performed in the first dissolution tank comprising the iron-containing ore and the acidic iron-salt solution.

Aspect D121: The method or system of aspect D118, D119, or D120, or any preceding aspect, wherein the first recycle solution comprises at least a portion of the second catholyte and the second anolyte from the second electrochemical cell.

Aspect D122: The method or system of any one of the preceding aspects, wherein the step of second electrochemically reducing is complete or turned off when the second catholyte of the second electrochemical cell is characterized by a total concentration of iron ions being 60% to 70% (e.g., 62-68%, 64-66%, 60-65%, or 65-70%) of a concentration of iron ions in (i) the delivered iron-rich solution or (ii) the produced iron-rich solution.

Aspect D123: Any preceding aspect.

Aspect D124: Any preceding aspect.

Aspect D125: The method or system of any one of the preceding aspects, wherein the step of second electrochemically reducing is complete or turned off when an average thickness of the formed Fe metal on a second cathode of the second electrochemical cell is selected from the range of 1 mm to 10 mm (e.g., an average thickness (mm) of 1-10, 1-8, 1-6, 1-4, 1-2, 2-10, 2-8, 2-6, 2-4, 4-10, 4-8, 4-6, 6-10, 6-8, or 8-10).

Aspect D126: Any preceding aspect.

Aspect D127: The method or system of any one of the preceding aspects, wherein the iron-plating subsystem comprises a first circulation tank configured circulate a second catholyte between a second cathodic chamber of the second electrochemical cell and the first circulation tank, and wherein the iron-plating subsystem comprises a second circulation tank configured circulate a second anolyte between a second anodic chamber of the second electrochemical cell and the second circulation tank.

Aspect D128: The method or system of aspect D127, or any preceding aspect, wherein iron-rich solution indirectly delivered to the second cathodic chamber is delivered to the first circulation tank.

Aspect D129: The method or system of any one of the preceding aspects, wherein the second separator is a PEM or an anion exchange membrane (AEM) or a microporous separator.

Aspect D130: The method or system of any one of the preceding aspects, wherein the first electrochemical cell is operated at a different current density than the second electrochemical cell.

Aspect D131: The method or system of any one of the preceding aspects, wherein the first electrochemical cell is concurrently operated at a different current density than the second electrochemical cell.

Aspect D132: The method or system of aspect D130 or D131, or any preceding aspect, wherein the first electrochemical cell is operated at a higher current density than the second electrochemical cell.

Aspect D133: The method or system of aspect D130, D131, or D132, or any preceding aspect, wherein the first electrochemical cell is operated at a current density selected from the range of 0.1 to 2 A/cm$^2$ (e.g., a current density (A/cm$^2$) of 0.1-2, 0.1-1.5, 0.1-1, 0.1-0.5, 0.5-2, 0.5-1.5, 0.5-1, 1-2, 1-1.5, or 1.5-2) and the second electrochemical cell is operated at a current density selected from the range of 20 to 300 mA/cm$^2$ (e.g., a current density (mA/cm$^2$) of 20-300, 20-250, 20-200, 20-150, 20-100, 20-50, 50-300, 50-250, 50-200, 50-150, 50-100, 100-300, 100-250, 100-200, 100-150, 150-300, 150-250, 150-200, 200-300, 200-250, or 250-300).

Aspect D134: The method or system of any one of the preceding aspects, comprising repeating the method for at least 5 cycles (e.g., at least: 5, 6, 7, 8, 9, 10, 15, 20, 30, 50, or 100 cycles, optionally wherein the cycles is less than: 6, 7, 8, 9, 10, 15, 20, 30, 50, 100, or 150 and each such value can be combined in any manner to form a range, such as 5-150).

Aspect D135: The method or system of any of the preceding aspects, wherein the feedstock comprise hematite, maghemite, ferrihydrite, magnetite, geothite, akaganite, lepidocrocite, ferroxyhite, or any combination of these.

Aspect D136: The method or system of any one of the preceding aspects comprising generating H$_2$ gas and collecting the generated H$_2$ gas.

Aspect D137: The method or system of aspect D39, D80, or D136, or any preceding aspect, wherein at least a portion of the collected H$_2$ gas is oxidized is used as a reductant in a process for thermally reducing iron-containing ore.

Aspect D138: The method or system of any one of the preceding aspects comprising electrically controlling the first electrochemical cell to prevent Fe metal electroplating at the first cathode.

Aspect D139: The method or system of any one of the preceding aspects, wherein the second electrochemical cell is operating at a temperature selected from the range of 40° C. to 80° C. (e.g., 45-75° C., 50-70° C., 55-65° C., 40-55° C., 55-70° C., 40-70° C., or 50-80° C.).

Aspect D140: The method or system of any one of the preceding aspects, wherein the second electrochemical cell comprises a second catholyte and a second anolyte; and wherein the second anolyte has a lower pH than the second catholyte.

Aspect D141: The method or system of aspect D140, or any preceding aspect, wherein the pH of the second anolyte is less than that of a solubility limit of Fe(III)(OH)$_2$.

Aspect D142: The method or system of aspect D140 or D141, or any preceding aspect, wherein the second catholyte has a pH less than 6 during the step of second electrochemically reducing.

Aspect D143: The method or system of any one of the preceding aspects, wherein the removed Fe metal comprises at least 99 wt. % Fe (e.g., at least: 99 wt. %, at least 99.5 wt. %, at least 99.9 wt. %, or 100 wt. %).

Aspect D144: The method or system of any one of the preceding aspects, wherein the first anode has a composition comprising lead, lead oxide, manganese oxide, a mixed metal oxide, iridium oxide, ruthenium oxide, or any combination of these.

Aspect D145: The method or system of any one of the preceding aspects, wherein the first cathode has a composition comprising, carbon, graphite, titanium, or any combination of these.

Aspect D146: The method or system of any one of the preceding aspects, wherein the second anode has a composition comprising carbon, graphite, lead, lead oxide, a mixed metal oxide, or any combination of these.

Aspect D147: The method or system of any one of the preceding aspects, wherein the second cathode has a composition comprising, steel, low carbon steel, stainless steel, copper, copper alloy, or any combination of these.

Aspect D148: The method or system of any one of the preceding aspects, wherein the step of removing the iron metal comprises (a) scraping the iron metal off the second cathode during the step of second electrochemically reducing and (b) collecting the scraped iron metal.

Aspect D149: The method or system of any one of the preceding aspects comprising providing electrical energy input to one or more steps of the method; and wherein the at least a portion of the electrical energy input is derived from renewable energy sources.

Aspect D150: The method or system of any one of the preceding aspects comprising a step of making steel; wherein the step of making steel comprises heating the removed electroplated iron metal to a furnace in the presence of a carbon source at a temperature sufficient to convert the electroplated iron metal to a steel.

Aspect D151: The method or system of aspect D150, or any preceding aspect, wherein the furnace is an arc furnace, an induction furnace, or any other furnace capable of reaching a temperature sufficient to convert the electroplated iron metal to a steel.

Aspect D152: The method or system of any one of the preceding aspects comprising operating the second electrochemical cell in a discharge mode, the discharge mode comprising oxidizing the electroplated Fe metal in the second electrochemical cell; wherein the method further comprises supplying electrical energy produced during the discharge mode of the second electrochemical cell to an electrical grid.

Aspect D153: The method or system of any one of the preceding aspects, wherein the step of second electrochemically reducing is an iron electroplating reaction.

Aspect D154: A system for producing iron, the system comprising:

a dissolution subsystem for producing an iron-rich solution, wherein the dissolution subsystem comprises a first dissolution tank, a first electrochemical cell, and a first circulation subsystem; wherein:

in the first dissolution tank, an iron-containing ore is contacted with an acid to dissolve at least a portion of the iron-containing ore to thereby form an acidic iron-salt solution having dissolved Fe$^{3+}$ ions;

the first circulation subsystem circulates at least a portion of the acidic iron-salt solution between the first dissolution tank and a first cathodic chamber of the first electrochemical cell, thereby providing at least a portion of the first $Fe^{3+}$ ions to a first catholyte of the first cathodic chamber;
wherein the first electrochemical cell comprises a first anodic chamber having a first anolyte in the presence of a first anode, the first cathodic chamber having the first catholyte in the presence of a first cathode, and a first separator separating the first anolyte from the first catholyte;
the first electrochemical cell electrochemically reduces at least a portion of the first $Fe^{3+}$ ions at the first cathode to form $Fe^{2+}$ ions in the first catholyte;
the first electrochemical cell electrochemically generates protons and provides the electrochemically generated protons to the catholyte; wherein the first circulation system provides the electrochemically generated protons from the first catholyte to the acidic iron-salt solution; and
the iron-rich solution produced in the first subsystem comprises the formed $Fe^{2+}$ ions;
a transition subsystem comprising a first inter-subsystem fluidic connection for transferring at least a portion of the iron-rich solution to an iron-plating subsystem;
the iron-plating subsystem comprising a second electrochemical cell;
wherein the second electrochemical cell comprises a second cathodic chamber having a second catholyte in the presence of the second cathode; a second anodic chamber having a second anolyte in the presence of a second anode, and a second separator separating the first anolyte from the first catholyte having a second catholyte in the presence of a second cathode;
wherein at least a first portion of the transferred formed $Fe^{2+}$ ions are electrochemically reduced to Fe metal at the second cathode; and
an iron-removal subsystem for removing the Fe metal from the second electrochemical cell thereby producing the iron.

Aspect D155: The method or system of aspect D154, or any preceding aspect, wherein protons are electrochemically generated in the first anolyte and are provided to the first catholyte.

Aspect D156: The method or system of aspect D154 or D155, or any preceding aspect, wherein the acidic iron-salt solution in the dissolution tank, in the presence of the iron-containing ore, is characterized by a steady state concentration of free protons being at least 0.2 M (optionally, e.g., at least 0.2, 0.3, 0.4, 0.5, 0.8, 1, 1.2, 1.5, 2, 3, 4, or 5 M, optionally wherein the steady state free proton concentration is less than 0.3, 0.4, 0.5, 0.8, 1, 1.2, 1.5, 2, 3, 4, 5, or 6 M and such values can be combined in any manner to form a range, such as 0.2-6 M) and/or is characterized by a steady state pH being equal to or less than 0.7 (e.g., equal to or less than 0.7, 0.6, 0.5, 0.4, 0.3, 0.2, 0.1, 0, −0.1, −0.5, or −1, optionally wherein the steady state pH is at least 0.6, 0.5, 0.4, 0.3, 0.2, 0.1, 0, −0.1, −0.5, or −1 and such values can be combined in any manner to form a range, such as −1 to 0.7).

Aspect D157: The method or system of any one of the preceding aspects, wherein the first anolyte comprises water or an aqueous salt solution; and wherein water is electrochemically oxidized at the first anode to generate protons in the first anolyte; and wherein the generated protons transport to the first catholyte through the separator.

Aspect D158: The method or system of any one of the preceding aspects, wherein the first anolyte has a different composition than the first catholyte.

Aspect D159: The method or system of any one of the preceding aspects, wherein the first iron-containing ore comprises a thermally-reduced ore having magnetite.

Aspect D160: The method or system of aspect D159, or any preceding aspect, further comprising a thermal reduction subsystem configured to form the thermally-reduced ore by converting non-magnetite materials to magnetite in the presence of a reductant and at an elevated temperature selected from the range of 200° C. to 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600); wherein the thermally-reduced ore is provided to the first dissolution tank from the thermal reduction subsystem.

Aspect D161: The method or system of aspect D160, or any preceding aspect, comprising an air-roasting subsystem configured to form an air-roasted ore by air roasting an iron-containing ore in the presence of air and at an elevated temperature selected from the range 200° C. and 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600).

Aspect D162: The method or system of aspect D161, or any preceding aspect, wherein the air-roasting subsystem and the thermal reduction subsystem are the same.

Aspect D163: The method or system of any one of the preceding aspects comprising a second dissolution tank having an air-roasted ore; wherein the air-roasted ore is an iron-containing ore that has not been thermally reduced and which has been exposed to air at an elevated temperature selected from the range of 200° C. to 600° C. (e.g., a temperature (° C.) of 200-550, 200-500, 200-450, 200-400, 200-350, 200-300, 200-250, 250-600, 250-550, 250-500, 250-400, 300-600, 300-550, 300-500, 300-450, 300-400, 350-600, 350-550, 350-500, 350-450, 400-600, 400-550, 400-500, 450-600, 450-550, or 500-600);
wherein dissolution of the air-roasted ore occurs in the presence of a second acidic iron-salt solution comprising dissolved $Fe^{3+}$ ions in the second dissolution tank;
wherein the system further comprises a second circulation subsystem that circulates at least a portion of the second acidic iron-salt solution from the second dissolution tank to the cathode chamber and at least a portion of the catholyte from the electrochemical cell to the second dissolution tank; and
wherein at least a portion of the $Fe^{3+}$ ions from the second acidic iron-salt solution are electrochemically reduced at the cathode to $Fe^{2+}$ ions in the catholyte, thereby consuming the $Fe^{3+}$ ions from the second acidic iron-salt solution.

Aspect D164: The method or system of any one of the preceding aspects comprising a third dissolution tank having a raw ore; wherein the raw ore is an iron-containing ore which has not been thermally reduced nor air-roasted;

wherein dissolution of the air-roasted ore occurs in the presence of a third acidic iron-salt solution comprising dissolved $Fe^{3+}$ ions in the third dissolution tank;
wherein the system further comprises a third circulation subsystem that circulates at least a portion of the third acidic iron-salt solution from the third dissolution tank to the cathode chamber and at least a portion of the catholyte from the electrochemical cell to the third dissolution tank; and
wherein at least a portion of the $Fe^{3+}$ ions from the third acidic iron-salt solution are electrochemically reduced at the cathode to $Fe^{2+}$ ions in the catholyte, thereby consuming the $Fe^{3+}$ ions from the third acidic iron-salt solution.

Aspect D165: The method or system of any one of the preceding aspects wherein the produced iron-rich solution has an iron ion concentration selected from the range of 1 M to 4 M (e.g., 1-3.5, 1-3, 1-2.5, 1-2, 1-1.5, 1.5-4, 1.5-3.5, 1.5-3, 1.5-2.5, 1.5-2, 2-4, 2-3.5, 2-3, 2-2.5, 2.5-4, 2.5-3.5, 2.5-3, 3-4, or 3-3.5).

Aspect D166: The method or system of any one of the preceding aspects, wherein $Fe^{2+}$ ions are oxidized to $Fe^{3+}$ ions in the second anolyte.

Aspect D167: The method or system of any one of the preceding aspects, wherein the transition subsystem removes at least a portion of the produced iron-rich solution and treats the removed portion of the iron-rich solution, thereby forming a treated iron-rich solution.

Aspect D168: The method or system of any one of the preceding aspects, comprising a spent electrolyte recycling system configured to recycle a first recycle solution from the second electrochemical cell to the dissolution subsystem.

Aspect D169: The method or system of aspect D168, or any preceding aspect, wherein the first recycle solution comprises at least a portion of the second anolyte and at least a portion of the second catholyte.

Aspect D170: The method or system of aspect D169, or any preceding aspect, wherein the first recycle solution is formed by mixing at least a portion of the second anolyte and at least a portion of the second catholyte after the reduction of the formed $Fe^{2+}$ ions to Fe metal is complete or turned off.

Aspect D171: The method or system of any one of the preceding aspects, wherein the transition subsystem comprises a first impurity removal subsystem configured to remove at least a portion of the one or more impurities from the iron-rich solution, thereby forming a treated iron-rich solution having at least a portion of the formed $Fe^{2+}$ ions; wherein a pH of the iron-rich solution is raised, in the first impurity removal subsystem, from an initial pH to an adjusted pH to precipitate the removed portion one or more impurities.

Aspect D172: The method or system of any of the above or below aspects, wherein the step of dissolving is terminated when a proton concentration (optionally, a steady state proton concentration) in the acidic iron-salt solution is equal to or less than 0.4 M (optionally 0.3 M, optionally 0.2 M, optionally 0.1 M) (optionally after being above this threshold for a majority of the time the step of dissolving is performed).

Aspect D173: The method or system of any of the above aspects, wherein the step of dissolving is terminated when a total iron ion concentration in the first catholyte, in the acidic iron-salt solution, and/or the produced iron-rich solution reaches a desired maximum value (optionally, a steady state value) being 1 M, optionally 2 M, optionally 3 M, optionally 4 M, optionally any value or range between 1 M and 4M inclusively.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of any particular claimed invention. Thus, it should be understood that although inventions have been specifically disclosed by preferred embodiments, exemplary embodiments and optional features, modification and variation of the concepts herein disclosed may be resorted to by those skilled in the art, and that such modifications and variations are considered to be within the scope of inventions as defined by the appended claims. The specific embodiments provided herein are examples of useful embodiments of the inventions and it will be apparent to one skilled in the art that the inventions may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including iron oxide materials of an ore or structural and compositional polymorphs of the group members, are disclosed separately. When a Markush group or other grouping is used herein, all individual members of the group and all combinations and sub-combinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, subsystem, method, process, component, and/or combination of components, described or exemplified herein can be used to practice any claimed invention(s), unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the disclosed devices, systems, methods, and processes pertain. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's inventions, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The claimed inventions illustratively described herein suitably may be practiced in the absence of any element or elements, limitation or limitations which is not specifically disclosed herein.

One of ordinary skill in the art will appreciate that starting materials, reagents, synthetic methods, purification methods, analytical methods, and assay methods other than those specifically exemplified can be employed in the practice of the claimed inventions without resort to undue experimentation. All art-known functional equivalents, of any such materials and methods are intended to be included in these inventions.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

We claim:

1. A method for producing iron, the method comprising:
    providing a solid feedstock having an iron-containing ore and one or more non-iron impurities to a dissolution subsystem;
    dissolving at least a portion of the iron-containing ore using an acid to form an acidic iron-salt solution having dissolved first $Fe^{3+}$ ions;
    reducing said first $Fe^{3+}$ ions to form $Fe^{2+}$ ions;
    producing an iron-rich solution in the dissolution subsystem, the iron-rich solution having at least a portion of the formed $Fe^{2+}$ ions and at least a portion of the one or more non-iron impurities;
    treating at least a first portion of the iron-rich solution to remove at least a portion of the one or more non-iron impurities from the iron-rich solution, thereby forming a treated iron-rich solution having at least a portion of the formed $Fe^{2+}$ ions;
        wherein the step of treating comprises raising a pH of the iron-rich solution from an initial pH to an adjusted pH thereby precipitating at least a portion of the one or more non-iron impurities from the treated iron-rich solution;
    delivering at least a first portion of the treated iron-rich solution to an iron-plating subsystem having an electrochemical plating cell;
    electroplating iron by electrochemically reducing at least a first portion of the delivered formed $Fe^{2+}$ ions to Fe metal at a plating cathode of the electrochemical plating cell; and
    removing the Fe metal from the electrochemical plating cell thereby producing iron.

2. The method of claim 1, wherein the step of reducing comprises providing a metallic iron in contact with the acidic iron-salt solution to chemically convert at least a portion of the first $Fe^{3+}$ ions to at least a portion of the formed $Fe^{2+}$ ions.

3. The method of claim 1 comprising providing at least a portion of the acidic iron-salt solution, having at least a portion of the first $Fe^{3+}$ ions, to a first cathodic chamber of a first electrochemical cell;
    wherein the first electrochemical cell comprises a first anodic chamber having a first anolyte in the presence of a first anode, the first cathodic chamber having a first catholyte in the presence of a first cathode, and a first separator separating the first anolyte from the first catholyte;
    and wherein the step of reducing comprises first electrochemically reducing said first $Fe^{3+}$ ions in the first catholyte to at least a portion of the formed $Fe^{2+}$ ions in the first catholyte.

4. The method of claim 1, wherein the step of electroplating iron comprises electrochemically oxidizing ferrous ions to ferric ions at an anode of the electrochemical plating cell.

5. The method of claim 1, wherein the step of electroplating iron comprises an oxygen evolution reaction at the anode of the electrochemical plating cell.

6. The method of claim 1, wherein the adjusted pH is at or greater than a precipitation pH of the one or more non-iron impurities and below a precipitation pH of $Fe^{2+}$ ions, thereby precipitating at least a portion of the one or more non-iron impurities.

7. The method of claim 6, wherein the adjusted pH is at or greater than a precipitation pH of aluminum, titanium, and phosphate ions and below the precipitation pH of $Fe^{2+}$ ions, thereby precipitating at least a portion of aluminum, titanium, and/or phosphorous-containing ions from the treated iron-rich solution.

8. The method of claim 7, comprising precipitating titanium hydroxide, aluminum hydroxide, aluminum phosphate, and/or iron phosphate.

9. The method of claim 1, comprising removing at least a portion of the precipitated non-iron impurities.

10. The method of claim 1, wherein the adjusted pH is selected from the range of 3 to 7.

11. The method of claim 1, wherein the adjusted pH also results in coagulation of colloidal silica along with the precipitation of one or more of the non-iron impurities; the method further comprising removal of at least a portion of the coagulated silica.

12. The method of claim 1, wherein the step of raising the pH comprises providing metallic iron in the presence of the first portion of the iron-rich solution; and wherein a reaction between the first portion of the iron-rich solution and the provided metallic iron material consumes protons in the iron-rich solution thereby raising its pH.

13. The method of claim 12, wherein the metallic iron is a portion of the Fe metal formed during the step of electroplating iron.

14. The method of claim 1, wherein the electrochemical plating cell comprises a plating cathodic chamber having a plating catholyte in the presence of the plating cathode, a plating anodic chamber having a plating anolyte in the presence of a plating anode, and a plating separator separating the plating catholyte from the plating anolyte.

15. The method of claim 14, wherein the treated iron-rich solution is directly or indirectly delivered to the plating cathodic chamber.

16. The method of claim 14, wherein the treated iron-rich solution is not delivered directly to the plating anodic chamber.

17. The method of claim 16, comprising delivering a second portion of the produced iron-rich solution directly or indirectly to the plating anodic chamber; wherein the second portion of the iron-rich solution is either untreated or subjected to a different treatment than the first portion of the iron-rich solution.

18. The method of claim 1, wherein the removed Fe metal is characterized by:
a concentration of aluminum being less than 0.1 wt. %; and/or a concentration of phosphorous ions being less than 0.01 wt. %.

19. A system for producing iron, the system comprising:
a dissolution subsystem having a first dissolution tank;
wherein the first dissolution tank comprises a solid feedstock having one or more iron-containing ores and one or more non-iron impurities;
wherein the first dissolution tank further comprises an acidic iron-salt solution for dissolving at least a portion of the one or more iron-containing ores to generate dissolved non-iron impurities and dissolved first $Fe^{3+}$ ions in the acidic iron-salt solution;
a reduction subsystem configured to reduce the first $Fe^{3+}$ ions in the acidic iron-salt solution to produce formed $Fe^{2+}$ ions in an iron-rich solution;
a first impurity-removal subsystem configured to receive the iron-rich solution and to remove at least a portion of the one or more non-iron impurities from the iron-rich solution, thereby forming a treated iron-rich solution having at least a portion of the formed $Fe^{2+}$ ions;
wherein the first impurity-removal subsystem is configured to raise a pH of the iron-rich solution from an initial pH to an adjusted pH to precipitate the removed portion of the one or more non-iron impurities;
an iron-plating subsystem having an electrochemical plating cell, the iron-plating subsystem being configured to receive at least a first portion of the treated iron-rich solution from the first impurity-removal subsystem;
the electrochemical plating cell comprising a plating cathode configured for reducing at least a portion of the delivered formed $Fe^{2+}$ ions to Fe metal; and
an iron removal system configured for removing the Fe metal from the electrochemical plating cell.

20. The system of claim 19, wherein the first impurity-removal subsystem is configured to contact metallic iron with the acidic iron-salt solution to chemically convert at least a portion of the first $Fe^{3+}$ ions to at least a portion of the formed $Fe^{2+}$ ions.

21. The system of claim 19, wherein the first impurity-removal subsystem comprises a reactor for contacting a portion of the Fe metal removed from the electrochemical plating cell with the iron-rich solution.

22. The system of claim 19, wherein the first impurity-removal subsystem comprises a solid/liquid separation system for separating precipitated solids from the treated iron-rich solution.

* * * * *